United States Patent
Kondo et al.

(10) Patent No.: US 8,436,941 B2
(45) Date of Patent: May 7, 2013

(54) INFORMATION PRESENTING DEVICE AND INFORMATION PRESENTING METHOD

(75) Inventors: Tetsujiro Kondo, Tokyo (JP); Kazutaka Uchida, Tokyo (JP); Ryotaku Hayashi, Saitama (JP)

(73) Assignee: Sony Corporation, Tokyo (JP)

( * ) Notice: Subject to any disclaimer, the term of this patent is extended or adjusted under 35 U.S.C. 154(b) by 840 days.

(21) Appl. No.: 12/479,198

(22) Filed: Jun. 5, 2009

(65) Prior Publication Data
US 2009/0310021 A1 Dec. 17, 2009

(30) Foreign Application Priority Data

Jun. 9, 2008 (JP) ............................... P2008-150962
Jun. 1, 2009 (JP) ............................... P2009-132489

(51) Int. Cl.
*H04N 5/445* (2011.01)
*H04N 9/76* (2006.01)

(52) U.S. Cl.
USPC .......................................... 348/564; 348/598

(58) Field of Classification Search .................. 348/564, 348/586, 588, 589, 600; 345/767, 630
See application file for complete search history.

(56) References Cited

U.S. PATENT DOCUMENTS

| | | | | |
|---|---|---|---|---|
| 5,680,558 A * | 10/1997 | Hatanaka et al. | ............. | 715/838 |
| 2004/0090462 A1* | 5/2004 | Graham | ........................ | 345/767 |
| 2007/0002179 A1 | 1/2007 | Naka | | |
| 2007/0071413 A1* | 3/2007 | Takahashi et al. | ............... | 386/96 |
| 2007/0097153 A1* | 5/2007 | Kong | ............................ | 345/690 |
| 2007/0291155 A1* | 12/2007 | Kawaguchi et al. | ...... | 348/333.12 |
| 2008/0122870 A1* | 5/2008 | Brodersen et al. | ............. | 345/634 |
| 2009/0052871 A1* | 2/2009 | Kasutani et al. | ............... | 386/124 |
| 2009/0289955 A1* | 11/2009 | Douris et al. | .................. | 345/630 |

FOREIGN PATENT DOCUMENTS

| | | |
|---|---|---|
| JP | 2002-74322 | 3/2002 |
| JP | 2004-80156 | 3/2004 |
| JP | 2005-215375 | 8/2005 |
| JP | 2006-180231 | 7/2006 |
| JP | 2006-339817 | 12/2006 |
| JP | 2007-13725 | 1/2007 |

OTHER PUBLICATIONS

U.S. Appl. No. 12/417,812, filed Apr. 3, 2009, Kondo, et al.

* cited by examiner

*Primary Examiner* — Sath V Perungavoor
*Assistant Examiner* — Kate Luo
(74) *Attorney, Agent, or Firm* — Oblon, Spivak, McClelland, Maier & Neustadt, L.L.P.

(57) ABSTRACT

An information presenting device includes: a first image generating unit configured to extract, from video data input by way of an input unit, a portion of the video data, and generate multiple main images; a second image generating unit configured to generate multiple sub-images from information correlated to the video data; and an image output unit configured to generate a display image, wherein the plurality of main images are placed in time sequence, and each of the plurality of sub-images are displayed in time sequence corresponding to the main images.

18 Claims, 44 Drawing Sheets

FIG. 9

| CAPTION NO. | DISPLAY START POINT-IN-TIME Ts | DISPLAY END POINT-IN-TIME Te | CONTENT OF CAPTION |
|---|---|---|---|
| 0 | 1.2 SECONDS | 5.5 SECONDS | NOW, FOR THE NEWS AT NOON ... |
| 1 | 7.3 SECONDS | 12.1 SECONDS | EARLY-MORNING DOWNTOWN ... |
| 2 | 13.0 SECONDS | 18.0 SECONDS | WAS PARALYZED AS A ... |
| 3 | 20.4 SECONDS | 25.0 SECONDS | WENT ON A RAMPAGE ... |
| ... | ... | ... | ... |

FIG. 10

CAPTION IMAGE 0

NOW, FOR THE NEWS AT NOON

CAPTION IMAGE 1

EARLY-MORNING DOWNTOWN TRAFFIC IN METROPOLIS

CAPTION IMAGE 2

WAS PARALYZED AS A KNIFE-WIELDING VILLAIN

FIG. 20

| SUPERIMPOSED TEXT NO. | DISPLAY START POINT-IN-TIME Ts | DISPLAY END POINT-IN-TIME Te | SUPERIMPOSED TEXT IMAGE |
|---|---|---|---|
| 0 | 1.2 SECONDS | 5.5 SECONDS | NEWS AT NOON (T0) |
| 1 | 7.3 SECONDS | 12.1 SECONDS | METROPOLIS (T1) |
| 2 | 13.0 SECONDS | 18.0 SECONDS | DOWNTOWN METROPOLIS (T2) |
| 3 | 20.4 SECONDS | 25.0 SECONDS | EARLY MORNING, A VILLAIN ON A RAMPAGE (T3) |
| ... | ... | ... | ... |

FIG. 22
| FACE NO. | DISPLAY START POINT-IN-TIME Ts | DISPLAY END POINT-IN-TIME Te | FACE IMAGE |
|---|---|---|---|
| 0 | 30.3 SECONDS | 45.2 SECONDS |  F0 |
| 1 | 120.5 SECONDS | 134.2 SECONDS |  F1 |
| 2 | 183.2 SECONDS | 200.4 SECONDS |  F2 |
| 3 | 245.3 SECONDS | 260.3 SECONDS |  F3 |
| ⋮ | ⋮ | ⋮ | ⋮ |

FIG. 34

| CAPTION NO. | DISPLAY START POINT-IN-TIME Ts | DISPLAY END POINT-IN-TIME Te | CONTENT OF CAPTION |
|---|---|---|---|
| 0 | 1.2 SECONDS | 5.5 SECONDS | NOW, FOR THE NEWS AT NOON ... |
| 1 | 7.3 SECONDS | 12.1 SECONDS | EARLY-MORNING DOWNTOWN ... |
| 2 | 13.0 SECONDS | 18.0 SECONDS | WAS PARALYZED AS A ... |
| 3 | 20.4 SECONDS | 25.0 SECONDS | WENT ON A RAMPAGE ... |
| ... | ... | ... | ... |

INFORMATION PRESENTING DEVICE AND INFORMATION PRESENTING METHOD

BACKGROUND OF THE INVENTION

1. Field of the Invention

The present invention relates to an information presenting device and an information presenting method, and more particularly relates to an information presenting device and an information presenting method whereby captions are displayed along with video.

2. Description of the Related Art

Heretofore, television broadcasts and so forth have provided information regarding audio of video (or summarized content thereof) along with display of the video, in the form of text. Such text is called "captions" or "superimposed text" or the like, and serves to aid viewer comprehension of the video contents.

For example, US Patent Application Publication No. 2007/0002179 (corresponding to Japanese Unexamined Patent Application Publication No. 2007-13725, incorporated by reference) describes, regarding a case of displaying multiple programs on multiple screens, performing audio output at one screen and performing caption display at the other screen.

SUMMARY OF THE INVENTION

However, with an arrangement which simply displays the current program video and captions on the displays screen as with US Patent Application Publication No. 2007/0002179, the viewer is not able to predict how the program will develop in the immediate future, and accordingly is not able to view the program at east. Consequently, there has been a problem in that the viewer cannot afford the time to sort out what is happening in the program, and may find the program difficult to understand. Further, there has been a problem in that, if the viewer allows some information to slip by without comprehending the information, the viewer is not able to get the information again, and accordingly may find the program to be even more difficult to comprehend.

It has been found to be desirable to enable viewers to view presented information in a more relaxed manner.

An information presenting device according to an embodiment of the present invention includes: a first image generating unit configured to extract, from video data input by way of an input unit, a portion of the video data, and generate multiple main images; a second image generating unit configured to generate multiple sub-images from information correlated to the video data; and an image output unit configured to generate a display image, wherein the plurality of main images are placed in time sequence, and each of the plurality of sub-images are displayed in time sequence corresponding to the main images.

An information presenting method according to an embodiment of the present invention includes the steps of: extracting, from video data, a portion of the video data, and generating multiple main images; generating multiple sub-images from information correlated to the video data; and generating a display image, wherein the plurality of main images are placed in time sequence, and each of the plurality of sub-images are displayed in time sequence corresponding to the main images.

According to the above-described configurations, in addition to current information to be played, future information can also be presented on the screen in time sequence. Accordingly, the viewer is able to view while seeing future main images and sub-images, whereby how the program is going to proceed can be predicted, and the viewer can view the program proceeding in a relaxed manner.

BRIEF DESCRIPTION OF THE DRAWINGS

FIG. 9 is a diagram for illustrating an example of a caption information table according to the first embodiment;

FIG. 10 is a diagram for illustrating an example of a caption image according to the first embodiment;

FIGS. 12A and 12B are diagrams illustrating a first 3D model of virtual space according to the first embodiment, wherein FIG. 12A is a side view and FIG. 12B is a top view;

FIG. 20 is a diagram illustrating an example of a superimposed text table according to the first modification of the first embodiment;

FIG. 22 is a diagram illustrating an example of a face table according to the first modification of the first embodiment;

FIG. 34 is a diagram illustrating an example of a caption information table according to the second embodiment;

DESCRIPTION OF THE PREFERRED EMBODIMENTS

Figure 1:
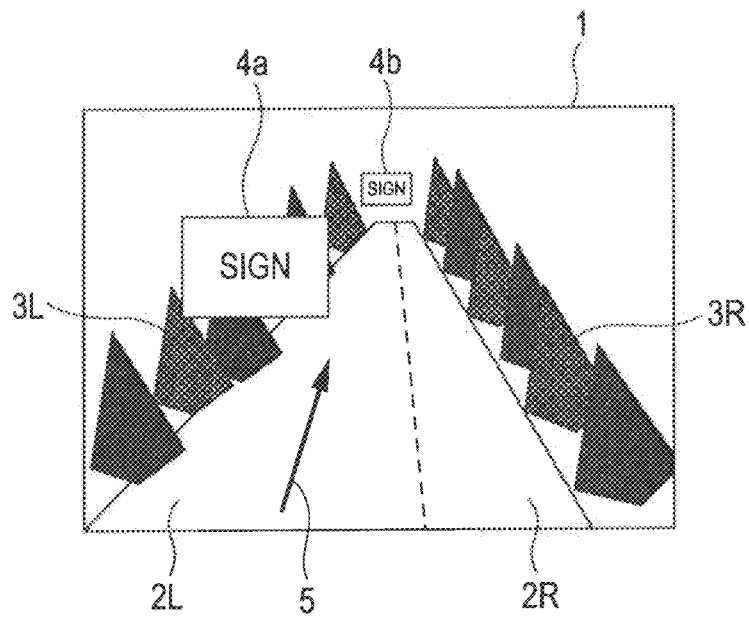
FIG. 1 is a diagram for describing scenery viewed from the windshield of a car.

Embodiments of to the present invention will be described with reference to the attached drawings. The following embodiment is a specific example for carrying out the invention in a suitable manner, and accordingly various technologically new restrictions are applied. It should be noted however, that the present invention is not restricted to these embodiments unless specifically stated so in the following description. Accordingly, in the following description, example of materials used, the amount thereof, processing time, processing order, parameters, and like numerical conditions and so forth are no more than suitable examples, and also dimensions, shapes, and placement relations and so forth in the drawings are but schematic representations illustrating examples of embodiments.

Definition of some terms used in the present specification will be laid forth here. The term "caption" and the term "superimposed text" are used throughout the Specification and the definitions thereof have bearing on the description, and accordingly should be understood as follows.

"Caption" refers to information that is provided along with a television broadcast or the like, for the purpose of being displayed on the screen along with the video, such as closed captions in the related art. The general understanding of the term "caption" in the related art implies that one who desires to display the information on the screen does so due to need for an aid of some sort, e.g., hearing impaired, the audio is not in a native language, and so on. While the embodiments of the present invention are not restricted to such usages, this is more less in line with the broader concept of "aid" in the present Specification, which is to allow the viewer to view programs and the like in a more relaxed manner.

"Superimposed text" is a broad term which generally refers to almost anything superimposed on the video rather than being provided as information along with the video. This includes "open caption" text, scrolling credits, and so on, but is not restricted at all to text. Accordingly, all characters, numbers, symbols, shapes, and further even drawings and photographs, superimposed on the broadcast video (also known as being "burnt in") fall under this term. For example, in a sports broadcast, headlines, photographs of players, team logos, scores, stats, player formations, computer graphics, and so on, which have been superimposed on the broadcast video, are all called "superimposed text" in the present Specification.

In the same way, "captions" are not restricted to text alone, although technological restrictions of the art in the current state, and various standards applied to broadcasting in practical use, might have to be taken into consideration.

Ultimately, usage of captions and superimposed text in a program being presented all serves to facilitate further comprehension of the program by the viewer, and in that sense are both elements of information, but are handled and processed in different manners as will be appreciated from the following description, so the above definitions and distinctions should be kept in mind.

First Embodiment

First, a first embodiment of the present invention will be described with reference to FIGS. 1 through 27. With the information presenting device according to the present invention, in addition to current information to be played so as to view while predicting how the content will develop, future information (video) is also presented on a screen beforehand. At this time, content elements (images, captions, etc.) are also placed in a virtual space, and video presentation is performed which incorporates natural physical motion as well as facilitating correlation between the contents placed in the space, thereby reducing the load on the mind and eyes of the viewer while aiding comprehension of the contents. With the present invention, a metaphor of images of scenery as seen moving through a car windshield is used for the natural physical motion, and it is in accordance with this metaphor that video is presented. Note that in the following description, a television broadcast program (hereinafter referred to simply as "program") will be described as an example of a content, but the present invention is not restricted to this example.

FIG. 1 is a diagram for describing scenery viewed from the windshield of a car. Description will be made regarding what is viewed when driving a car, with reference to FIG. 1. When driving a car, the driver drives the moving car while visually checking the road 2L and 2R, traffic signs 4a and 4b, and roadside trees 4a and 4b, which can be seen through a windshield 1. At this time, it is necessary for the driver to instantaneously process a great amount of spatially-scattered information in parallel, while proceeding in the forward direction 5. Such processing of a great amount of information instantaneously and in parallel is like a case of understanding the video of a program displayed on a screen.

However, while a person may become easily fatigued viewing a program for a long time, the same person can drive a car for a relatively long period of time without becoming fatigued very much. A factor in this difference can be thought to be in the difference in visual information being processed. That is to say, humans are not readily fatigued in processing visual information of a natural physical motion, as with the case of driving a car, but with cases of processing very man-made and unnatural visual information such as multiple programs being presented at once, the mind is easily fatigued due to the great load. In accordance with this idea, it can be expected that converting multiple program video images into "video images following natural physical motion" can reduce the fatigue on the viewer.

Now, a technique for converting a program video into "video images following natural physical motion" will be described with reference to the summarized display example in FIG. 2. With the proposed conversion technique, first, the similarity between "program viewing" and "car driving" is used to set a direction of progression DC of a camera viewpoint in virtual space. Next, a list of thumbnail images Im0 through Imn of the program video are placed at a portion corresponding to the "road", and caption images C0 and C1 are placed in portions corresponding to the "traffic signs", with the video image being presented such that the camera viewpoint appears to move forward (the distance in the virtual space. That is to say, this technique of video presentation involves viewing programs while moving through a virtual space). Thus, the viewer can comprehend the elements of the program (video) as being visual information of natural physical motion, and a video presentation with little burden on the mind can be realized.

Figure 2:
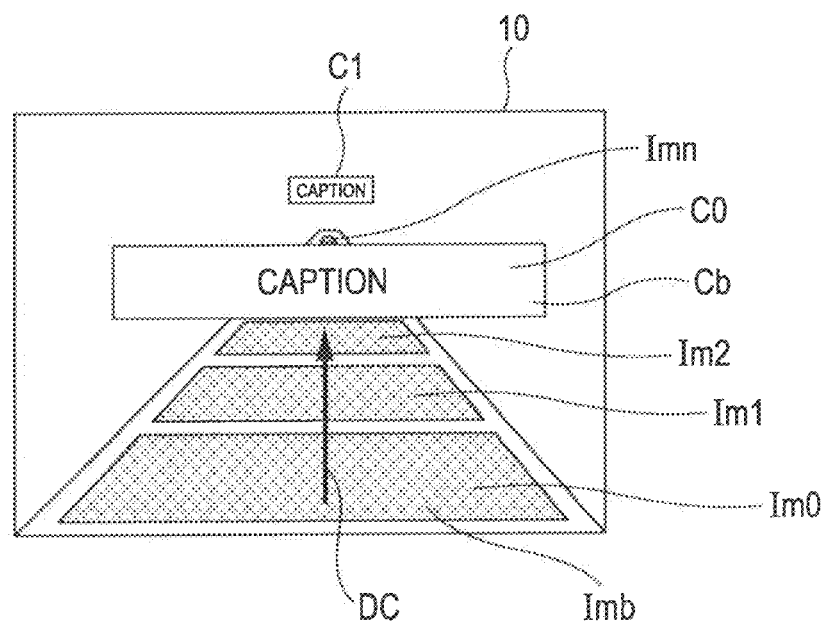
FIG. 2 is a diagram illustrating an overview of display according to a first embodiment of the present invention.
Figure 3:
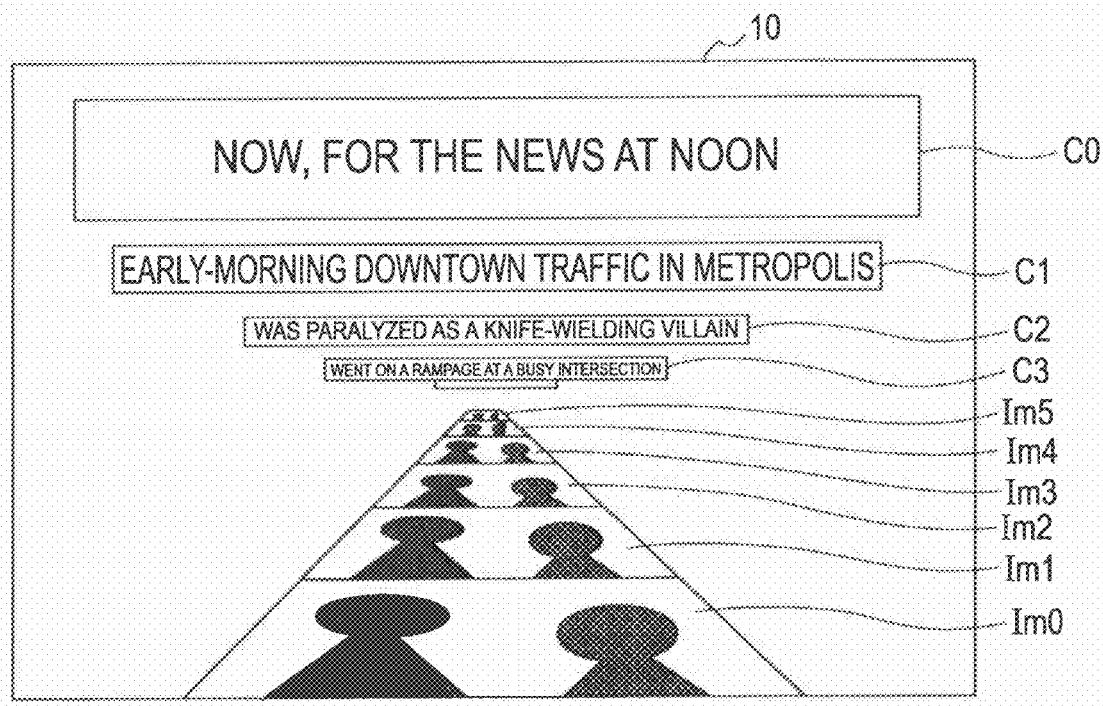
FIG. 3 is a diagram illustrating a display example of program video according to the first embodiment.

FIG. 3 is a diagram illustrating an example of applying the above-described conversion method to an actual television broadcast program. This is an example of displaying video of a news program where two news presenters are reading the news, with a list of thumbnail images Im0 through Im6 and caption images C0 through C3 moving from the deep side of the virtual space toward the near side, such that each image is displayed in time-sequence. The following is a description of a system for realizing such video resenting. Note that the symbols Imb and Cb in FIG. 2 denote the background color of the thumbnail images and caption images.

Figure 4:
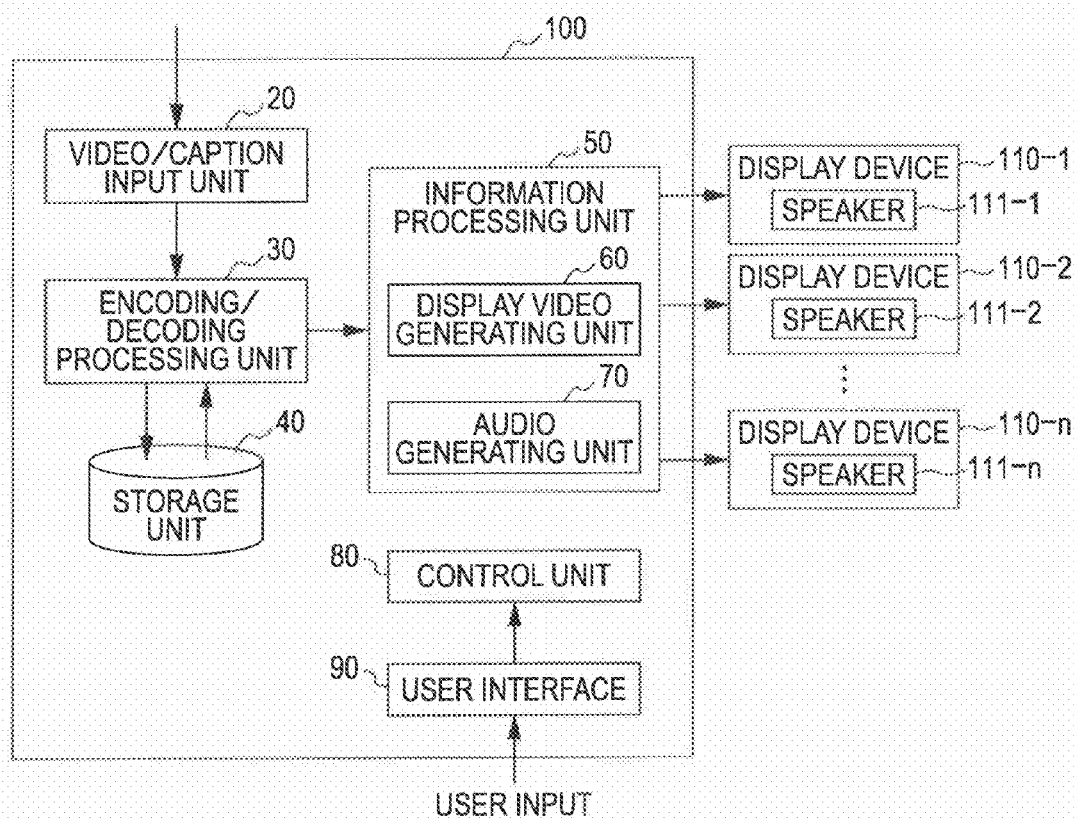
FIG. 4 is a block diagram illustrating an example of the internal configuration of a system according to the first embodiment.

FIG. 4 is a block diagram illustrating an example of the internal configuration of an information presenting device for realizing the above-described video presenting. An information presenting device 100 is configured including a video/caption input unit 20, an encoding/decoding processing unit 30, a storage unit 40, an information processing unit 50, a control unit 80, and a user interface 90.

The video/caption input unit 20 accepts input of video data, audio data, and metadata such as caption information and the like, and inputs to the information presenting device 100. The video data, audio data, and caption information and the like, are input from a tuner of a television receiver, a control unit controlling communication via a network, an interface portion as to a recording medium recording video contents, or the like, for example.

The encoding/decoding processing unit 30 encodes the video data, audio data, and caption information and the like, input from the video/caption input unit 20, which is then encoded and stored in a storage unit 40. The encoding/decoding processing unit 30 also reads out the video data, audio data, and caption information and the like, stored in the storage unit 40, which is then decoded, and the decoded video data, audio data, and caption information and the like, is then output to the information processing unit 50.

The storage unit 40 is configured of, for example, a HDD (Hard Disk Drive) or DVD (Digital Versatile Disc) or the like for example, and stores the video data, audio data, and caption information and the like, encoded by the encoding/decoding processing unit 30. One or multiple programs are stored in the storage unit 40, with the video of the programs being output to a display device following conversion to "video images following natural physical motion" at the information processing unit 50.

The information processing unit 50 is configured of a display video generating unit 60 and an audio processing unit 70. The display video generating unit 60 generates video data to be displayed on the display device (display images) using the video data and caption information read out from the storage unit 40, or the video data and caption information input via the video/caption input unit 20, and outputs to one or multiple devices. At this time, the display video generating unit 60 converts the video of the program stored in the storage unit 40 into "video images following natural physical motion". On the other hand, the audio processing unit 70 outputs audio data synchronized with video data output from the display video generating unit 60, to a display device. Details of the display video generating unit 60 and the audio processing unit 70 will be described later.

The control unit 80 is configured of an MPU (Micro Processing Unit) or the like, and performs control of the components of the information presenting device 100, setting of parameters at the time of video rendering by the display video generating unit 60, control of input/output at the user interface 90, and so forth.

Each of the display devices 110-1 through 110-4 are for displaying display screens based on video data sent form the information processing unit 50, with LCDs (Liquid Crystal Displays) or the like being applied.

Figure 5:
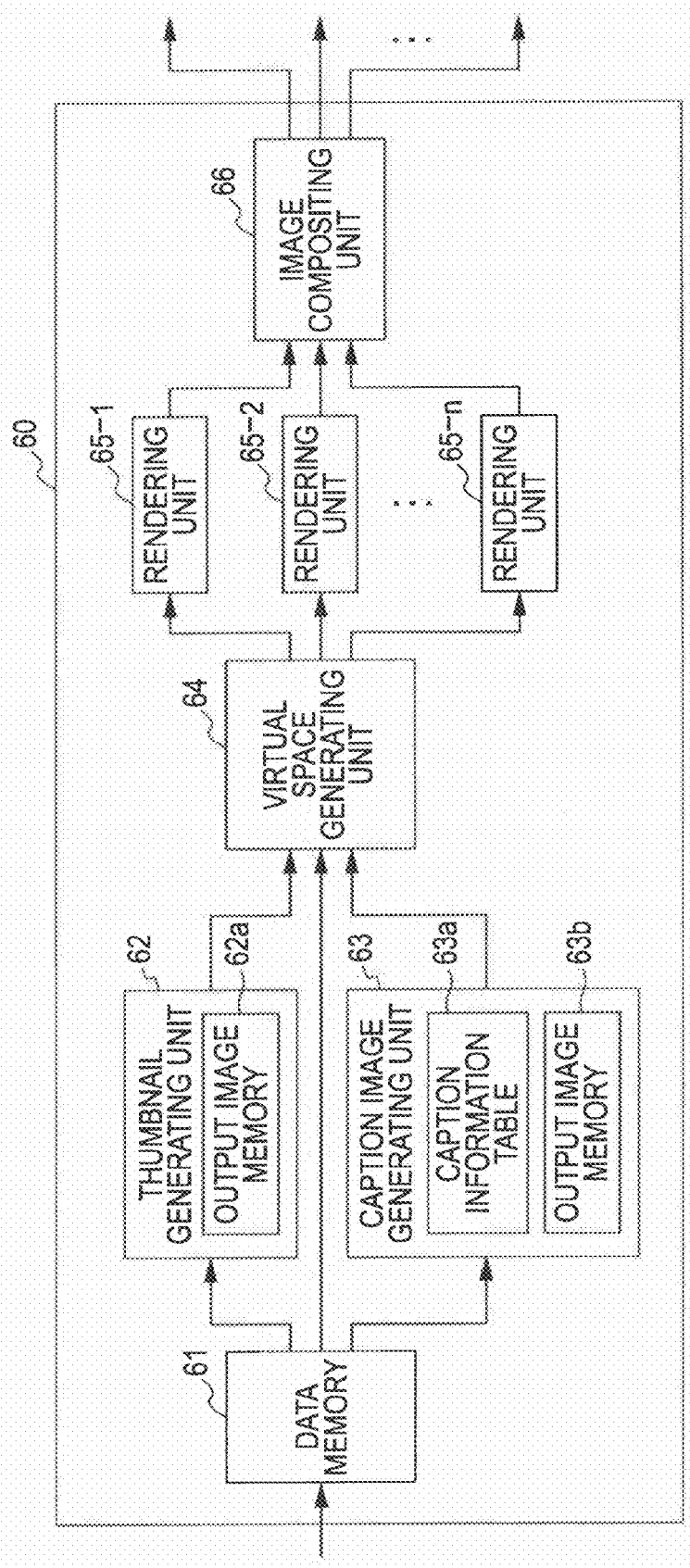
FIG. 5 is a block diagram illustrating an example of the internal configuration of a display video generating unit according to the first embodiment.

Next, an example of the internal configuration of the display video generating unit 60 will be described with reference to FIG. 5. The display video generating unit 60 is configured including data memory 61, a thumbnail generating unit 62 serving as a first image generating unit, a caption image generating unit 63 serving as a second image generating unit, a virtual space generating unit 64, rendering units 65-1 through 65-n (where n is a natural number), and an image compositing unit 66.

The data memory 61 is a region for temporarily storing the video data, audio data, and caption information and the like, read out from the storage unit 40, at the time of performing processing at the thumbnail generating unit 62, caption image generating unit 63, and virtual space generating unit 64, and is configured of semiconductor memory or the like.

The thumbnail generating unit 62 generates a list of thumbnail images to be displayed on the display screen of the display device in time-sequence, and outputs the list to the virtual space generating unit 64. Also, the thumbnail generating unit 62 includes output image memory 62a serving as a region for temporarily thumbnail images. Details of the thumbnail generating unit 62 will be described later.

The caption image generating unit 63 converts caption information input as metadata via the video/caption input unit 20 into a series of caption images, and outputs to the virtual space generating unit 64. The caption image generating unit 63 also has a caption information table 63a generated by sectioning the caption information according to the content of the captions and the time of emergence, and an output image memory 63b serving as a region for temporarily storing caption information to be used for generating caption images. The caption image generating unit 63 will be described in detail later.

The virtual space generating unit 64 structures a virtual space (3D model) using the list of thumbnail images supplied from the thumbnail generating unit 62 and the caption information supplied from the caption image generating unit 63, and outputs this as 3D data. Details of a method for structuring a virtual space will be described later.

The rendering units 65-1 through 65-n set cameras (viewpoints) at predetermined positions in the virtual space structured by the virtual space generating unit 64, and generates and outputs images to be displayed on the screen of the display device.

The image compositing unit 66 composites the images output from each of the rendering units 65-1 through 65-n, and generates a display image for displaying on the display devices 110-1 through 110-n. Also, in the event of receiving an instruction to the effect of not performing image compositing, the image compositing unit 66 outputs the image supplied from the rendering units to the corresponding display devices.

Figure 6:
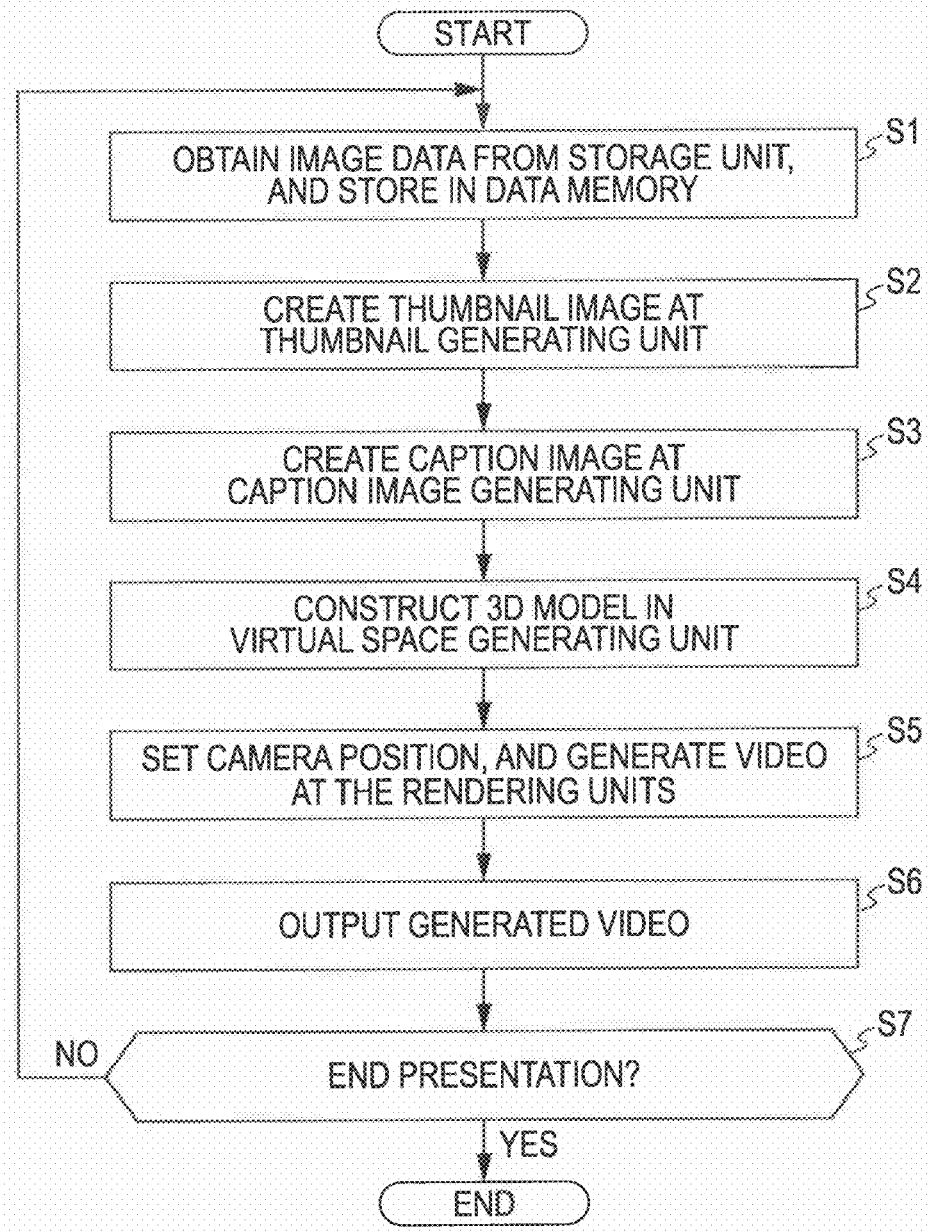
FIG. 6 is a flowchart illustrating an example of the processing of the display video generating unit according to the first embodiment.

An example of display video generating processing with the display video generating unit 60 configured in this way will be described with reference to the flowchart in FIG. 6. In step S1, the display video generating unit 60 first obtains data for generating thumbnail images and caption images from the storage unit 40 (see FIG. 4), and stores the obtained data in the data memory 61.

Next, in step S2, the thumbnail generating unit 62 generates a list of thumbnail images (output image) using the data stored in the data memory 61, and outputs this to the virtual space generating unit 64.

In step S3, the caption image generating unit 63 generates a caption image using the data stored in the data memory 61, and outputs this tot the virtual space generating unit 64.

Next, in step S4, the virtual space generating unit 64 constructs a virtual space (3D model) based on the list of thumbnail images generated by the thumbnail generating unit 62 and caption image generated by the caption image generating unit 63.

Further, in step S5, each of the rendering units 65-1 through 65-n set cameras (viewpoints) in the virtual space constructed by the virtual space generating unit 64, and generate 3D graphics images which are output.

In step S6, the graphics images supplied from the rendering units 65-1 through 65-n are composited as appropriate at the image compositing unit 66, and a display image generated by compositing is output to each of the display devices 110-1 through 110-n. Alternatively, the 3D graphics images supplied from each of the rendering units 65-1 through 65-n may be output to corresponding display devices from the display devices 110-1 through 110-n via the image compositing unit 66, as display images.

Finally, in step S7, determination is made by the control unit 80 regarding whether or not to end presenting of the image, i.e., regarding whether or not input of the video data has ended or there has been an instruction to end presenting of the video. In the event of ending presenting of the video, the series of processing ends. In the event that presenting of the video is continuing, the flow returns to step S1 and processing further continues.

Next, the thumbnail generating unit 62 will be described in detail with reference to FIGS. 7 and 8. The thumbnail generating unit 62 generates thumbnail images, one at a time (one frame at a time) from the input video data, at predetermined intervals.

Figure 7:
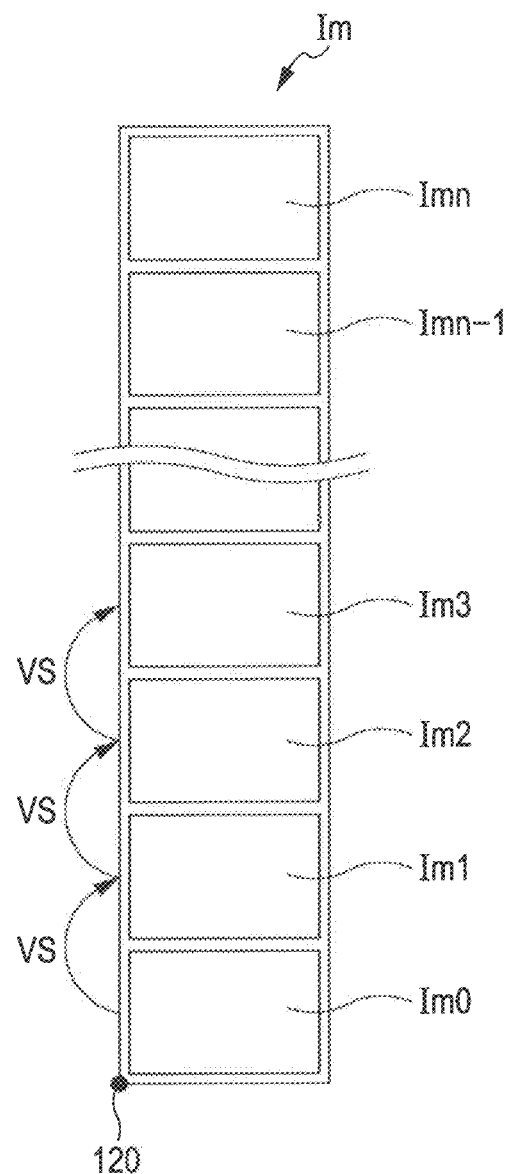
FIG. 7 is a diagram for describing thumbnail images according to the first embodiment.

FIG. 7 is a schematic diagram illustrating the configuration of thumbnail images output from the thumbnail generating unit 62. In the example shown in FIG. 7, an output image Im, which is a list of thumbnail images, is arranged such that thumbnail images Im0 through Imn in temporal intervals of S are at vertical intervals VS starting at an origin 120. In FIG. 7, V (pixels/sec) represents the velocity of a later-described rendering camera (viewpoint), converted into increments of pixels. Also, S represents the thumbnail time interval.

At this time, if the adjacent thumbnail images are in contact with each other, the thumbnail images appear to be seamless and will be extremely hard to view. Accordingly, the length (in pixels) of the vertical direction (direction of motion of the viewpoint) of the thumbnail images actually placed at the thumbnail image positions of the output image Im should be such that has a predetermined margin (gap) as to adjacent thumbnail images. Accordingly, the length of the placed thumbnail images in the direction of motion of the viewpoint is preferably shorter than the vertical interval VS.

Note that an appropriate thumbnail time interval may be fixed beforehand, such as 10 seconds, for example, or a thumbnail time interval which the viewer desires may be selected by user input to the user interface 90. With this arrangement, the viewer can display thumbnail images at a desired time interval, so information presented in accordance with the information obtaining capabilities of the viewer can be efficiently obtained.

Figure 8:
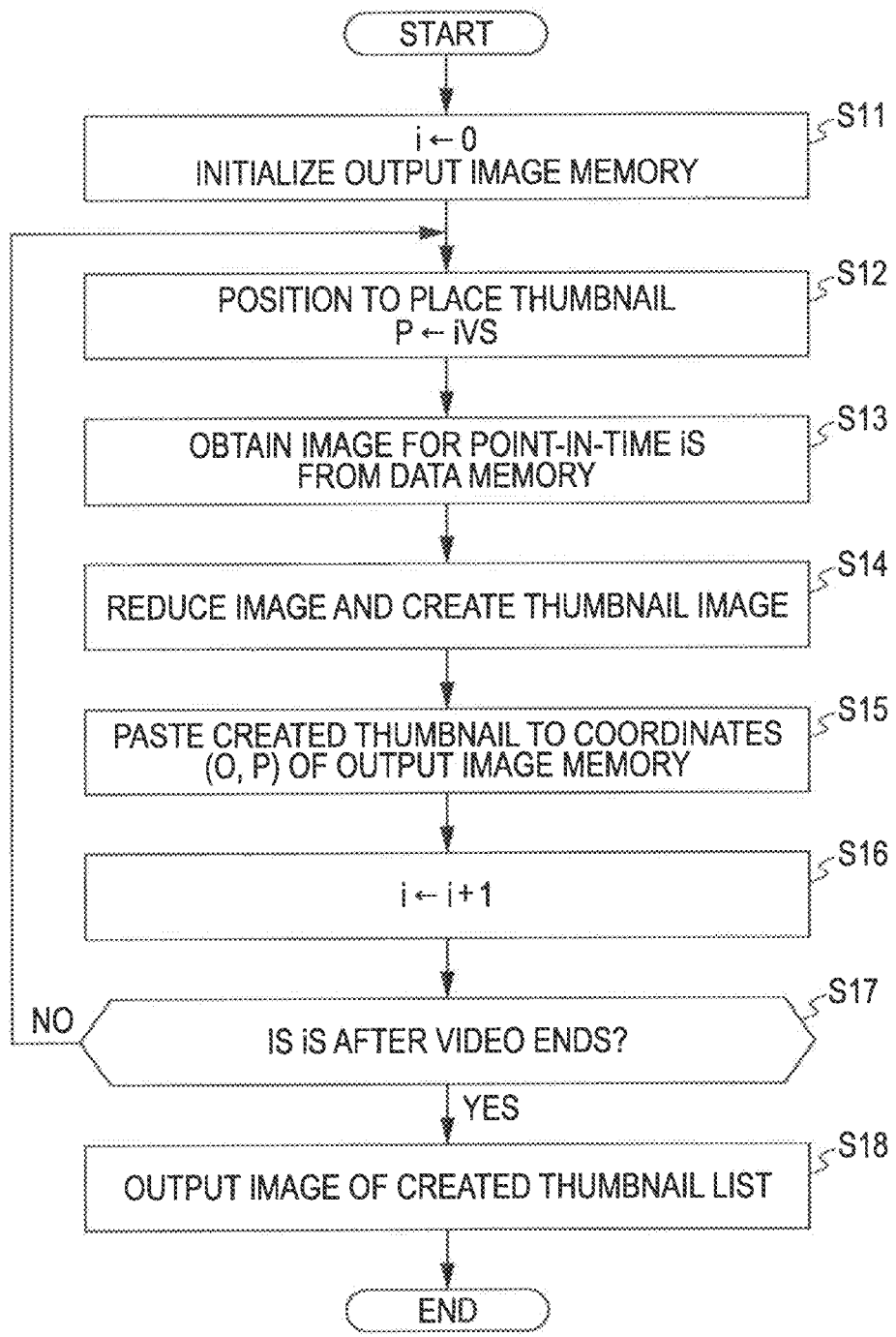
FIG. 8 is a flowchart illustrating an example of the processing of a thumbnail generating unit according to the first embodiment.

FIG. 8 illustrates an example of thumbnail image generating processing with the thumbnail generating unit 62 in the form of a flowchart.

In step S11, the thumbnail generating unit 62 first performs initialization in which the serial No. i of the thumbnail images of the output image Im is set to 0, and the output image memory 62a is initialized applying the background color Imb of the display image 10 (see FIG. 2). After this processing ends, the flow proceeds to the processing in step S12.

In step S12, the thumbnail generating unit 62 calculates the placement position Pi of the thumbnail image with the serial No. i (where i is an integer of 0 or greater). The placement position Pi can be represented by the following expression.

$$Pi = iVs$$

As can be understood from this calculation expression, the placement position Pi represents the distance form the origin 120, and more specifically is the distance between the lower edge of the thumbnail image with the serial No. i and the origin 120 (see FIG. 7). In the event that i=0, this means that the placement position P0=0, which agrees with the origin 120. After this processing ends, the flow proceeds to the processing in step S13.

In step S13, the thumbnail generating unit 62 obtains an image corresponding to the point-in-time iS from a reference point-in-time of the video data stored in the data memory 61 (i.e., time elapsed from starting of playing). Note that in the event that i=0, the point-in-time iS=0, so there is no corresponding image. Accordingly, in such a case, an image at a time far shorter that the thumbnail image interval from the reference point-in-time (play start), i.e., an image 1.2 seconds later, for example, may be obtained. After this processing ends, the flow proceeds to the processing in step S14.

In step S14, the thumbnail generating unit 62 creates a thumbnail image by reducing the size of the obtained image. After this processing ends, the flow proceeds to the processing in step S15.

In step S15, the thumbnail generating unit 62 pastes the created thumbnail image to a position equivalent to the coordinates (O, P) of the output image Im of the output image memory 62a. That is to say, the thumbnail generating unit 62 pastes the created thumbnail image such that the lower left apex of the thumbnail image at the point-in-time iS that has been created overlays the corresponding coordinates of the output image Im (the lower left apex of a thumbnail image Imi at the placement position Pi). For example, in the event that i=0, the lower left apex of the obtained thumbnail image is matched with the position of the coordinates (0, 0) of the output image Im at the time of pasting. After this processing ends, the flow proceeds to the processing in step S16.

In step S16, following pasting of the thumbnail image to the i'th placement position Pi from the head (origin 120 side) of the output image Im, the thumbnail generating unit 62 increments the serial No. i by 1. That is to say, the thumbnail generating unit 62 pastes the a thumbnail image to a placement position Pi+1 which is the i+1'th from the head of the output image Im. For example, if the serial No. is i=0, i is increment 1 so the serial No. is then 1. After this processing ends, the flow proceeds to the processing in step S17.

In step S17, the thumbnail generating unit 62 determines whether or not the point-in-time iS is a point-in-time following ending of the play time of the video data stored in the data memory 61. In the event that the point-in-time iS is a point-in-time following ending of the play time, the flow advances to the processing in step S18. On the other hand, in the event that the point-in-time iS is not a point-in-time following ending of the play time, i.e., there is play time left, the flow returns to the processing in step S12, and the above processing of steps S12 through S17 is repeated. Such processing is repeated until reaching serial No. i=n, whereby the output image Im with a list of thumbnail images pasted thereto, is created, and stored in the output image memory 62a.

In the final step S18, the thumbnail generating unit 62 outputs the output image Im stored in the output image memory 62a to the virtual space generating unit 64. Following this processing, the thumbnail generating processing ends.

Note that with the example of the present embodiment, the output image Im is the one row (one lane) shown in FIG. 7, but in the case of simultaneously displaying the video of multiple programs using one or multiple display devices as described later, the processing of the flowchart in FIG. 8 can be applied to multiple programs. That is to say, multiple output images are generated corresponding to the number of programs to be displayed.

Next, the caption image generating unit 63 will be described in detail with reference to FIGS. 9 through 11. The caption image generating unit 63 operates by obtaining caption information from the data memory 61 where video data is stored, one at a time, and converting the contents of the captions into images.

FIG. 9 is a diagram illustrating an example of the configuration of the caption information table 63a provided within the caption image generating unit 63. The caption information table 63a shows all caption information included as metadata in one program, for example, having been sectioned into individual caption sets, with each sectioned caption set being shown with a display start point-in-time Ts, display end point-in-time Te, and the content of the caption. The display start point-in-time Ts and display end point-in-time Te are indicated in terms of seconds elapsed from starting of the content, which is a program or the like. The caption No. is a serial No. assigned in order to the caption sets, starting from the earliest in display start time.

In the example shown in FIG. 9, caption No. 0 shows information regarding the caption set starting with "NOW, FOR THE NEWS AT NOON". From the information shown here, we can see that this caption is displayed on screen at the point 1.2 seconds following starting of the program (display start point-in-time Ts), and display thereof ends at the point 5.5 seconds following starting of the program (display end point-in-time Te). The caption information displayed next is registered as caption No. 1. As for this caption No. 1, the display start point-in-time Ts is 7.3 seconds, the display end point-in-time Te is 12.1 seconds, and the content of the caption is "EARLY-MORNING DOWNTOWN . . . ". That is to say, the caption set starting with "EARLY-MORNING DOWNTOWN . . . " is displayed from the point at which 7.3 seconds has elapsed from the point of starting of the program, to the point 12.1 seconds therefrom.

Note that the time interval or display time of the caption image may be made selectable to that desired by the viewer, by user input to the user interface 90. In this case, the viewer can display the caption image at a desired time interval or display time, so information presented in accordance with the information obtaining capabilities of the viewer can be efficiently obtained.

FIG. 10 illustrates an example of caption images generated based on the caption information in the caption information table 63a shown in FIG. 9. The caption image generating unit 63 generates one caption image (one frame) for each caption set. The caption images correspond to the serial Nos. of the caption information, such as caption image 0, 1, 2, and so on. The image size of all caption images is fixed. On other words, the size (length) is the same regardless of whether the caption is lengthy or short, with a limit being paled on the length of the caption which can be displayed as one caption image. Providing such a limit prevents the captions from becoming too long, and also the viewer can view images suitably and efficiently.

Figure 11:
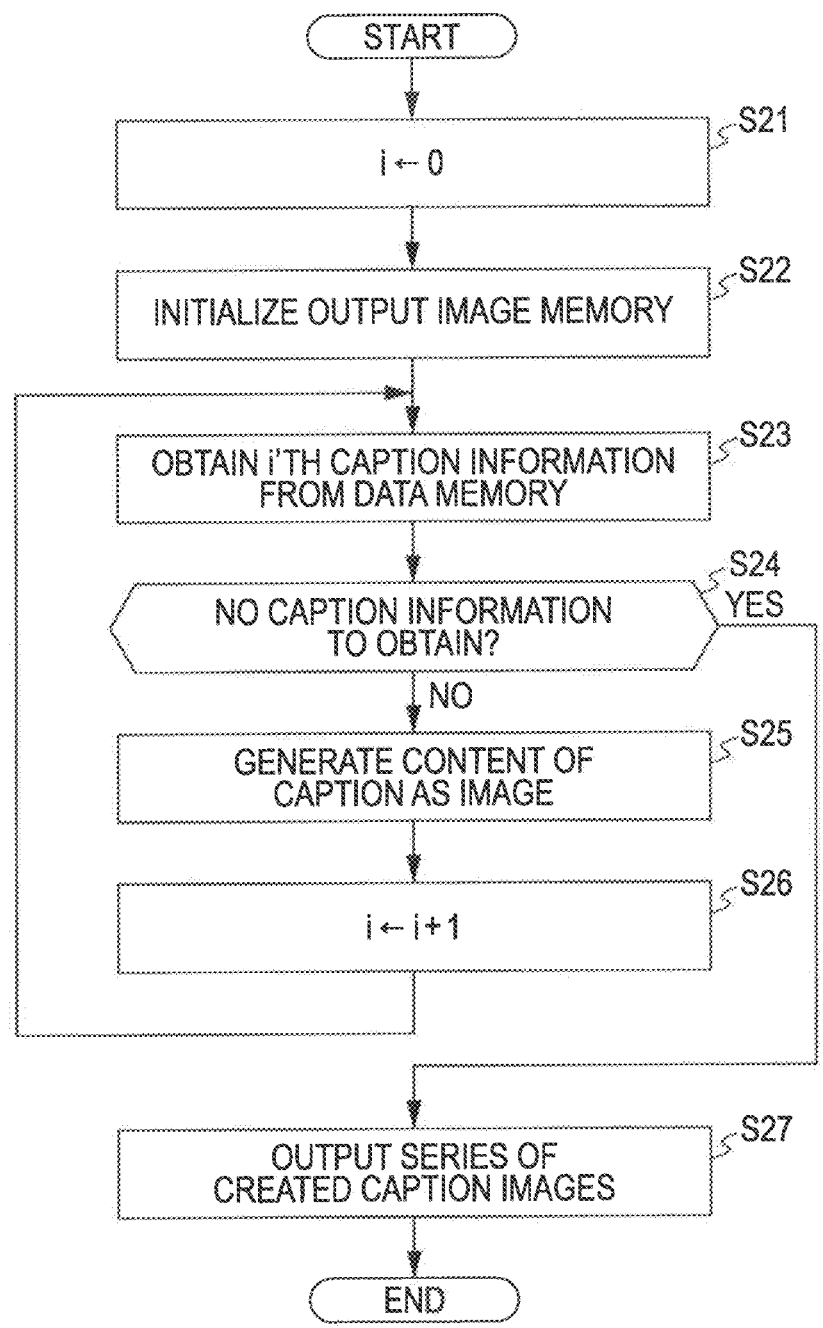
FIG. 11 is a flowchart illustrating an example of the processing of a caption image generating unit according to the first embodiment.

FIG. 11 illustrates a flowchart of an example of caption image generating processing by the caption image generating unit 63. In step S21, the caption image generating unit 63 first sets the serial No. i of the caption to be handled, to 0. After this processing ends, the flow proceeds to the processing in step S22.

In step S22, the caption image generating unit 63 initializes the output image memory 63a to an arbitrary color, transparent for example. After this processing ends, the flow proceeds to the processing in step S23.

In step S23, the caption image generating unit 63 obtains the i'th caption information from the video data stored in the data memory 61. That is to say, the i'th caption information is obtained from the caption information table shown in FIG. 9. For example, in the case of the serial No. i=0, caption information of the content "NOW, FOR THE NEWS AT NOON" of the caption No. 0 is extracted and saved in the output image memory 63b. After this processing ends, the flow proceeds to the processing in step S24.

In step S24, the caption image generating unit 63 determines whether or not there is caption information remaining that should be obtained. In the event that determination is made that there is caption information remaining that should be obtained, the flow proceeds to the processing in step S25. On the other hand, in the event that determination is made that there is no caption information remaining that should be obtained, the flow proceeds to the processing in step S27. For example, in the case of the serial No. i=0, determination is made that is caption information remaining that should be obtained, and the flow proceeds to the processing in step S25.

In step S25, the caption image generating unit 63 generates the content of the caption in the caption information of the corresponding serial number as an image, i.e., a caption image. After this processing ends, the flow proceeds to the processing in step S26.

In step S26, the caption image generating unit 63 increments the object serial No. i by 1. That is to say, the serial No. of the caption information extracted from the caption information table is incremented by 1. For example, in the event that the serial No. i=0, this is incremented by 1 to 1. Following this processing ending, the flow proceeds to the processing in step S23, and the processing of steps S23 through S26 is repeated. Such procedures are repeated until the serial No. i=n, whereby the series of caption images 0 through n are stored in the output image memory 63a.

In the final step S27, upon determining in the determination processing in step S24 that there is no more caption information to be obtained, the caption image generating unit 63 outputs the series of caption images 0 through n stored in the output image memory 63b to the virtual space generating unit 64. After this processing ends, the caption image generating processing ends.

Note that in the event that information such as speaker ID or the like, whereby a person speaking can be identified, is included in the caption information, the color of the caption may be changed in accordance with the speaker, or the like.

Also, an arrangement may be made wherein a caption button is provided as a user interface to the information presenting device proper or a remote controller thereof, for example, such that the caption image generating unit 63 operates only in cases of the viewer pressing the caption button, so that the caption image is displayed. In the event of using an arrangement such as a caption button so that display of the caption image can be switched on/off, the viewer can switch the viewing state in accordance with his/her own state. For example, a usage can be conceived where a user would switch the caption images off when desiring to concentrate on a movie, or the like.

Also, with the present embodiment, the output image Im shown in FIG. 7 is one row (one lane), but in the case of simultaneously displaying video of multiple programs (contents) using one or multiple display devices as described later, the processing shown in the flowchart in FIG. 11 is applied to each caption information correlated to video of multiple programs. That is to say, multiple caption images, each made up of a series of captions, are generated corresponding to the number of programs to be displayed.

Further, with the present embodiment, caption images are generated from caption information correlated with images included in the video data, but the present invention is not restricted to this arrangement. For example, superimposed text, faces of people in the program, PiP (Picture in Picture) images, for example, may be displayed as sub-images. Techniques for detecting superimposed text, faces, and PiP, will be described later.

Figure 12A:
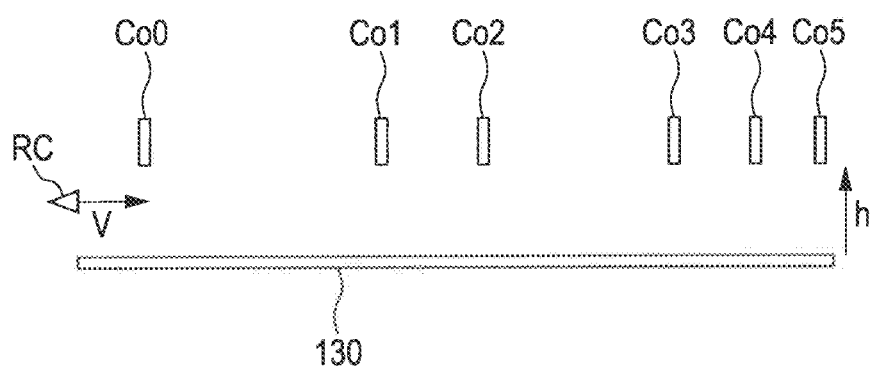
Figure 12B:
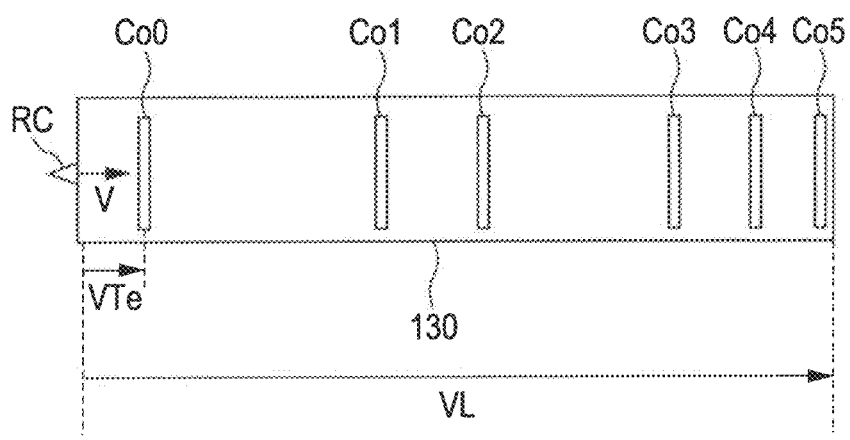
Figure 13:
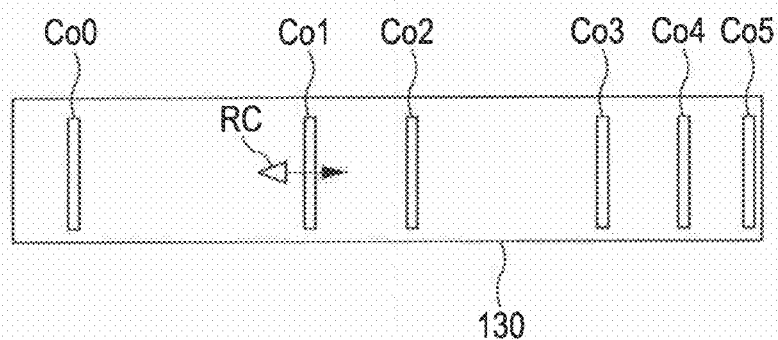
FIG. 13 is a diagram illustrating a second 3D model of virtual space according to the first embodiment.
Figure 14:
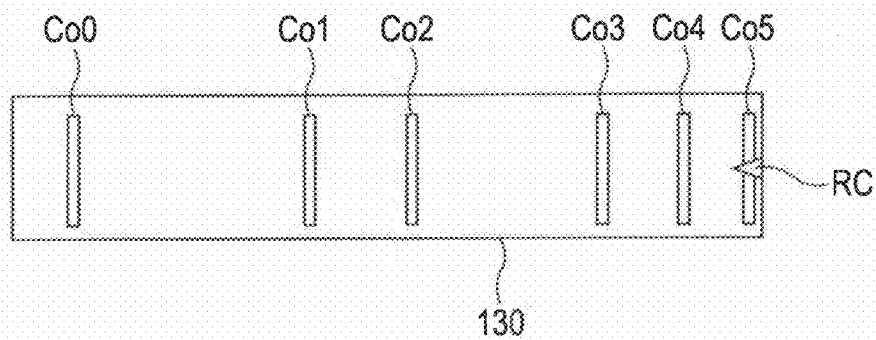
FIG. 14 is a diagram illustrating a third 3D model of virtual space according to the first embodiment.

The virtual space generating unit 64 will be described in detail with reference to FIGS. 12A through 15. First, the virtual space constructed by the virtual space generating unit 64 will be described in brief with reference to FIGS. 12A through 14. FIGS. 12A and 12B are diagrams illustrating an example of a 3-dimensional model (hereinafter referred to as "3D model") of a virtual space in a case of the camera being at a start point (play start position), wherein FIG. 12A is a side view, and B is a top view. FIG. 13 is a diagram illustrating an example of the 3D model of virtual space following elapsing of a predetermined amount of time after the state shown in FIGS. 12A and 12B, and FIG. 14 is a diagram illustrating an example of the 3D model of virtual space after the camera arriving and the end point (play end position).

Virtual space is made up of one "thumbnail display object" and multiple "caption display objects" per each program (content). A "thumbnail display object" is made up of the output image Im (see FIG. 7), and a "caption display object" is made up of a caption image (see FIG. 10). In correlation with FIG. 1, the "thumbnail display object" corresponds to the "road", and the "caption display objects" correspond to the "traffic signs".

As shown in FIGS. 12A and 12B, with the temporal length of the video of the program as L, the length of the thumbnail display object 130 is VL. Here, V represents the velocity (pixels/sec) of the rendering camera (hereinafter referred to as "camera") RC. The caption display objects Co0 through Co5 are placed in order at positions VTe based on the display end point-in-time Te of each, such that the point-in-time of the camera RC passing under the relevant caption display object, and the display end time Te of the caption agree. Note that with the example of the present embodiment, the distance (height) from the thumbnail display object 130 to the lower side (lower edge) of the caption display objects Co0 through Co5 is represented by the symbol h. In the example shown in FIGS. 12A and 12B, the camera RC is at the start point, so the caption display object Co0 appears the closest and the first in line.

With the example shown in FIG. 13, a state is illustrated wherein the camera RC is moving in the direction toward the end point, and has passed the caption display object Co0 and is situated just short of the caption display object Co1.

With the example shown in FIG. 14, a state is illustrated wherein the camera RC has further moved from the state shown in FIG. 13 as a result of continuing playing operations, and has reached the end of the virtual space. Upon the camera RC reaching the end point, display of the thumbnail display object 130 and the caption display objects Co0 through Co5 ends. Note that in the example shown in FIGS. 12A through 14, the number of the caption display objects is the six of the caption display objects Co0 through Co5, but the present invention is not restricted to this example.

Figure 15:
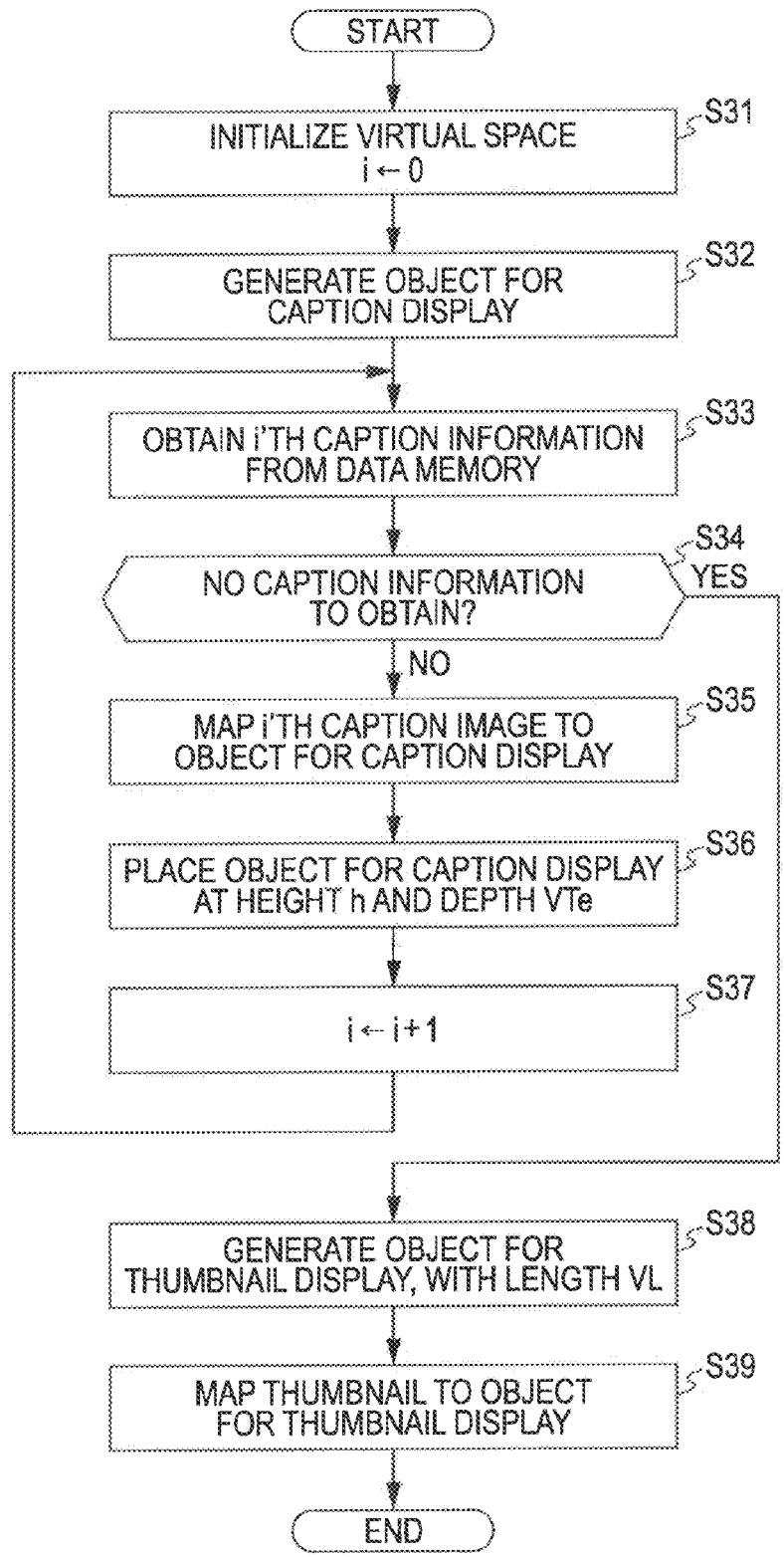
FIG. 15 is a flowchart illustrating a processing example of a virtual space generating unit according to the first embodiment.

An example of processing for generating a virtual space with the virtual space generating unit 64, in order to create the above-described virtual space, will be described with reference to the flowchart shown in FIG. 15.

In step S31, the virtual space generating unit 64 first initializes the virtual space by setting the object serial No. i to 0. After this processing ends, the flow proceeds to the processing in step S32.

In step S32, the virtual space generating unit 64 generates a caption display object (see FIGS. 12A through 13) corresponding to each of the caption images supplied from the caption image generating unit 63. After this processing ends, the flow proceeds to the processing in step S33.

In step S33, the virtual space generating unit 64 obtains the i'th caption information from the video data stored in the data memory 61. In the event that i=0 for example, caption information with the content of "NOW, FOR THE NEWS AT NOON" (see FIGS. 9 and 10) is extracted. After this processing ends, the flow proceeds to the processing in step S34.

In step S34, the virtual space generating unit 64 determines whether or not there is caption information remaining to be obtained. In the event that determination is made that there is caption information remaining to be obtained, the flow proceeds to the processing in step S35. On the other hand, in the event that determination is made that there is no caption information remaining to be obtained, the flow proceeds to the processing in step S38. In the event that the serial No. i=0 for example, determination is made that there is still caption information to be obtained, so the flow proceeds to the processing in step S35.

In step S35, the virtual space generating unit 64 maps the caption image of the serial No. i received from the caption image generating unit 63, as texture on the face of the caption display object generated in the processing in step S32. The caption image with the serial No. i corresponds to the time elapsed (play time) from the point of starting playing of the video data. In the event that the serial No. i=0 for example, the caption image C0 with the content of "NOW, FOR THE NEWS AT NOON" which is caption No. 0, is mapped on the face of the caption display object. After this processing ends, the flow proceeds to the processing in step S36.

In step S36, the virtual space generating unit 64 further places the caption display object on the surface of which the caption image has been mapped, at a height h within the virtual space, and a depth VTe based on the display end point-in-time Te of the caption information (see FIGS. 12A and 12B). In the event that the serial No. i=0 for example, the caption display object Co0 is placed at the position shown in FIG. 12B. After this processing ends, the flow proceeds to the processing in step S37.

In step S37, the virtual space generating unit 64 increments the object serial No. by 1. That is to say, the serial No. of caption information received from the data memory 61 is incremented by 1. For example, in the event that the serial No. i=0, this is incremented by 1 to 1. Following this processing ending, the flow proceeds to the processing in step S33, and the processing of steps S33 through S37 is repeated. Such procedures are repeated until the serial No. i=n, whereby the series of caption images 0 through n are mapped on the respective caption display objects.

In step S38, following determination having been made in the determination processing in step S34 that here is not more caption information remaining to be obtained, the virtual space generating unit 64 generates a thumbnail display object 130 (see FIG. 12B) based on the temporal length L of the program video and the motion velocity V of the camera RC. After this processing ends, the flow proceeds to the processing in step S39.

In step S39, the virtual space generating unit 64 maps the output image Im (see FIG. 7) including the list of thumbnail images received from the thumbnail generating unit 62, to the thumbnail display object 130 as texture. After this processing ends, the virtual space generating processing ends.

Thus, with the above-described processing, a thumbnail display object to which a list of thumbnail images of video data has been mapped as texture, and a virtual space including the thumbnail display object to which the list of thumbnail images of video data has been mapped as texture, is constructed.

Next, the rendering units 65-1 through 65-n will be described in detail with reference to FIGS. 16 and 17. The rendering units 65-1 through 65-n operate based on instructions from the control unit 80. For example, in the event that the number of programs displayed is one, the virtual space data is supplied to one rendering unit. In the event that two programs are to be displayed, the virtual space data is supplied to two rendering units. Details of a case wherein two or more programs are to be displayed will be described later. Note that since the configurations of the rendering units 65-1 through 65-n are the same, description will be given regarding the rendering unit 65-1 along, and description of other rendering units will be omitted.

Figure 16:
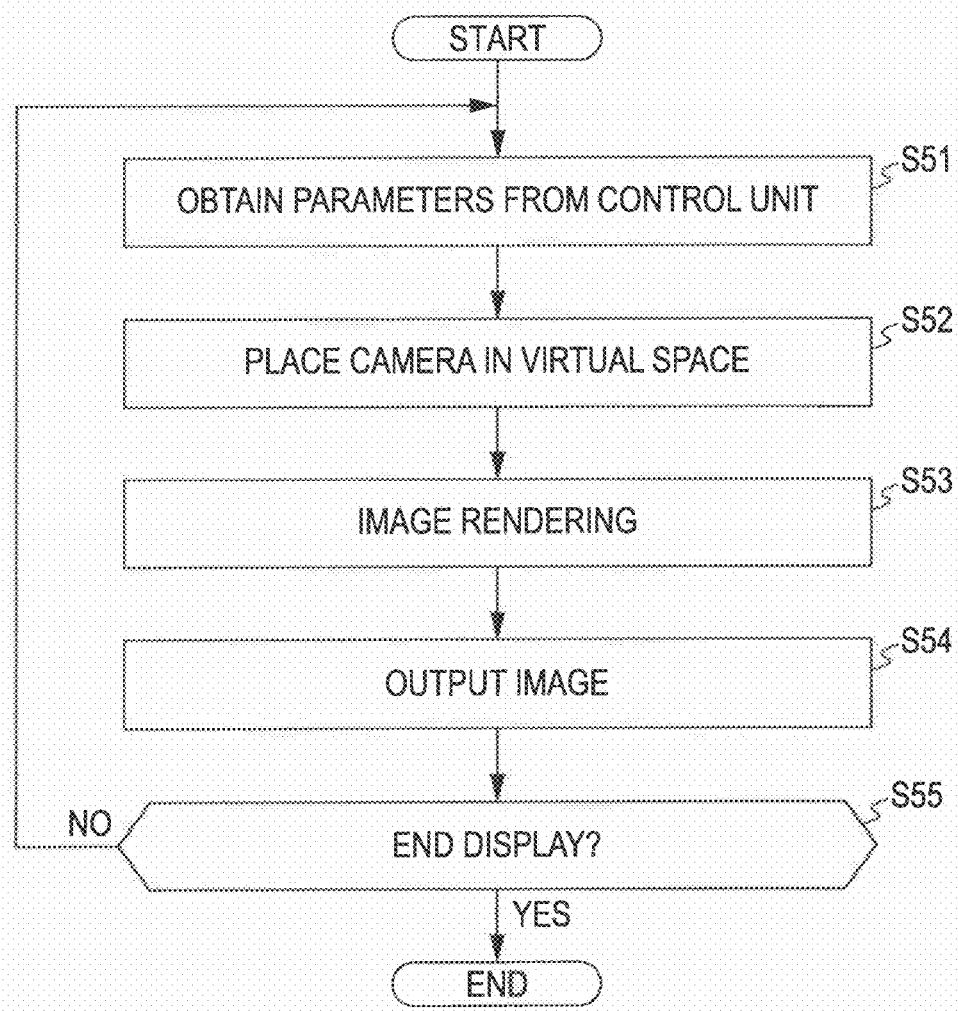
FIG. 16 is a flowchart illustrating an example of the processing of a rendering unit according to the first embodiment.
Figure 17:
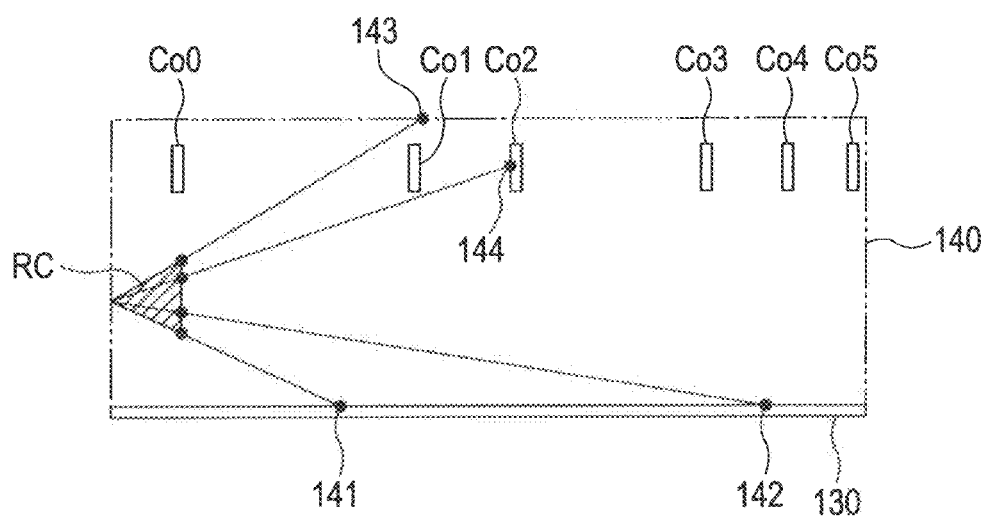
FIG. 17 is a diagram for illustrating an example of rendering according to the first embodiment.

FIG. 16 is a flowchart illustrating an example of rendering processing with the rendering unit 65-1. The flowchart in FIG. 16 will be described with reference to FIG. 17.

First, in step S51, the rendering unit 65-1 obtains parameters from the control unit 80. The parameters include setting values such as the type of program, start point-in-time and end point-in-time of the program, or play time, height of viewpoint (rendering camera RC), for example. After this processing ends, the flow proceeds to the processing in step S52.

In step S52, the rendering unit 65-1 places a camera RC (see FIG. 17) at a predetermined position in the virtual space generated in the virtual space generating unit 64, based on the parameters received from the control unit 80. After this processing ends, the flow proceeds to the processing in step S53.

In step S53, the rendering unit 65-1 performs rendering (projection processing) of the virtual space based on information obtained when observing the virtual space (3D world) from the camera RC, and draws this on a two-dimensional plane (display image). With the example shown in FIG. 17, examples of information observed by the camera RC within the virtual space 140 at a certain point include observation points 141 and 142 on the thumbnail display object 130 in the virtual space 140, observation point 143 on the ceiling portion of the virtual space 140, observation point 114 on the caption image of the caption display object Co2, and other such information. The information obtained on the projection plane is the scenery and objects (or a part thereof) which can be seen from the camera RC. In reality, rendering is performed using countless pieces of information observed by the camera RC. Rendering techniques for converting such a virtual space (world coordinate system) into a two-dimensional plane (viewpoint coordinates system) is available in the related art. After this processing ends, the flow proceeds to the processing in step S54.

In step S54, the rendering unit 65-1 outputs the obtained image to the image compositing unit 66. After this processing ends, the flow proceeds to the processing in step S55.

In step S55, the rendering unit 65-1 determines whether or not to end display of the program based on instruction from the control unit 80, i.e., whether or not input of the video data has ended or there has been instruction to end the video presentation. In the event that determination is made to not end, the flow returns to step S51, and the processing of steps S51 through S55 described above is repeated to continue display. On the other hand, in the event that determination is made to end the display, the rendering processing ends.

Next, the image compositing unit 66 will be described. The image compositing unit 66 operates based on instructions from the control unit 80. In the event that the number of programs to display is one for example, images received from one rendering unit are output to one display device. Also, in the event that two programs are to be displayed simultaneously on two display devices, images received from the respective rendering units are output to the respective display devices. On the other hand, in the event that two programs are to be displayed on the same display devices, an image wherein program images received from two rendering units are arrayed and formed into a display image, is generated, and the image is output to the single display unit. Cases of three or more programs can be processed with similar techniques. An example of displaying two or more programs will be described later.

With the embodiment described above, video presentation can be performed with the metaphor of viewing scenery from the windshield of a car, which is a moving object that performs natural physical movement. Specifically, on a screen, thumbnail images (main images) of a program (content) are placed on a thumbnail display object, corresponding to a road as viewed through the windshield, and caption images (sub-images) are displayed in caption display objects corresponding to traffic signs.

With this configuration, in addition to current information to be played (near images), future information (far images) can be presented on the screen beforehand, in time sequence. As a result, the viewer can view the program while seeing ahead (future main images and sub-images), and according can view the program while predicting how the program will proceed, thereby viewing the program in a relaxed manner.

Also, with the above-described present embodiment, video presentation using natural physical movement with the metaphor of viewing scenery from the windshield of a car, i.e., representation with natural flow of scenery, facilitates understanding of the program (content) by the user and also alleviates the load on the mind and eyes.

Also, with the above-described present embodiment, a display form has been employed where captions gradually come closer, thereby lessening the chance that the viewer will miss seeing a caption.

According to the above-described embodiment, elements (images, captions, etc.) of a program (content) are placed in a virtual space, and contents spatially placed are readily correlated, so even if two or more programs are displayed at the same time, there will be less confusion of the contents thereof.

First Modification of First Embodiment

Next, a first modification of the first embodiment of the present invention will be described with reference to FIGS. 18 through 23. In addition to caption information provided to video data of a program as metadata, information obtained from the video data can also be used as sub-images. This modification of the present embodiment is configured such that the display video generating unit of the image presenting device 100 can use superimposed text images, facial images, an inset image with PiP, or the like, instead of caption images generated at the caption image generating unit 63. Components in FIGS. 18 through 23 that are the same or equivalent to those in above-described drawings will be denoted with the same reference numerals, and detailed description thereof will be omitted.

Figure 18:
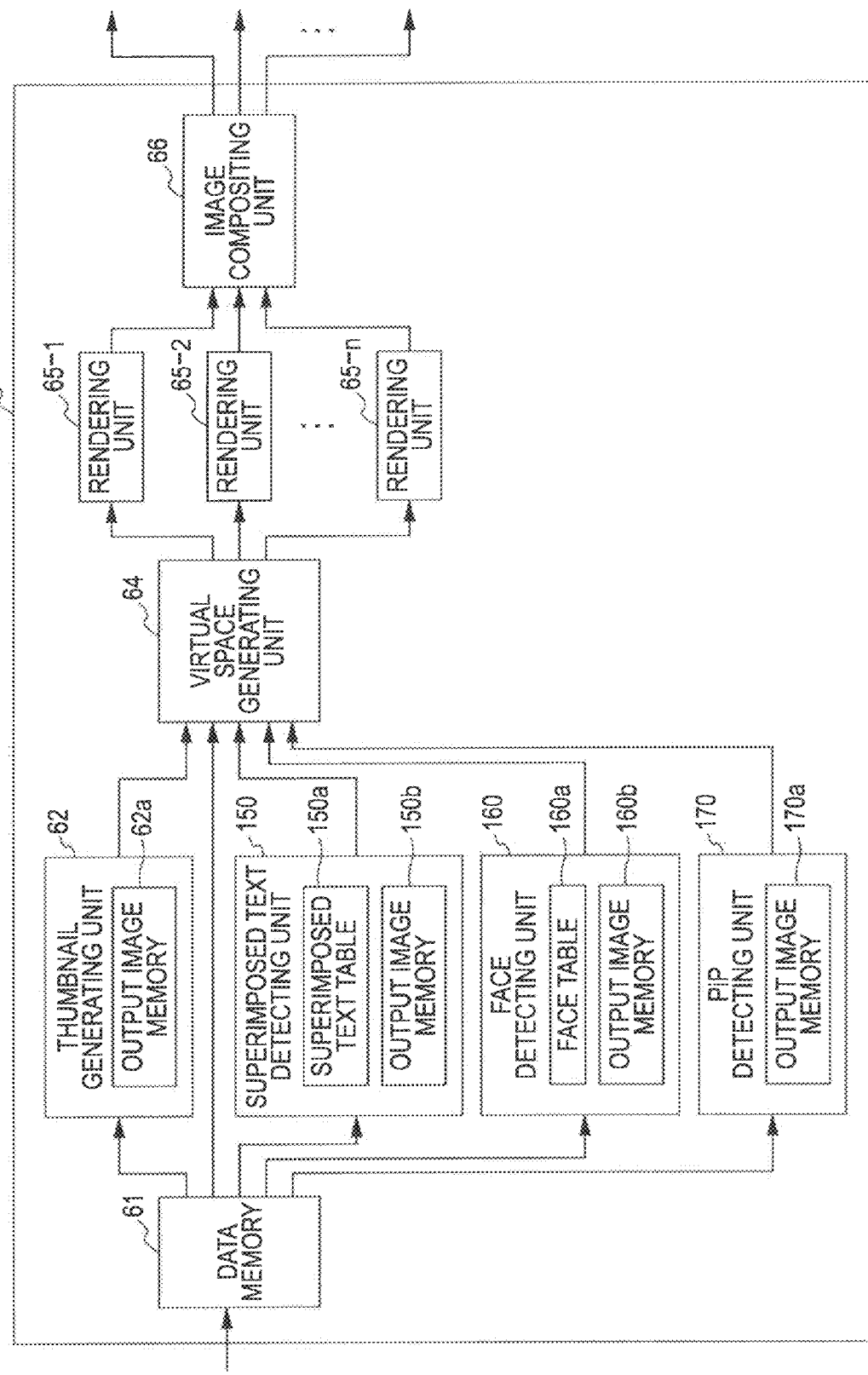
FIG. 18 is a block diagram illustrating another example of the internal configuration of the display video generating unit according to the first embodiment.

FIG. 18 is a diagram illustrating the internal configuration of a display video generating unit 60A in the first modification of the embodiment. The display video generating unit 60A has data memory 61, the thumbnail generating unit 62 serving as a first image generating unit, a superimposed text detecting unit 150 serving as a second image generating unit, a face detecting unit 160, a PiP detecting unit 170, the virtual space generating unit 64, the rendering units 65-1 through 65-n (where n is a natural number), and the image compositing unit 66.

Figure 19:
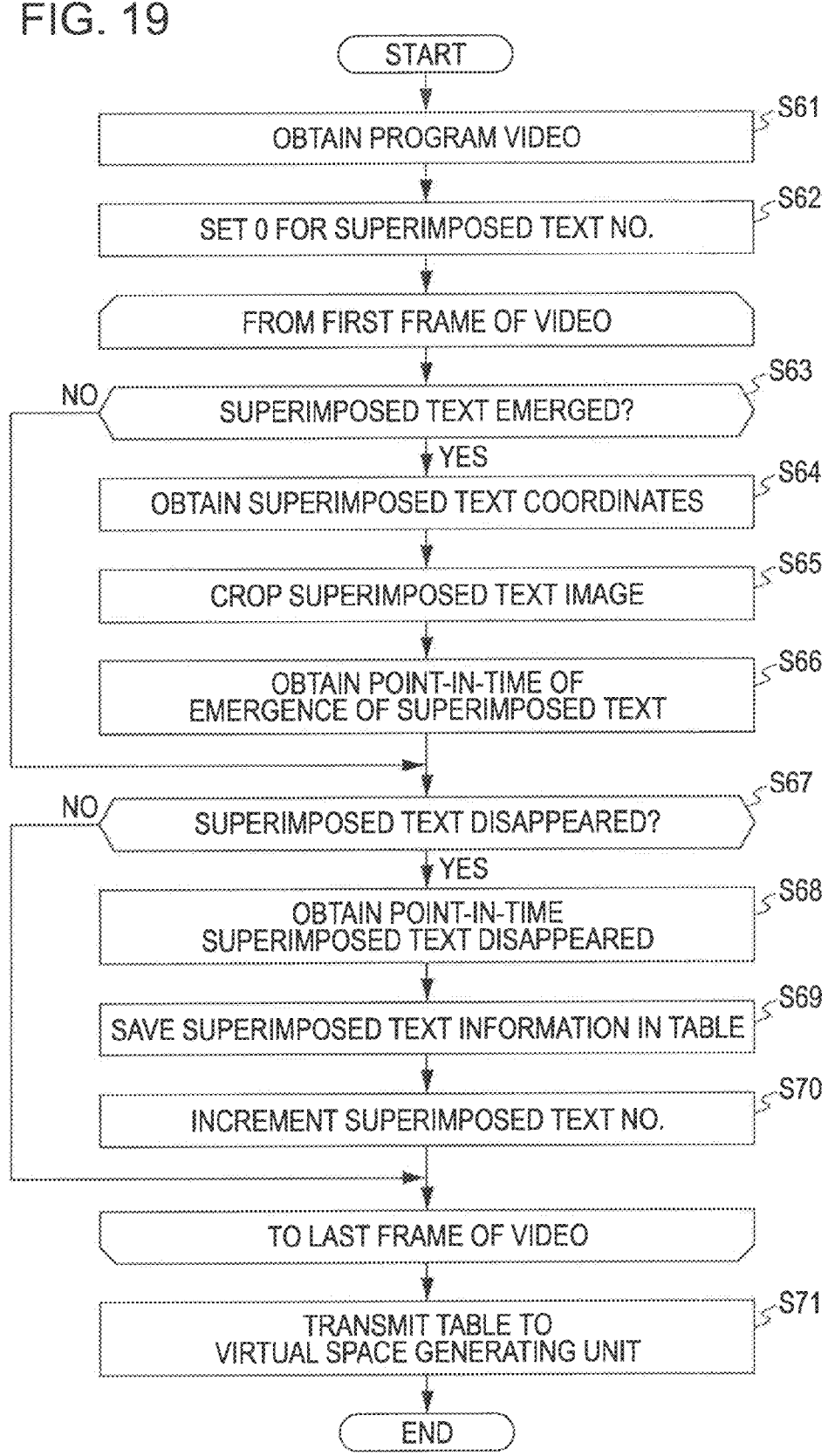
FIG. 19 is a flowchart illustrating a processing example of a superimposed text detecting unit according to a first modification of the first embodiment.

Next, the superimposed text detecting unit 150 will be described with reference to FIGS. 19 and 20. The superimposed text detecting unit 150 detects superimposed text from video data received from the data memory 61 and converts this into superimposed text images (sub-images), and outputs to the virtual space generating unit 64. Techniques for detecting superimposed text are available with the related art, and for example, the art disclosed in Japanese Unexamined Patent Application Publication No. 2006-331057 can be applied. Also, the superimposed text detecting unit 150 has a superimposed text table 150a generated by sectioning the superimposed text according to content, time of emergence, and so forth, and output image memory 150b serving as a region for temporarily storing the superimposed text information used for generating superimposed text images.

An example of superimposed text processing by the superimposed text detecting unit 150 will be described with reference to the flowchart in FIG. 19.

First, in step S61, the superimposed text detecting unit 150 obtains video data of the program (content) from the data memory 61. After this processing ends, the flow proceeds to the processing in step S62.

In step S62, the superimposed text detecting unit 150 initializes the superimposed text No. to 0. After this processing ends, the flow proceeds to the processing in step S63.

In step S63, the superimposed text detecting unit 150 determines whether or not a superimposed text has emerged with regard to the first frame of the obtained video data. In the event that superimposed text has emerged, the flow proceeds to step S64. On the other hand, in the event that superimposed text has not emerged, the flow proceeds to step S67.

In step S64, the superimposed text detecting unit 150 obtains the coordinates of the detected superimposed text on the display screen. While what portion of the superimposed text is to be used for the reference at the time of this coordinates obtaining is optional, normally, the center of the superimposed text is taken as the reference. After this processing ends, the flow proceeds to the processing in step S65.

In step S65, the superimposed text detecting unit 150 determines the position of the detected superimposed text using the above coordinates, and crops out the image including the superimposed text. After this processing ends, the flow proceeds to the processing in step S66.

In step S66, the superimposed text detecting unit 150 obtains the point-in-time of the detected superimposed text emerging. After this processing ends, the flow proceeds to the processing in step S67.

In step S67, the superimposed text detecting unit 150 determines whether or not the detected superimposed text has disappeared. In the event that the superimposed text has disappeared, the flow proceeds to step S68. On the other hand, in the event that the superimposed text has not disappeared, superimposed text detection processing is performed for the next frame.

In step S68, the point-in-time at which the superimposed text has disappeared is obtained. After this processing ends, the flow proceeds to the processing in step S89.

In step S69, the superimposed text information, including the point-in-time of emergence, the point-in-time of disappearing, and the cropped out superimposed text image which is the content of the superimposed text information, is saved in the superimposed text table 150*a*. After this processing ends, the flow proceeds to the processing in step S70.

In step S70, the superimposed text No. is incremented by 1.

The processing of steps S63 through S70 above is repeated for the first frame through the last frame of the video. After ending the superimposed text detecting processing for the last frame of the video data, the superimposed text detecting unit 150 outputs the superimposed text table 150*a* describing the superimposed text information, i.e., the superimposed text images T0, T1, T2, T3, and so on, to the virtual space generating unit 64. After this processing ends, the series of superimposed text detection processing ends.

FIG. 20 is a diagram illustrating an example of the configuration of the superimposed text table 150*a*. The superimposed text table 150*a* shows all superimposed text information included in one program, for example, having been sectioned into individual superimposed text images, with each sectioned superimposed text image being shown with a display start point-in-time Ts, display end point-in-time Te, and the content of the superimposed text. That is to say, this is a table which is a collection of the detected superimposed text images T0, T1, T2, T3, and so on. The display start point-in-time Ts and display end point-in-time Te are indicated in terms of seconds elapsed from starting of the content, which is a program or the like, in the same way as with the captions. The superimposed text No. is a serial No. assigned in order to the superimposed text images, starting from the earliest in display start time.

In the example shown in FIG. 20, superimposed text No. 0 shows information regarding the superimposed text image T0, "NOW, FOR THE NEWS AT NOON". From the information shown here, we can see that this superimposed text To is displayed on screen at the point 1.2 seconds following starting of the program (display start point-in-time Ts), and display thereof ends at the point 5.5 seconds following starting of the program (display end point-in-time Te). The superimposed text T1 displayed next is registered as superimposed text No. 1. As for this superimposed text No. 1, the display start point-in-time Ts is 7.3 seconds, the display end point-in-time Te is 12.1 seconds, and the content of the superimposed text is "METROPOLIS". That is to say, the superimposed text image T1 "METROPOLIS" is displayed from the point at which 7.3 seconds has elapsed from the point of starting of the program, to the point 12.1 seconds therefrom.

As described above, the superimposed text images T0, T1, T2, T3, and so on, output to the virtual space generating unit 64, are mapped to the face of the caption display objects in the virtual space, instead of the respective caption images. Further, rendering processing at the rendering unit draws to a two-dimensional plane (display image), and the display images are transmitted to a suitable display device via the image compositing unit 66, and displayed on display screens of display devices. Thus, superimposed text images are displayed on the caption display objects in the virtual space instead of the caption images.

Figure 21:
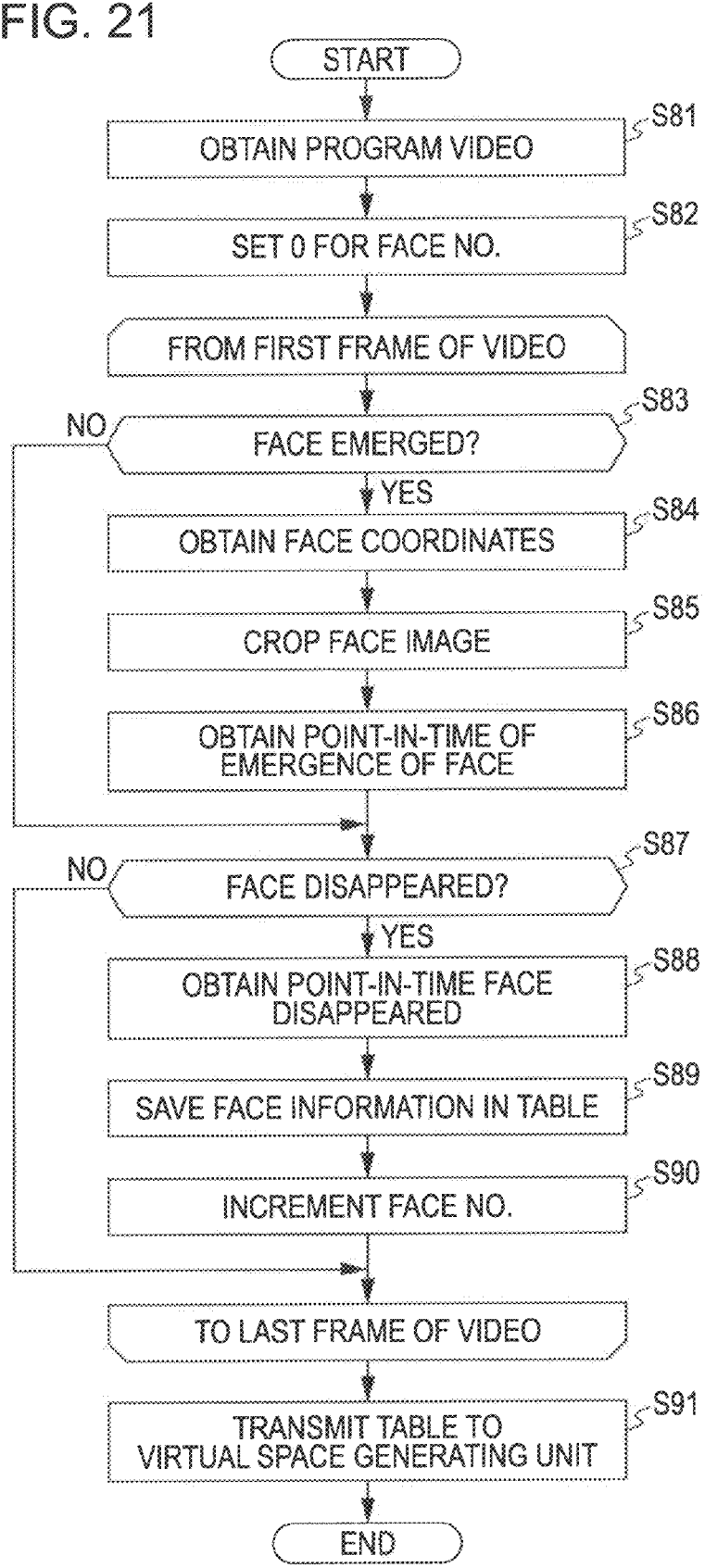
FIG. 21 is a flowchart illustrating a processing example of a face detecting unit according to the first modification of the first embodiment.

Next, details of the face detection unit 160 will be described with reference to FIGS. 21 and 22. The face detection unit 160 detects facial portion images of people from the video data received form the data memory 61, and outputs to the virtual space generating unit 64 as facial images (sub-images). Facial detection technology is widely available, and the art described in Japanese Unexamined Patent Application Publication No. 2007-241496, for example, and so forth, and be applied. Also, the facial detection unit 160 has a face table 160*a* generated by sectioning the faces according to content, time of emergence, and so forth, and output image memory 160*b* serving as a region for temporarily storing the face information used for generating face images.

An example of face detection processing with the face detection unit 160 will be described with reference to the flowchart in FIG. 21.

In step S81, first, the face detection unit 160 obtains video data of the program (content) from the data memory 61. After this processing ends, the flow proceeds to the processing in step S82.

In step S82, the face detection unit 160 initializes the face No. to 0. After this processing ends, the flow proceeds to the processing in step S83.

In step S83, the face detection unit 160 determines whether or not a face has emerged with regard to the first frame of the obtained video data. In the event that a face has emerged, the flow proceeds to step S84. On the other hand, in the event that no face has emerged, the flow proceeds to step S87.

In step S84, the face detection unit 160 obtains the coordinates of the detected face on the display screen. What portion of the face is to be used for the reference in obtaining coordinates is optional. After this processing ends, the flow proceeds to the processing in step S85.

In step S85, the face detection unit 160 determines the position of the detected face using the above coordinates, and crops out the image including the face. After this processing ends, the flow proceeds to the processing in step S86.

In step S86, the face detection unit 160 obtains the point-in-time of the detected face emerging. After this processing ends, the flow proceeds to the processing in step S87.

In step S87, the face detection unit 160 determines whether or not the detected face has disappeared. In the event that the face has disappeared, the flow proceeds to step S88. On the other hand, in the event that the face has not disappeared, face detection processing is performed for the next frame.

In step S88, the point-in-time at which the face has disappeared is obtained. After this processing ends, the flow proceeds to the processing in step S89.

In step S89, the face information, including the point-in-time of emergence, the point-in-time of disappearing, and the cropped out face image which is the content of the face information, is saved in the face table 160*a*. After this processing ends, the flow proceeds to the processing in step S90.

In step S90, the face No. is incremented by 1.

The processing of steps S83 through S90 above is performed for the first frame through the last frame of the video. After ending the face detecting processing for the last frame of the video data, the face detection unit 160 outputs the face table 160*a* describing the face information, i.e., the face images F0, F1, F2, F3, and so on, to the virtual space generating unit 64. After this processing ends, the series of face detecting processing ends.

FIG. 22 is a diagram illustrating an example of a face table in which face information is described. The face table 160*a* is generated by the above series of face detecting processing. The face table 160*a* shows all face information included in one program, for example, having been sectioned into individual face images, with each sectioned face image being shown with a display start point-in-time Ts, display end point-in-time Te, and the content of the face. That is to say, this table is a collection of the detected face images F0, F1, F2, F3, and so on. The display start point-in-time Ts and display end point-in-time Te are indicated in terms of seconds elapsed from starting of the content, which is a program or the like, in the same way as with the captions. The face No. is a serial No. assigned in order to the face images, starting from the earliest in display start time.

In the example shown in FIG. 22, face No. 0 shows information regarding the face image F0. From the information shown here, we can see that this face image F0 is displayed on screen at the point 30.3 seconds following starting of the program (display start point-in-time Ts), and display thereof ends at the point 45.2 seconds following starting of the program (display end point-in-time Te). The face image F1 displayed next is registered as face No. 1. As for this face No. 1, the display start point-in-time Ts is 120.5 seconds, the display end point-in-time Te is 134.2 seconds, and the face image F2 is described. That is to say, the face image F1 is displayed from the point at which 120.5 seconds has elapsed from the point of starting of the program, to the point 134.2 seconds therefrom.

As described above, the face images F0, F1, F2, F3, and so on, output to the virtual space generating unit 64, are mapped to the face of the caption display objects in the virtual space, instead of the respective caption images. Further, rendering processing at the rendering unit draws to a two-dimensional plane (display image), and the display images are transmitted to a suitable display device via the image compositing unit 66, and displayed on display screens of display devices. Thus, face images are displayed on the caption display objects in the virtual space instead of the caption images.

Next, the PiP detecting unit 170 will be described. The PiP detecting unit 170 detects and extracts an image within a PiP region that has been displayed by compositing so as to be superimposed on a regular image of video data, as a PiP inset screen. The PiP detecting unit 170 reduces the extracted image and generates a reduced image, which is output to the virtual space generating unit 64 as a reduced image (sub-image). Also, the PiP detecting unit 170 has output image memory 170a serving as a region for temporarily storing images serving as PiP inset images.

Figure 23:
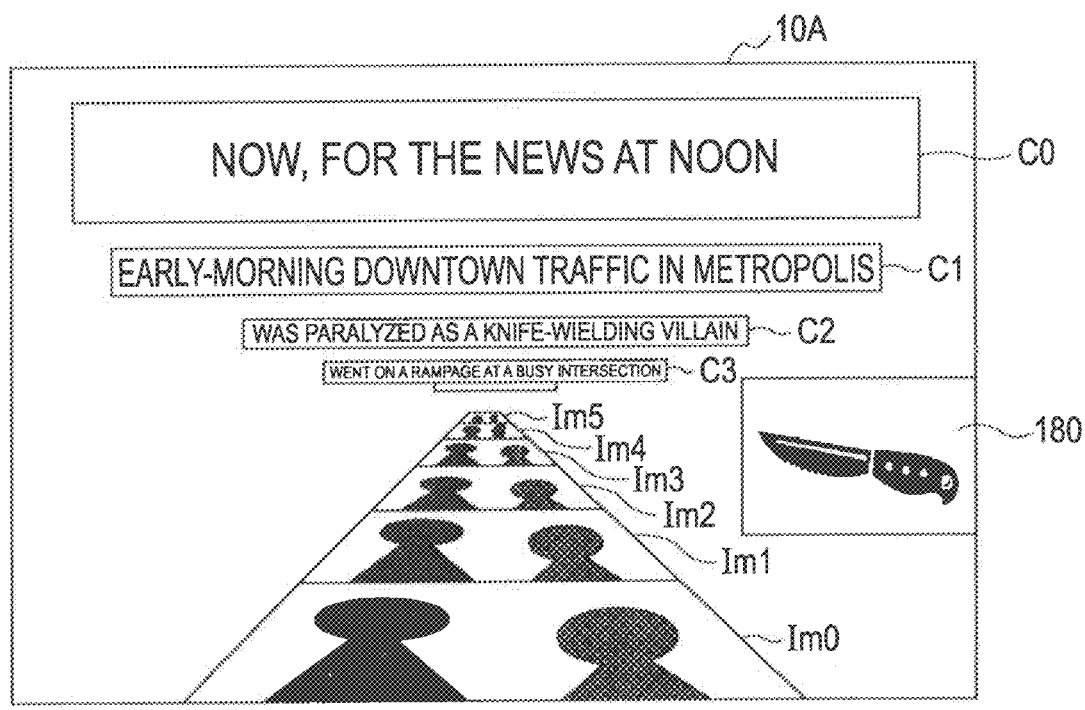
FIG. 23 is a diagram illustrating an example of PiP (Picture in Picture) display according to the first modification of the first embodiment.

FIG. 23 is a diagram illustrating an example of a display screen 10A where an image output from the PiP detecting unit 170 has been displayed. With the example shown in FIG. 23, the thumbnail images Im0 through Im5 serving as main images, and the caption images C0 through C5 serving as sub-images, are displayed as if they were the road and traffic signs as viewed through a car windshield, and a PiP inset window 180 is displayed at an arbitrary open region. That is to say, the display image 10A is an arrangement wherein the inset screen 180 has been displayed in the display screen 10 shown in FIG. 3. Displaying the inset screen in this way allows the viewer to obtain more information.

Also, an arrangement may be made such that, in the event that a TV program is being displayed in the list of thumbnail images on the thumbnail display object, other TV programs and the like being broadcast at the same time by other stations are also displayed.

With the first modification according to the first embodiment described above, it is sufficient to have any one of the superimposed text detecting unit 150, face detecting unit 160, and PiP detecting unit 170, instead of the caption image generating unit 63. Also, combinations of these not including the caption image generating unit 63, or combinations of these including the caption image generating unit 63, may also be configured.

Second Modification of First Embodiment

Next, a second modification of the first embodiment according to the present invention will be described with reference to FIG. 24. While description has been made so far regarding video generating procedures for one program, video of multiple programs may also be generated in the same way. With the second modification of the first embodiment, video of two programs is displayed at the same time in the display screen of one display device. That is to say, program lanes are created to the left and right of the display screen. With the camera (viewpoint) moving along the muddle thereof so that two programs can be viewed at the same time.

Figure 24:
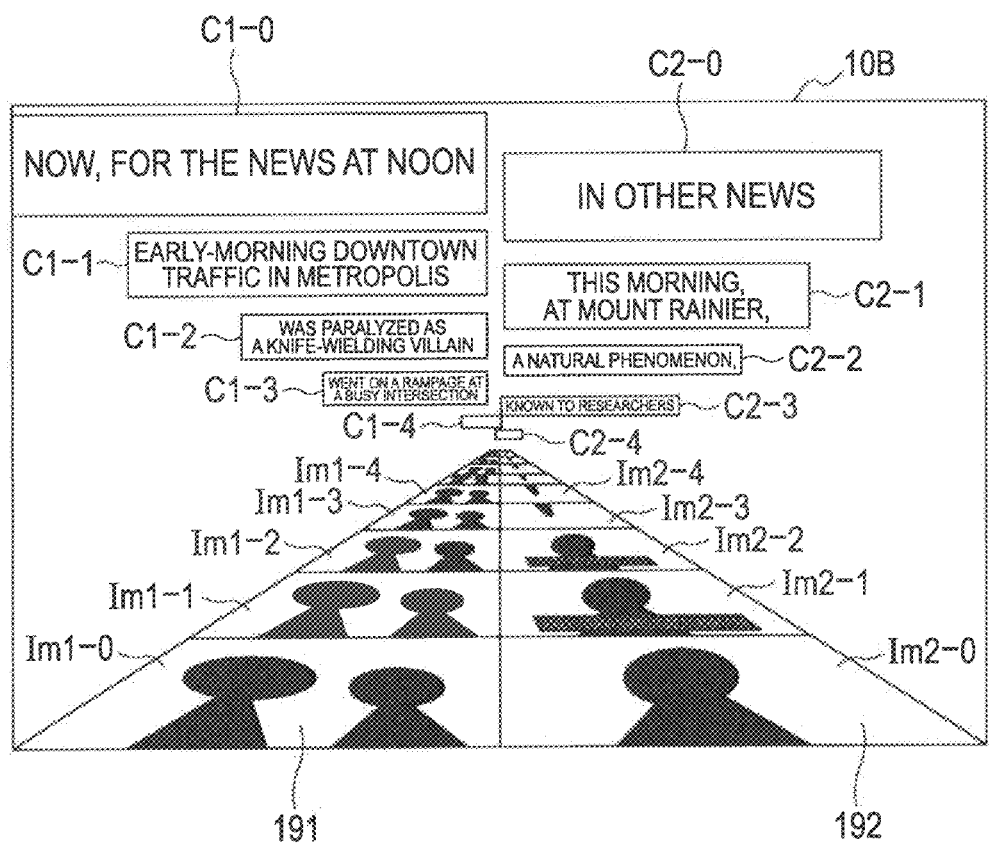
FIG. 24 is a diagram illustrating an example of two-program display according to a second modification of the first embodiment.

FIG. 24 is a diagram illustrating an example of two-program display according to the second modification of the first embodiment. In FIG. 24, a first lane (thumbnail display object) 191 for a first program and a second lane (thumbnail display object) 192 for a second program are arrayed in parallel on the display screen 10B. With regard to the first program, for example, thumbnail images Im1-0 through Im1-4 serving as main images, and caption images C1-0 through C1-4 serving as sub-images, are displayed. Also, with regard to the second program, for example, thumbnail images Im2-0 through Im2-4 serving as main images, and caption images C2-0 through C2-4 serving as sub-images, are displayed.

In order to display video of two programs on a single display device in this way, the thumbnail display objects and caption display objects of each of the program videos are placed in parallel, to the left and right, in a single virtual space, based on the data of the video of the two programs, by the virtual space generating unit 64 of the display video generating unit 60. This virtual space is subjected to rendering processing with a single rendering unit, the rendering unit 65-1 for example, and a display screen 10C is displayed on the display device 110-1 by way of the image compositing unit 66. Note that the camera RC (see FIGS. 12A through 14) placed in the virtual space is preferably placed at the junction of the two sets of video, i.e., at approximately the middle in the horizontal direction, but is not restricted to this placement.

According to the above-described second modification of the first embodiment, the viewer can clearly comprehend the spatial placement (placement relation) between two programs adjacent to each other to the left and right, so the programs are not readily confused.

Also, the viewer can view the programs while seeing ahead, and according can view the program while predicting how the program will proceed, thereby viewing the two programs simultaneously in a relaxed manner.

Also, thumbnail images and caption images are displayed with the metaphor or viewing scenery through the windshield of a car, so the movement of thumbnail images and caption images is natural, and the viewer does not readily tire even if viewing for a long time.

Also, the viewer has a sensation of the captions physically approaching, so even if the viewer is concentrated on one of the programs, the chance that the viewer will miss seeing a caption of the other program is smaller.

Third Modification of First Embodiment

Next, a third modification of the first embodiment according to the present invention will be described with reference to FIG. 25. With the third modification of the first embodiment, video of three or more programs is displayed at the same time in the display screen of one display device.

Figure 25:
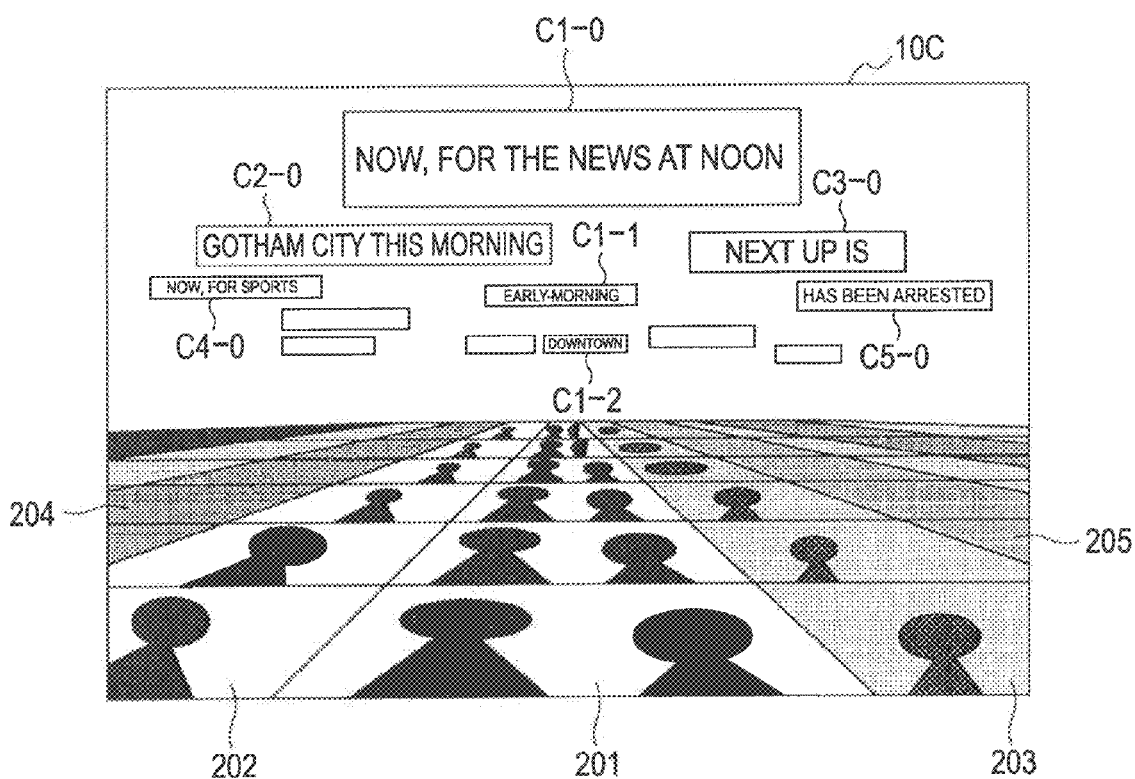
FIG. 25 is a diagram illustrating an example of n-program display according to a third modification of the first embodiment.

FIG. 25 is a diagram illustrating an example of multi-program display according to the third modification of the first embodiment. In FIG. 25, at least first through fifth lanes (thumbnail display objects) 201 through 205 are displayed on the display screen 10C. Also, respective caption images are displayed correlating to each program lane. In this example, caption images C1-0 through C1-2 are displayed corresponding to the first lane 201, as well as C2-0 corresponding to the second lane 202, C3-0 corresponding to the third lane 203, C4-0 corresponding to the fourth lane 204, and C5-0 corresponding to the fifth lane 205.

In order to display video of two programs on a single display device in this way, the thumbnail display objects and caption display objects of each of the multiple program videos are placed adjacently in a single virtual space, based on the data of the video of the two programs, by the virtual space generating unit 64 of the display video generating unit 60. This virtual space is subjected to rendering processing with a single rendering unit, the rendering unit 65-1 for example, and a display screen 10C is displayed on the display device 110-1 by way of the image compositing unit 66. Note that the camera RC (see FIGS. 12A through 14) placed in the virtual space is preferably placed at the middle of the multiple sets of video, and the program which the user is watching is likely most preferably at the middle lane, but is not restricted to this placement.

By performing such information resenting, the device can be used to view multiple programs at the same time, or search for programs which interest the viewer with the sensation of looking around one's self. In this case, the viewer can view various programs while changing the program lanes by inputting instructions regarding the left and right directions of the camera RC (viewpoint) to the control unit 80 (FIG. 4) via the user interface 90. Further, positioning the lane of a program selected from the multiple programs at the middle of the display screen 10C makes viewing of the desired program easier.

Fourth Modification of First Embodiment

Next, a fourth modification of the first embodiment according to the present invention will be described with reference to FIGS. 26 and 27. With this fourth modification of the first embodiment, multiple display devices are used to expand the sensation of depth of the virtual space, and to facilitate reading of captions in the distance.

Figure 26:
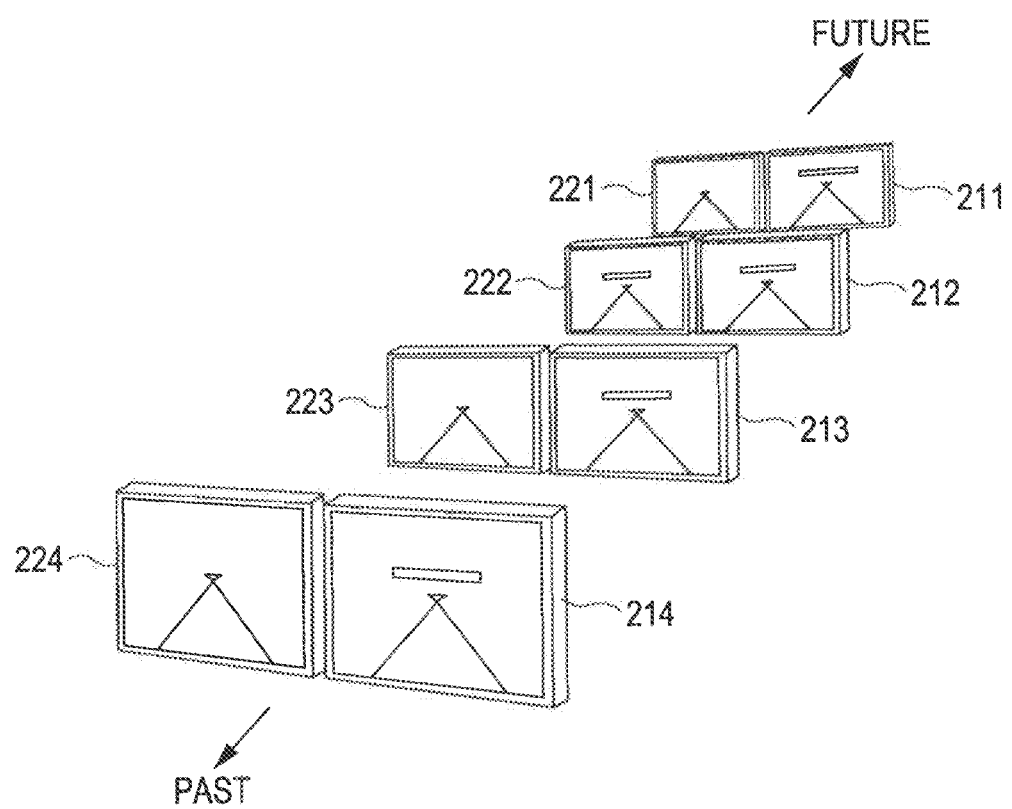
FIG. 26 is a diagram illustrating an example of display on multiple display devices according to a fourth modification of the first embodiment.

FIG. 26 is a diagram illustrating a display example using multiple display devices with the fourth modification of the first embodiment. In the example shown in FIG. 26, multiple display devices 211 through 214 and 221 through 224 are arrayed in a stepped manner so as to be more elevated the further toward the back. The display devices are separated according to lane in the horizontal direction, such that the display devices 211 through 214 show one same program, and the display devices 221 through 224 show another same program. The multiple display devices 211 through 214 and 221 through 224 are arranged such that close-distance (past) video is displayed on the closest (lowest) display device, and far (future) video is displayed on the farthest (highest) display device.

Figure 27:
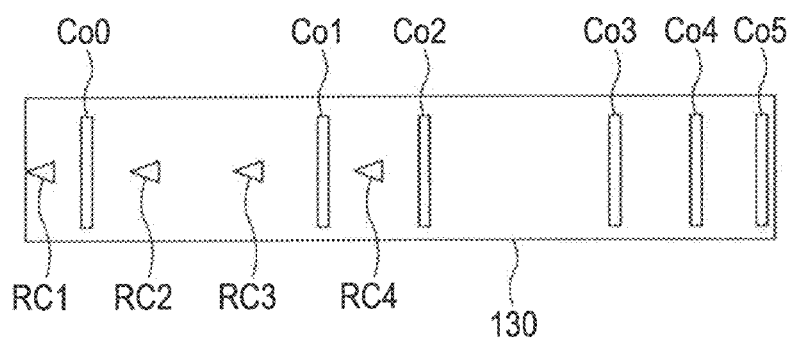
FIG. 27 is a diagram illustrating a 3D model of virtual space with multiple cameras, according to the fourth modification of the first embodiment.

FIG. 27 is a diagram illustrating a 3D model of virtual space with the fourth modification of the first embodiment. As shown in FIG. 27, four cameras RC1 through RC4 are disposed at mutually different positions as to the virtual space of the program video displayed on the display devices 211 through 214. The image generated based on the viewpoint of the camera RC1 is displayed on the display device 214 in the close direction (lower side), and the image generated based on the viewpoint of the camera RC4 is displayed on the display device 211 in the far direction (upper side). Thus, the caption display object Co2 in the distance from the camera RC1 is situated nearby as viewed from the camera RC2. Accordingly, characters of captions far away on the display device 214 are displayed large on the display device 211.

Note that in the example shown in FIGS. 26 and 27, the display devices and cameras correspond one on one, and there are two programs, so a total of eight cameras and eight rendering units (see FIGS. 5 and 18) have to be prepared for eight display devices. Accordingly, the information of the virtual space of the video of the two programs generated at the virtual space generating unit 64 is output to four rendering units for each program. The images output from the eight rendering units are then input to the display devices 211 through 214 and 221 through 224, via the image compositing unit 66.

Such information presentation is advantageous in that the view gets a sense of depth. Also, the characters of the captions far away are larger than the case of a single screen (e.g., FIG. 3), and accordingly are easier to view.

Presentation of Audio

A method for presenting audio accompanying the program video (content) will be described. The following can be conceived for audio presenting methods.

Presenting Audio in Virtual Space

Audio is generated and presented by simulating sound heard at the camera position, assuming that the portions of the programs at the thumbnails are emitting sound. This can be realized by making the sound relatively greater at a display time (display end point-in-time Te to display start point-in-time Ts) with regard to audio signals separated from the video data, at the audio processing unit 70, and supplying the audio signals to the speakers of the display devices.

Alternatively, an arrangement may be made wherein the images and audio output from the display video generating unit 60 and audio processing unit 70 are synchronized as to the video data received from the encoding/decoding processing unit 30 at the information processing unit 50, and output to the speakers of the display devices. That is to say, the audio processing unit 70 performs predetermined audio processing on the audio signals separated from the input video data, and subsequently the information processing unit 50 outputs regular images and audio to the display devices and the speakers thereof. The thumbnail images come closer from far away, so simply playing the audio gives the view the sense that audio is being emitted from the thumbnails.

Performing such audio presentation matches the way the images look and the way the audio sounds, which is readily comprehensible to the user.

Presenting all Audio

In the event of simultaneously presenting the audio corresponding to thumbnail images and audio corresponding to captions (words) for example, the audio of the captions will be hard to hear. However, the presentation of captions and the audio are synchronized, so the viewer would be able to hear the quality of sound, rhythm, and so forth, by concentrating. Also, sound effects, background music, and so forth, can be listened to with little mingling of sounds, so the user would be able to hear the atmosphere of the program.

Presenting One Audio

In the event that multiple program videos are being presented, audio of a program which the view has selected, or audio of a program at a position where the camera is situated, is presented. Alternatively, the eye direction of the viewer may be detected using an eye-direction detection sensor according to the related art, so as to present the audio of a program to which the eyes of the viewer are directed. In this case, the audio of a side in which the viewer is interested can be heard, so a presentation form with high satisfaction of the viewer can be provided.

Silent

In order to understand the content of multiple programs, the viewer has to maintain concentration. There may be cases wherein no audio is presented and just video is presented, since the audio might disturb the concentration of the viewer.

Other

An arrangement may be made wherein multiple audio presenting forms are presented, and the control unit 80 determines the audio presenting method by detecting viewer instructions, or detecting the viewing environment. Also, with the example of the above-described embodiment, the audio signals are supplied to speakers installed in the display devices, but an arrangement may be made wherein the audio is supplied to earphones connected to an unshown audio output terminal.

Second Embodiment

The following is a description of a second embodiment of the present invention with reference to FIGS. 28 through 48. The information presenting device according to the present embodiment is configured to present, in addition to current information of the object to be played, past and future information (video) on the screen beforehand, so that how the content will develop from here on can be predicted.

Figure 28:
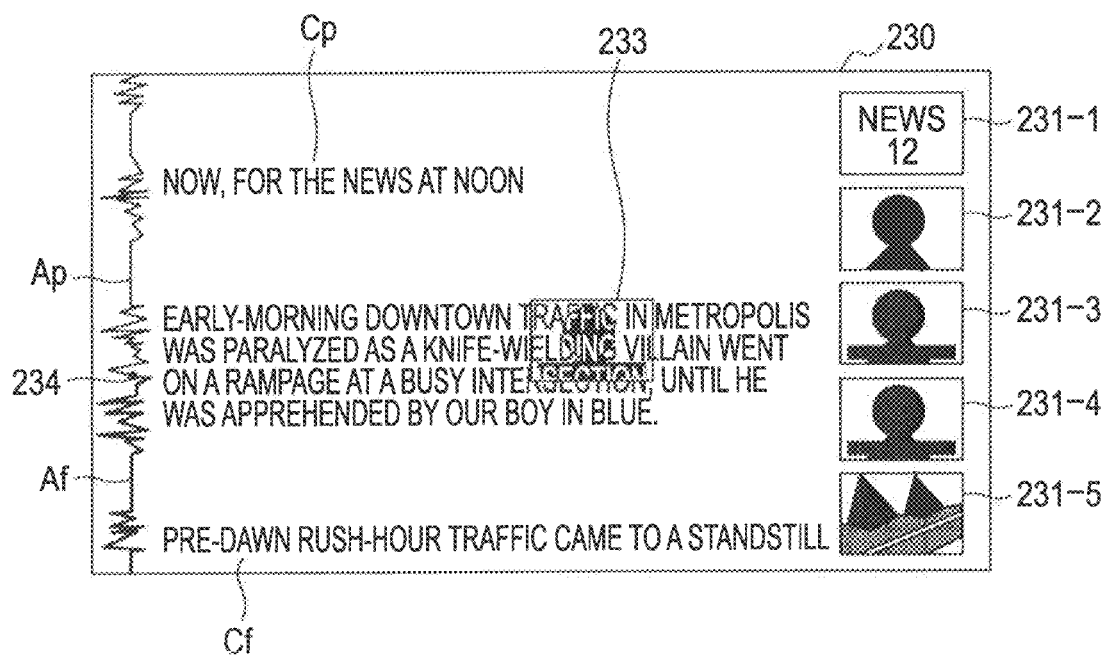
FIG. 28 is a diagram illustrating a display example of program video according to a second embodiment of the present invention.

FIG. 28 is a diagram illustrating a display example of a program video according to the second embodiment of the present invention. In a display screen 230 in FIG. 28, the content of audio of the program (content) is displayed as a caption (past) Cp and a caption (future) Cf. Also, thumbnail images are presented from the past to the future in the vertical direction, as shown by thumbnail images 231-1 through 231-5, at the right side of the screen. Also, the display color is changed for the past caption and the future caption. Moreover, waveforms of the audio signals are displayed, with the audio also being presented from the past to the future, in the form of audio waveform (past) Ap, audio waveform (future) Af, and current audio position 234. The portion of the caption corresponding to the current audio position is displayed with a current image 233 corresponding to the current playing point-in-time superimposed thereupon.

The features of the video presenting performed by the display screen 230 are as follows.
(1) The audio content is displayed by captions. Accordingly, the current caption is indicated by change in color or the like, and where to read is readily understandable.
(2) The thumbnail images of the video are presented from the past, present, and into the future. Accordingly, the how the program will develop, or the flow of a story, or the like, can be easily confirmed.
(3) Captions are also presented from the past, present, and into the future. Accordingly, the viewer can view in a relaxed manner.
(4) Waveforms of the audio corresponding to the caption are presented from the past, present, and into the future. Accordingly, the viewer can confirm the timing of speaking, and can view in a relaxed manner.

Converting programs (video data) input to the information presenting device into video having such features enables the viewer to view and understand multiple programs at the same time. A system for realizing this video presenting will be described next.

Figure 29:
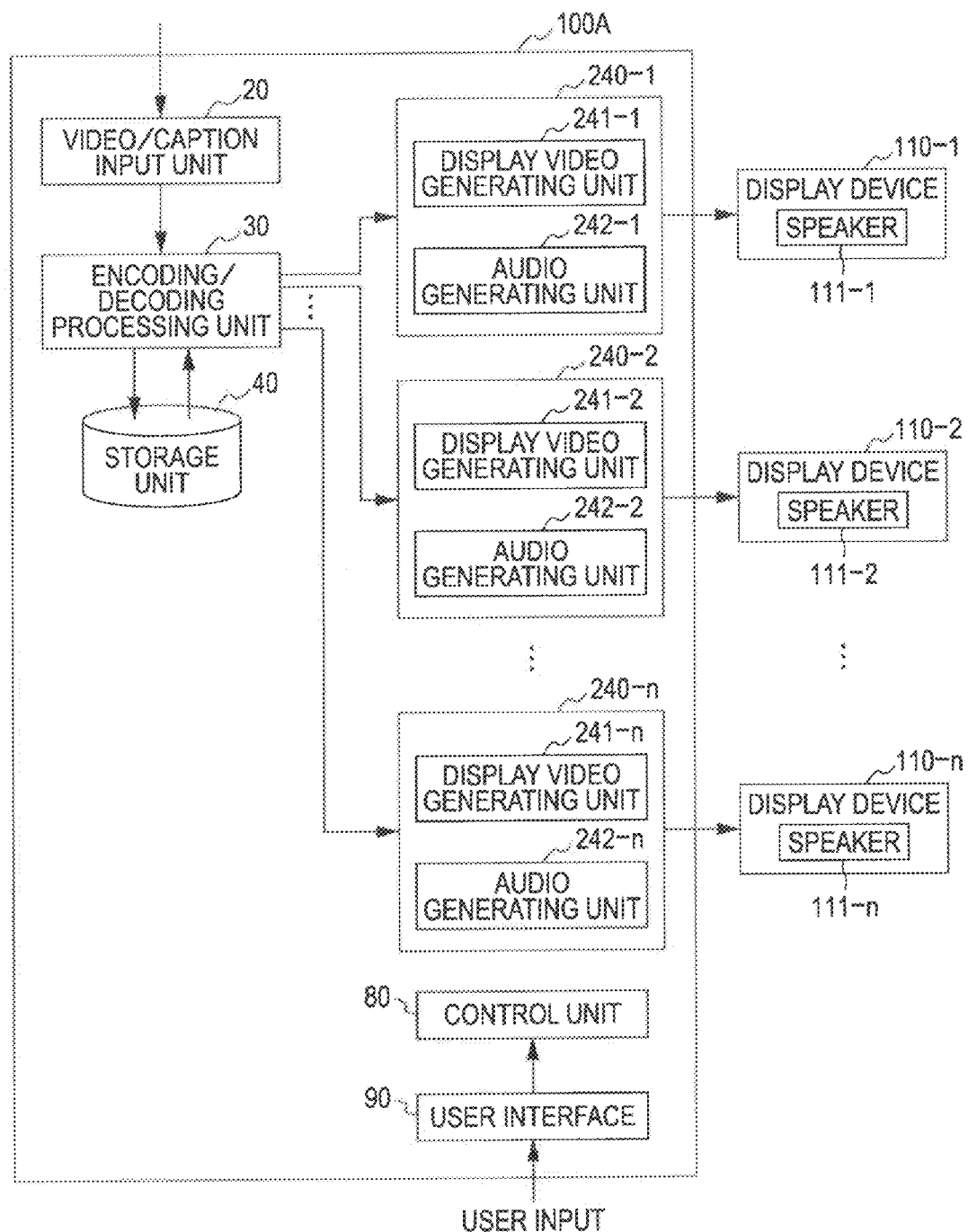
FIG. 29 is a block diagram illustrating an example of the internal configuration of a system according to the second embodiment.

FIG. 29 is a block diagram illustrating an example of the internal configuration of a system according to the second embodiment. An information presenting device 100A differs from the information presenting device 100 according to the first embodiment in that information processing units 240-1 through 240-n are provided corresponding to the display device 110-1 through 110-n one to one, and other configurations are the same. In the following, portions in the drawings used for describing the second embodiment which are the same as those in the drawings used for describing the first embodiment are denoted with the same reference numerals, detailed description thereof will be omitted.

Figure 30:
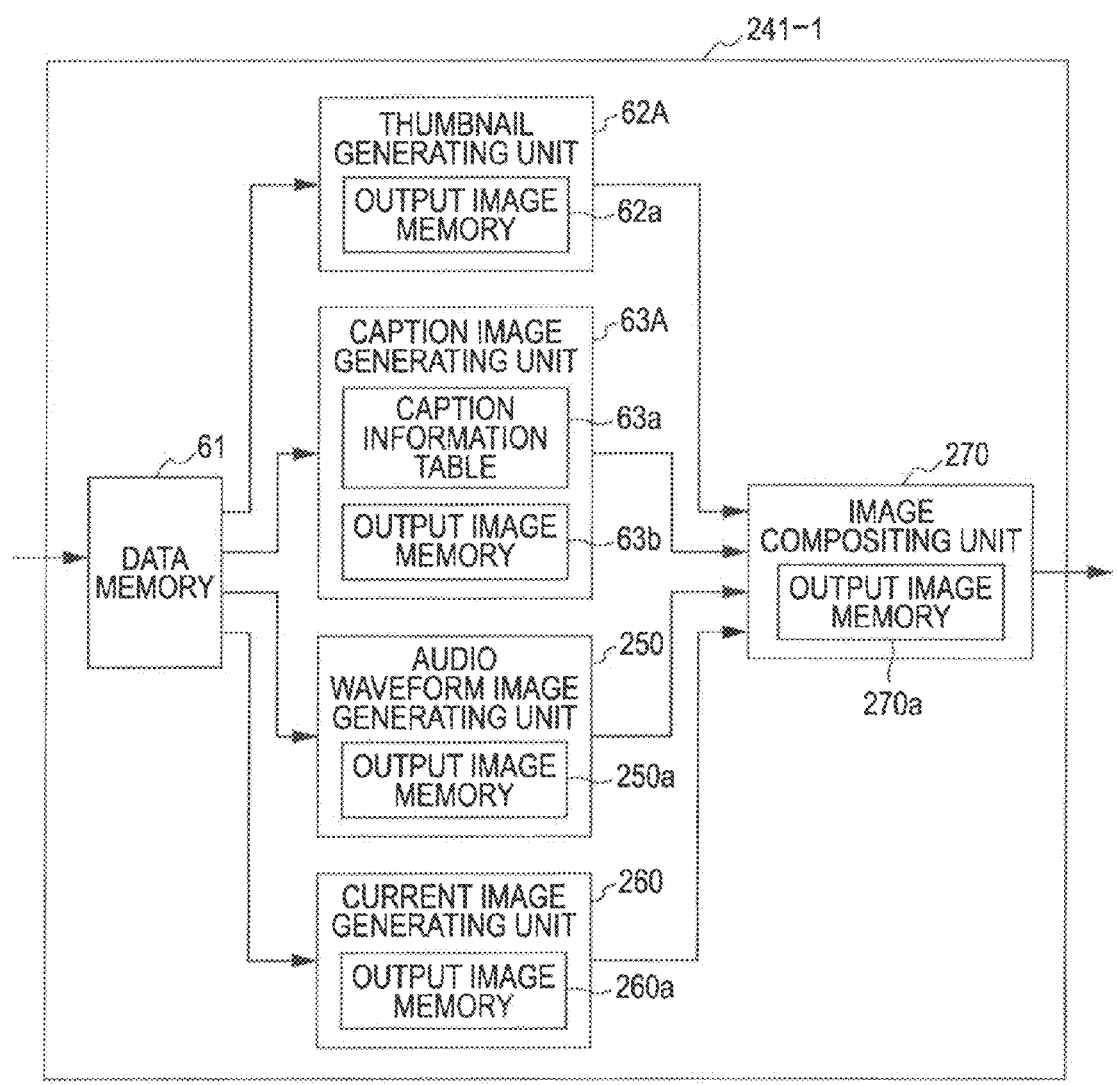
FIG. 30 is a block diagram illustrating an example of the internal configuration of a display video generating unit according to the second embodiment.

FIG. 30 is a block diagram illustrating an example of the internal configuration of a display video generating unit within an information processing unit according to the second embodiment. The configurations of the information processing units 240-1 through 240-n are the same, so description will be made regarding only the information processing unit 240-1, and description regarding the other information processing units will be omitted.

A video generating unit 241-1 within the information processing unit 240-1 is configured including data memory 61, a thumbnail generating unit 62A serving as a first image generating unit, the caption image generating unit 63A serving as a second image generating unit, an audio waveform image generating unit 250, a current image generating unit 260, and an image compositing unit 270. The thumbnail generating unit 62A generates main images (thumbnail images), and the other generating units generate sub-images (caption images, audio waveform images, current images). Note that having one of the components for generating sub-images is sufficient, or alternatively, a combination of a plurality thereof may be had.

The data memory 61 is a region for temporarily storing video data, audio data, and caption information, read out from the storage unit 40, at the time of performing processing at the thumbnail generating unit 62A, caption image generating unit 63A, audio waveform image generating unit 250, and current image generating unit 260, and is configured of semiconductor memory or the like.

The thumbnail generating unit 62A generates a list of thumbnail images to be displayed in time sequence on the display screen of the display device, and outputs to the image compositing unit 270. Also, the thumbnail generating unit 62A has output image memory 62a serving as a region for temporarily storing thumbnail images. Details of the thumbnail generating unit 62A will be described later.

The caption image generating unit 63A converts character information input as metadata via the video/caption input unit 20 into a series of caption images, and outputs to the image compositing unit 270. Also, the caption image generating unit 63A also has a caption information table 63a generated by sectioning the caption information according to the content of the captions and the time of emergence, and an output image memory 63b serving as a region for temporarily storing caption information to be used for generating caption images. The caption image generating unit 63A will be described in detail later.

The audio waveform image generating unit 250 converts waveforms of audio signals included in the audio data with a later-described method, and outputs to the image compositing unit 270. Also, the audio waveform image generating unit 250 has an output image memory 250a serving as a region for temporarily storing created audio waveforms.

The current image generating unit 260 converts a program image corresponding to the current playing point-in-time by a later-described method, into a reduced image (hereinafter referred to as "current image"), and outputs to the image compositing unit 270. The current image generating unit 260 also has an output image memory 260a serving as a region for temporarily storing created current images.

The image compositing unit 270 composites the images generated at the generating units, and outputs to the display device 110-1 correlated with the information processing unit 240-1.

Figure 31:
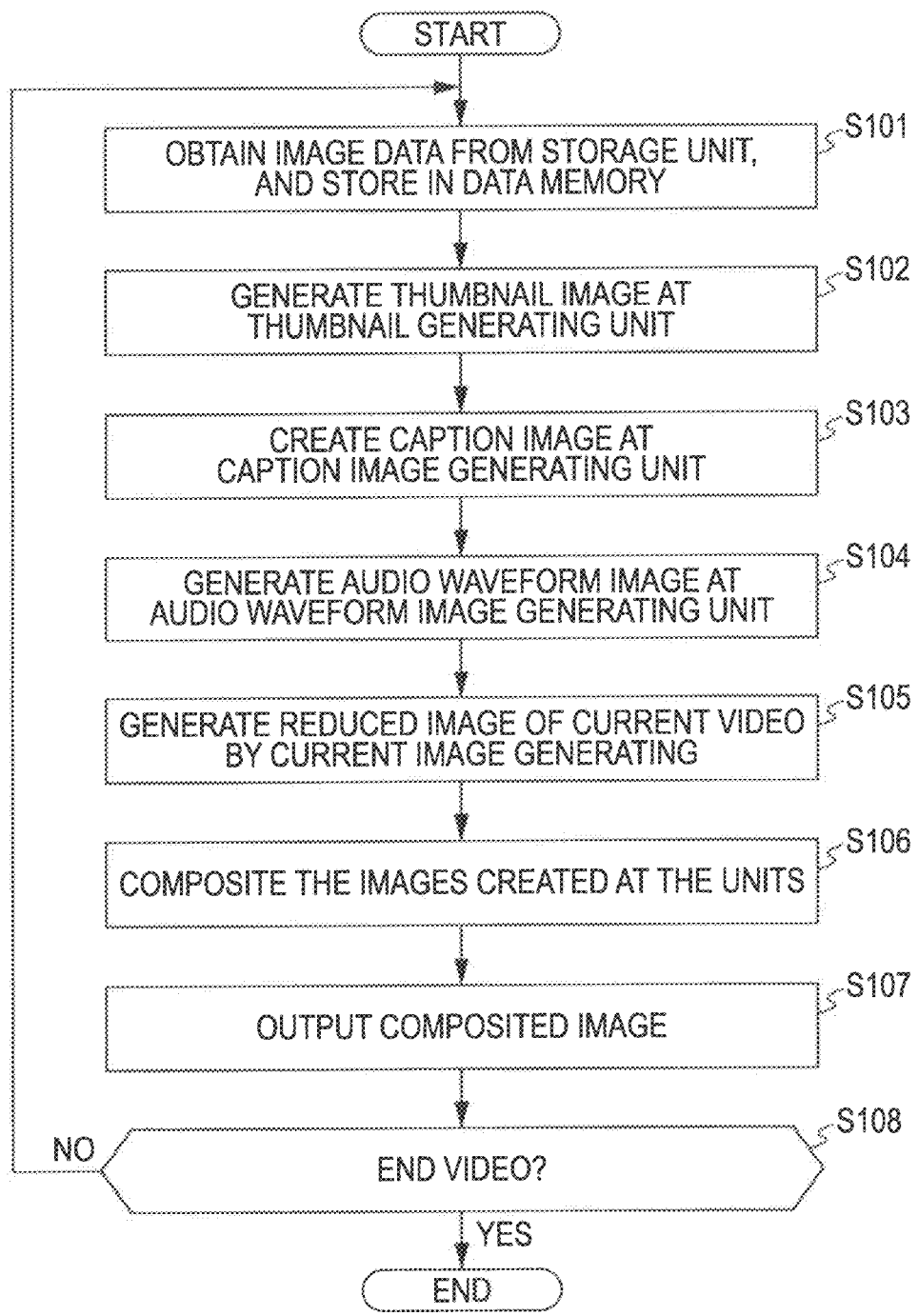
FIG. 31 is a flowchart illustrating an example of the processing of the display video generating unit according to the second embodiment.

Next, an example of processing with the display video generating unit 241-1 having the above configuration will be described with reference to the flowchart in FIG. 31.

In step S101, the display video generating unit 241-1 first obtains information for generating thumbnail images, caption images, and so forth, from the storage unit 40, and stores the obtained data in the data memory 61.

Next, inn step S102, a list of thumbnail images is generated by the thumbnail generating unit 62A using the data stored in the data memory 61, and is output to the image compositing unit 270.

In step S103, caption images are generated by the caption image generating unit 63A using the data stored in the data memory 61, and are output to the image compositing unit 270.

Also, in step S104, the audio waveform image generating unit 250 generates audio waveform images using the data stored in the data memory 61, which is output to the image compositing unit 270.

In step S105, the current image generating unit 260 generates an image of the current video using the data stored in the data memory 61, which is output to the image compositing unit 270.

In step S106, the image compositing unit 270 composites the images generated at the generating units.

In step S107, the image compositing unit 270 outputs the composited image to the corresponding display device.

Subsequently, in step S108, the control unit 80 makes determination regarding whether or not to end presenting of the video. That is to say, determination is made regarding whether or not the input of the video data has ended, or there has been an instruction to end video presenting from the user interface 90. In the event of ending video presenting, the series of processing ends. In the event that video presenting is continuing, the flow returns to step S101 and processing further continues.

Next, details of the thumbnail generating unit 62A will be described with reference to FIGS. 32 and 33. The thumbnail generating unit 62A generates one thumbnail image (one frame) at a time at predetermined intervals, from the input video data.

Figure 32:
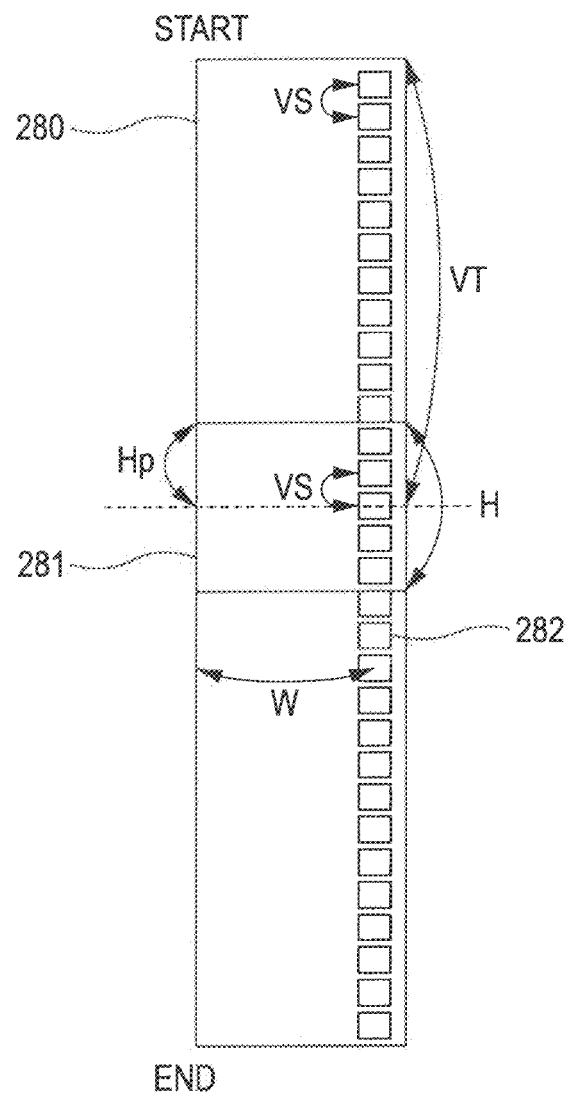
FIG. 32 is a diagram for describing coordinates of thumbnail images according to the second embodiment.

FIG. 32 is a diagram for describing coordinates of a thumbnail image. Here, for the sake of convenience, we will assume the presence of image memory called "virtual memory". In this virtual memory, thumbnail images 282 are placed at a horizontal position W (pixels), at S (second) intervals from a start position (origin), with the vertical intervals of the thumbnail images being VS (pixels). V (pixels/second) here represents the speed of scrolling (screen transition speed) which will be described later.

Also, an output image 281 output from this virtual memory corresponds to a portion included between a position where the distance from the start position (origin) is (VT−Hp) to a position where the distance from the start position is (VT−Hp+H). Here, T represents the current playing point-in-time, Hp represents the distance from the upper side of the output image 281 to the display position of the current point (broken line), and H represents the height of the output image 281. That is to say, the output image 281 moves downward in the virtual memory at a velocity of V (pixels/second) after starting playing, and when viewing the output image 281 as being stationary, the thumbnail image 282 scrolls upwards at a velocity of V (pixels/second).

Figure 33:
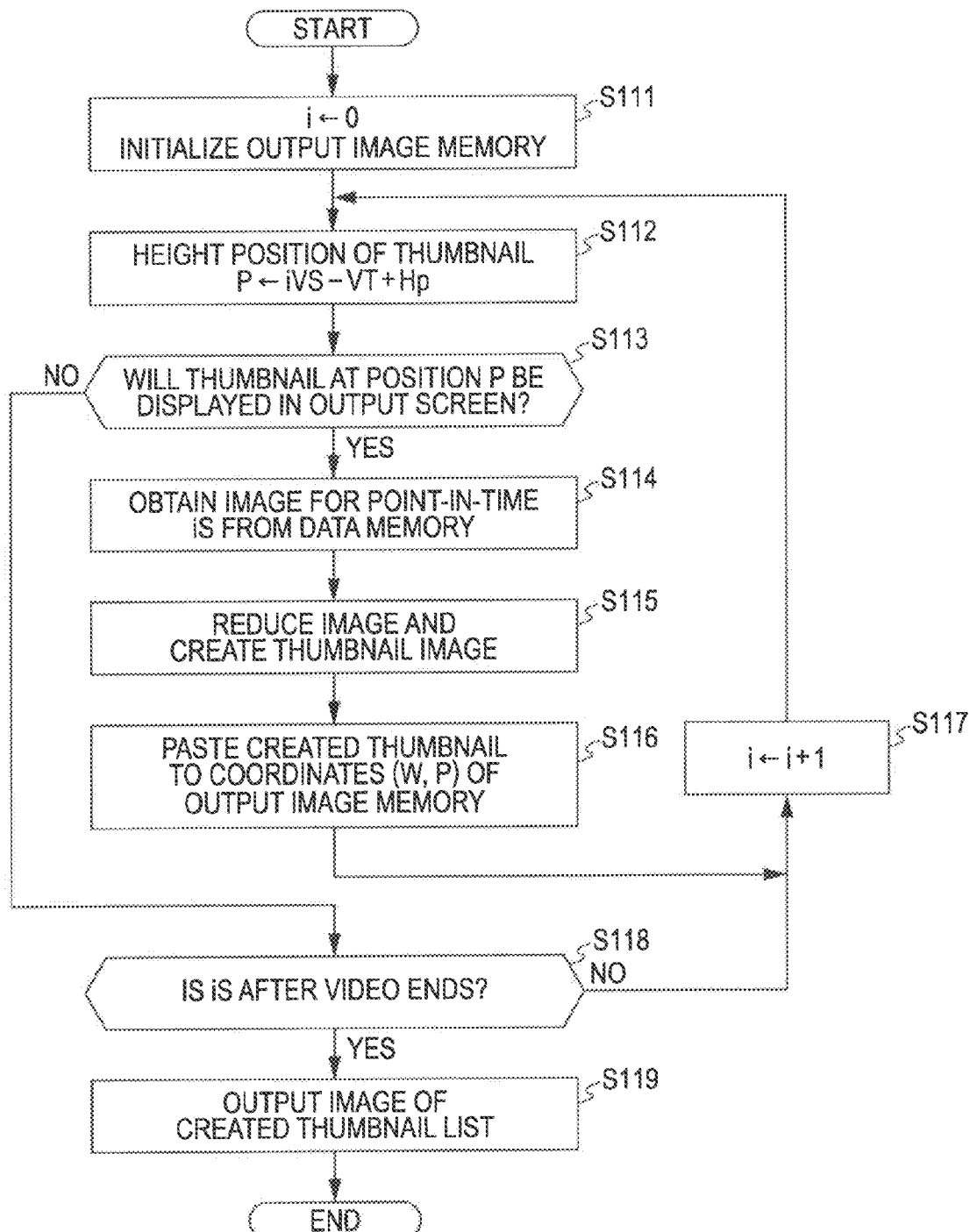
FIG. 33 is a flowchart illustrating an example of the processing of a thumbnail generating unit according to the second embodiment.

FIG. 33 is a flowchart illustrating an example of processing at the thumbnail generating unit 62A.

In step S111, the thumbnail generating unit 62A first sets the serial No. i of the thumbnail image 282 to 0, so as to initialize the output image memory 62a. After this processing ends, the flow proceeds to the processing in step S112.

In step S112, the thumbnail generating unit 62A calculates the position Pi of the thumbnail image with the serial No. i (where i is an integer of 0 or higher) serially assigned from the start position (origin). The position Pi can be represented with the following expression.

$$Pi = iVS - VT + Hp$$

As can be understood from this calculation expression, the position Pi represents the distance from the start position. After this processing ends, the flow proceeds to the processing in step S113. While what portion of the thumbnail image is to be used for the reference at the time of obtaining the thumbnail image position is optional, normally, the center of the thumbnail image is taken as the reference.

In step S113, the thumbnail generating unit 62A determines whether or not the thumbnail image at the position Pi is displayed at the output image 281 or not. In the event that the position Pi overlaps the output image 281, the flow proceeds to step S114. On the other hand, in the event that the position Pi does not overlap the output image 281, the flow proceeds to step S118.

In step S114, the thumbnail generating unit 62A obtains an image corresponding to the point-in-time iS from the video data stored in the data memory 61. After this processing ends, the flow proceeds to the processing in step S115.

In step S115, the thumbnail generating unit 62A creates a thumbnail image by reducing the image obtained by the processing in step S114. After this processing ends, the flow proceeds to the processing in step S116.

In step S116, the thumbnail generating unit 62A pastes the created thumbnail image on the output image memory 62a at a position corresponding to the virtual memory coordinates (W, Pi). After this processing ends, the flow proceeds to the processing in step S118.

In step S117, following pasting the thumbnail image to the i'th position Pi from the start position (origin), the thumbnail generating unit 62A then increments the serial No. i by 1. That is to say, the thumbnail image is pasted to the position Pi+1 which is the i+1'th from the head of the output image Im. For example, in the event that the serial No. i=0, i is incremented 1 so as to be 1. After this processing ends, the flow returns to the processing in step S112, and the processing of at least the steps S112 and S113 is repeated.

In step S118, the thumbnail generating unit 62A determines whether or not the point-in-time iS is a point-in-time after ending of the playing time of the video data stored in the data memory 61. In the event that the point-in-time iS is a point-in-time after ending of the playing time, the flow proceeds to the processing in step S119. On the other hand, in the event that the point-in-time iS is not a point-in-time after ending of the playing time, i.e., there is playing time remaining, flow proceeds to the processing in step S117, and the processing of at least the steps S112 and S113 is repeated. Such procedures are repeated until the serial No. i=n, thereby creating an image of a list of thumbnail images, which is stored in the output image memory 62a.

Finally, in step S119, the thumbnail generating unit 62A outputs the image of the list of thumbnail images, stored in the output image memory 62a, to the image compositing unit 270. After this processing ends, the thumbnail image generating processing ends.

Next, details of the caption image generating unit 63A will be described with reference to FIGS. 34 through 36. FIG. 34 is a diagram illustrating an example of a caption information table. The caption information received from the data memory 61 includes at least a caption serial No., the caption display start point-in-time Ts, caption display end point-in-time Te, can content of the caption. Note that the example of the caption information table shown this FIG. 34 is the same as the example shown in FIG. 9.

Figure 35:
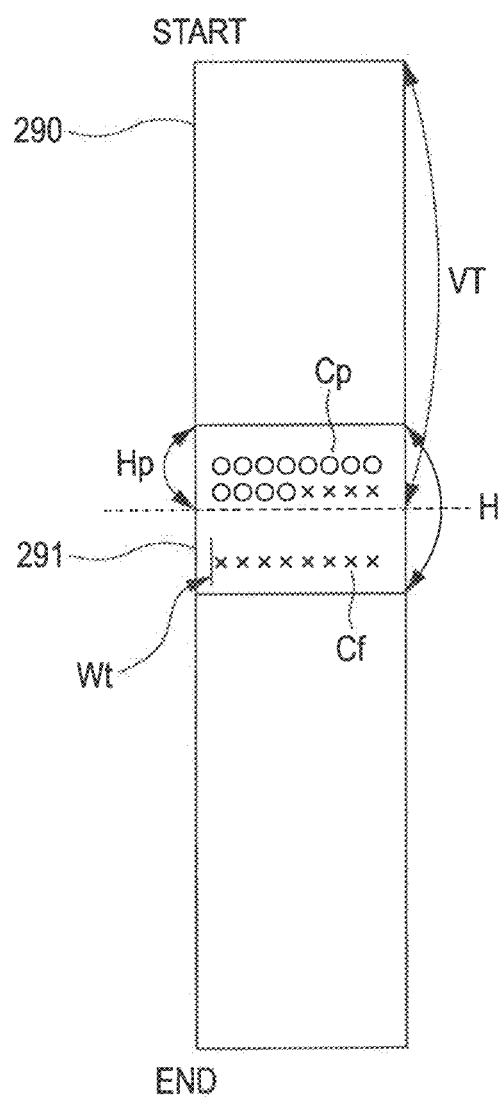
FIG. 35 is a diagram for describing coordinates of caption images according to the second embodiment.

FIG. 35 is a diagram for describing coordinates relating to captions. Here, for the sake of convenience, we will assume the presence of image memory called "virtual memory" 290, in the same way as with the case of the above-described thumbnail image (see FIG. 32). The meanings of the symbols (coordinates) in the example shown in FIG. 35 are the same as those of the same symbols in the case of the above-described thumbnail image. Note that Wt represents the current horizontal position in a caption output image 291. While the position Wt is represented as a bar in the example in FIG. 35, this does not have to actually be shown on the screen.

With the present embodiment, at least two types of fonts for rendering captions are prepared, with a "past font" being used of captions (past) Cp before (above) the current position (broken line) and captions (future) Cf that are after (below) are rendered using a "future font". For example, a blue font may be used for the past font, and a yellow font used for the future font. Also, the typeset or the like may be changed as well. This, the viewer can tell at a glance which caption corresponds to past, present, and future.

Figure 36:
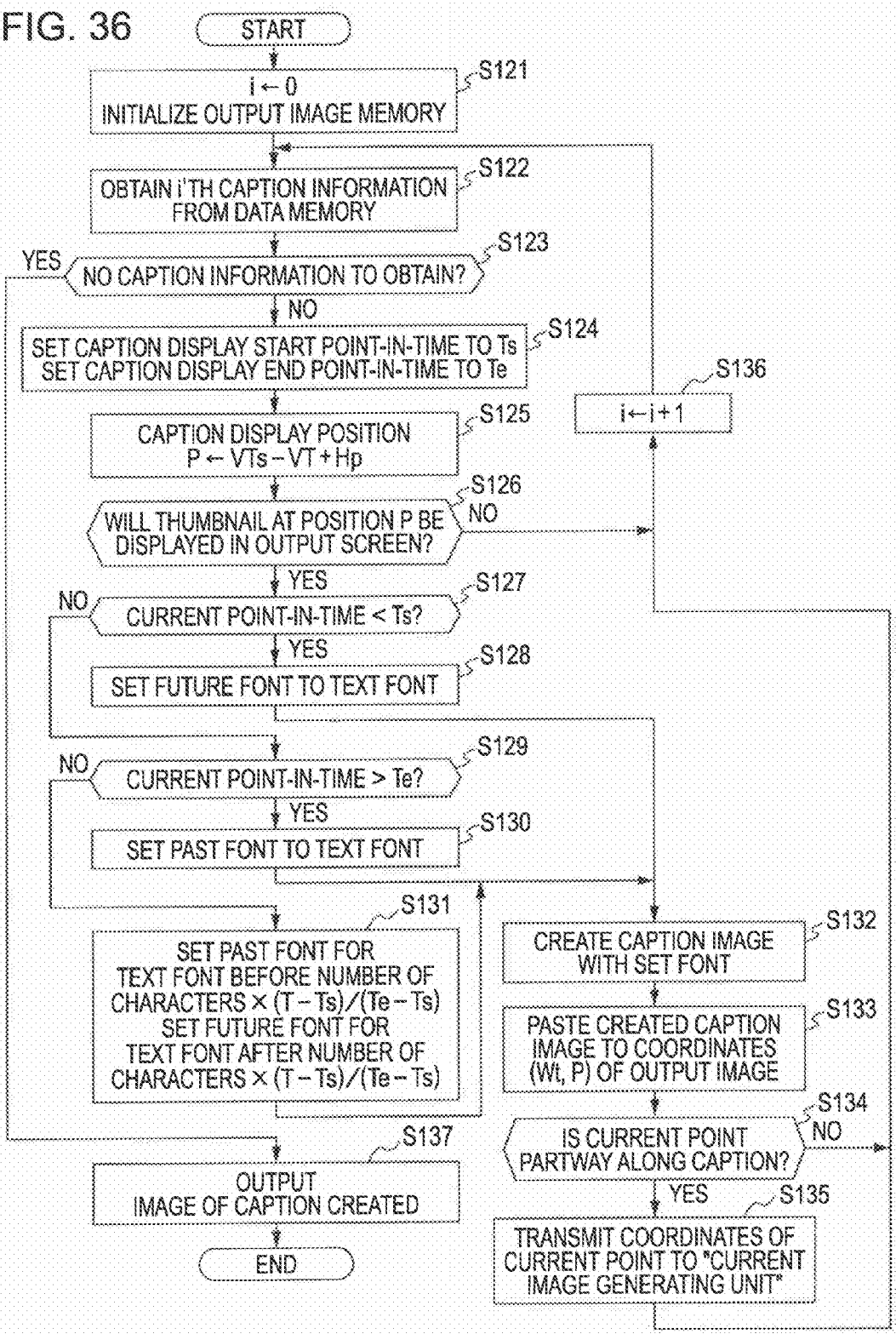
FIG. 36 is a flowchart illustrating an example of the processing of a caption image generating unit according to the second embodiment.

FIG. 36 is a flowchart illustrating an example of processing with the caption image generating unit 63A.

In step S121, the caption image generating unit 63A first performs initialization by setting the caption serial No. i to 0, and applying an arbitrary color, transparent for example, to the output image memory 63a. After this processing ends, the flow proceeds to the processing in step S122.

In step S122, the caption image generating unit 63A obtains the i'th caption information from the video data stored in the data memory 61. That is to say, the i'th caption information is obtained from the caption information table shown in FIG. 34. For example, in the event that the serial No. i=0, the caption information of the content of the caption No. 0, which is "NOW, FOR THE NEWS AT NOON" is extracted, and saved in the output image memory 63b. After this processing ends, the flow proceeds to the processing in step S123.

In step S123, the caption image generating unit 63A determines whether or not there is remaining caption information which should be obtained. In the event that determination is made that there is remaining caption information which should be obtained, the flow proceeds to the processing in step S124. In the other hand, in the event that determination is made that there remains no caption information which should be obtained, the flow proceeds to the processing in step S137. For example, in the event that the serial No. i=0, determination is made that there is remaining caption information which should be obtained, and the flow proceeds to the processing in step S124.

In step S124, the caption image generating unit 63A reads out the display start point-in-time Ts and display end point-in-time Te which the i'th caption information obtained from the caption information table has. After this processing ends, the flow proceeds to the processing in step S125.

In step S125, the caption image generating unit 63A calculates the display position Pi (i.e., iVS−VT+Hp) of the caption with the serial No. i assigned in order from the start position (origin). After this processing ends, the flow proceeds to the processing in step S126.

In step S126, the caption image generating unit 63A determines whether or not the caption of the display position Pi is displayed in the output image 291. In the event that the caption of the display position Pi overlaps the output image 291, the flow proceeds to step S127. On the other hand, in the event that the caption of the display position Pi does not overlap the output image 291, the flow proceeds to step S136.

In step S136, the caption image generating unit 63A increments the serial No i of the object caption by 1. For example, in the event that the serial No. i=0, this is incremented by 1 to 1. Following this processing ending, the flow proceeds to the processing in step S122, and the processing of at least steps S122 and S123 is repeated.

On the other hand, in step S127 the caption image generating unit 63A determines whether or not the display start point-in-time Ts is greater than the current point-in-time, i.e., whether or not the playing point-in-time. In the event that the display start point-in-time Ts is greater, the flow proceeds to step S128. On the other hand, in the event that the display start point-in-time Ts is smaller, the flow proceeds to step S129.

In step S128, the caption image generating unit 63A selects the future font as the caption text font. After this processing ends, the flow proceeds to the processing in step S132.

In step S129, the caption image generating unit 63A determines whether or not the current point-in-time T is greater than the display end point-in-time Te of the object caption, i.e., whether or not the playing point-in-time has passed. In the event that the current point-in-time T is greater, the flow proceeds to step S130. On the other hand, in the event that the current point-in-time T is smaller, the flow proceeds to step S131.

In step S130, the caption image generating unit 63A selects the past font as the caption text font. After this processing ends, the flow proceeds to the processing in step S132.

In step S131, the caption image generating unit 63A performs processing for applying the above-described past font and future font to the captions making up the caption information that has been read out. Specifically, the past font is applied to characters placed before (to the left or above) the position calculated with the expression Number of characters×(current point-in-time T−display start point-in-time Ts)/(display end point-in-time Te−display start point-in-time Ts).

Also, the future font is applied to characters placed before (to the right or below) the position calculated with the expression Number of characters×(current point-in-time T−display start point-in-time Ts)/(display end point-in-time Te−display start point-in-time Ts).

After this processing ends, the flow proceeds to the processing in step S132.

In step S132, the caption image generating unit 63A creates an image of the object caption using the set font. After this processing ends, the flow proceeds to the processing in step S133.

In step S133, the caption image generating unit 63A pastes the created caption image to the output image memory 63b at the virtual memory coordinates (Wt, Pi). After this processing ends, the flow proceeds to the processing in step S134.

In step S134, the caption image generating unit 63A determines whether or not the current point is present partway along the caption upon the caption image. In the event that the current point is present, flow proceeds to the processing in step S135. On the other hand, in the event that the current point is present, flow proceeds to the processing in step S136.

In step S135, the caption image generating unit 63A transmits the coordinates of the current point to the current image generating unit 260. After this processing ends, the flow proceeds to the processing in step S136.

Finally, in step S137, in the event that determination is made that there is no more caption information to be obtained in the determination processing in step S123, the caption image generating unit 63A outputs the caption image stored in the output image memory 63b to the image compositing unit 270. After this processing ends, the caption image generating processing ends.

As described above, with the caption image generating processing according to the present embodiment, caption information is extracted from the data memory 61 one at a time, and the display position Pi of the caption from the caption display start point-in-time Ts is calculated. In the event that the caption overlaps the image 291, the caption is rendered. At this time, captions prior to the current point-in-time are rendered with the "past font", and captions later than the current point-in-time are rendered with the "future font". In the event that the current point is present in the caption, partway along, the coordinate thereof on the output image corresponding to that position is transmitted to the current image generating unit 260. This is in order to present a reduced current image at the portion which the user is following visually.

Note that in the event that information such as speaker ID or the like, whereby a person speaking can be identified, is included in the caption information, the color of the caption may be changed in accordance with the speaker, or the like, a point which will be described later.

Figure 37:
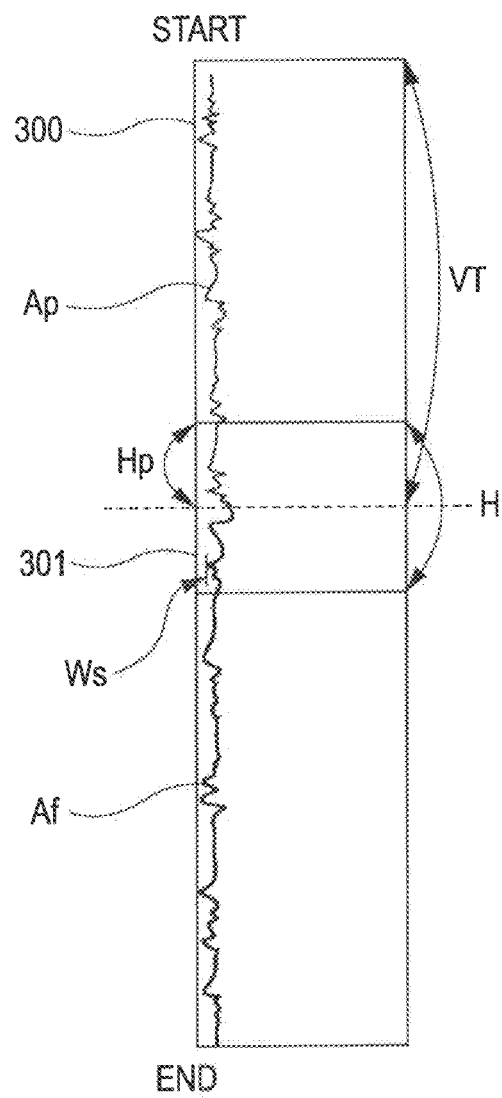
FIG. 37 is a diagram for describing coordinates of audio waveform images according to the second embodiment.

Next, the audio waveform image generating unit 250 will be described in detail with reference to FIGS. 37 and 38. FIG. 37 is a diagram for describing coordinates of an audio waveform image. Here, we will assume the presence of image memory called "virtual memory" 300, in the same way as with the case of the above-described thumbnail image (see FIG. 32) and caption image (FIG. 37). The meanings of the symbols (coordinates) in the example shown in FIG. 37 are the same as those of the same symbols in the case of the above-described thumbnail image and caption image. Note that Ws represents the current horizontal position of the audio waveform in an output image 301. While the position Ws is represented as a bar in the example in FIG. 37, this does not have to actually be shown on the screen.

With the present embodiment, at least two types of line colors for rendering captions are prepared for the colors of lines for rendering the audio waveforms, with a "past color" being used for waveforms (past) Wp before (above) the current position Ws and waveforms (future) Wf that are after (below) are rendered using a "future color". For example, blue may be used for the past color, and yellow may be used for the future color. The types and heaviness of the lines may also be changed, for example. Thus, the viewer can tell at a glance which waveform corresponds to past, present, and future.

Figure 38:
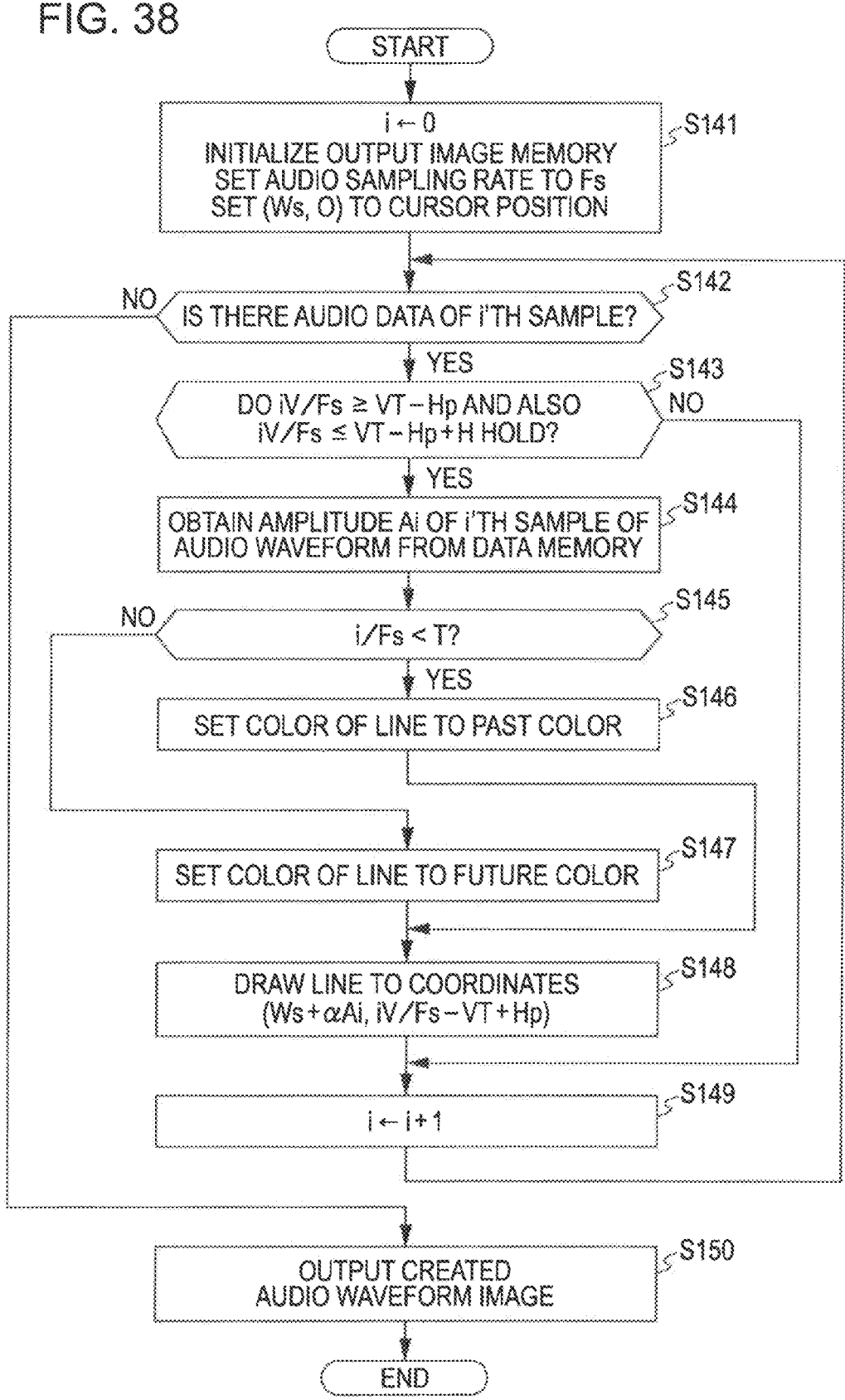
FIG. 38 is a flowchart illustrating an example of the processing of an audio waveform image generating unit according to the second embodiment.

FIG. 38 is a flowchart illustrating an example of processing with the audio waveform image generating unit 250.

In step S141, the audio waveform image generating unit 250 first sets the serial No. i of the object sample to 0 and initializes the output image memory 250a. At this time, the audio waveform image generating unit 250 obtains the sampling rate of audio processing at the information presenting device 100A, and also sets the position of the rod-shaped symbol (cursor position) indicating the current position to (Ws, 0). After this processing ends, the flow proceeds to the processing in step S142.

In step S142, the audio waveform image generating unit 250 determines whether or not audio data of the i'th sample exists in the data memory 61. In the event that there is the audio data, the flow proceeds to step S143. On the other hand, in the event that there is no audio data, the flow proceeds to step S150. After this processing ends, the flow proceeds to the processing in step S150.

The position where the i'th sample audio corresponds to on the virtual memory 300 can be obtained by the calculation value of iV/Fs.

Accordingly, in step S143, the audio waveform image generating unit 250 determines whether or not both conditions of $$iV/Fs \geq VT-Hp$$

and $$iV/Fs \leq VT-Hp+H$$

are satisfied. In the event of satisfying these conditions, the audio waveform is included in the range of the output image 301. In the event that iV/Fs satisfies these conditions, the flow proceeds to step S144. On the other hand, in the event that iV/Fs does not satisfy these conditions, the flow proceeds to step S149.

In step S144, the audio waveform image generating unit 250 obtains the amplitude Ai of the i'th sample of the audio waveform from the data memory 61. After this processing ends, the flow proceeds to the processing in step S145.

In step S145, the audio waveform image generating unit 250 determines whether or not the calculation value of i/F is smaller than the current point-in-time T. In the event of being greater than the current point-in-time T, the flow proceeds to step S146. On the other hand, in the event of being smaller than the current point-in-time T, the flow proceeds to step S147.

In step S146, the audio waveform image generating unit 250 sets the color of the audio waveform line to the past color. After this processing ends, the flow proceeds to the processing in step S148.

In step S147, the audio waveform image generating unit 250 sets the color of the audio waveform line to the future color. After this processing ends, the flow proceeds to the processing in step S148.

In step S148, the audio waveform image generating unit 250 draws the audio waveform line to the coordinates (Ws+ αAi, iV/Fs−VT+Hp). After this processing ends, the flow proceeds to the processing in step S149.

In step S149, sets the serial No. i of the audio sample to i+1. After this processing ends, the flow proceeds to the processing in step S142, and the above processing is repeated.

Finally, in the event that determination has been made in the determination processing in step S142 that there are no more audio samples to be obtained, in step S150 the audio waveform image generating unit 250 outputs the audio waveform image stored in the output image memory 250a to the image compositing unit 270. After this processing ends, the audio waveform image generating processing ends.

As described above, with the audio waveform image generating processing according to the present embodiment, audio data is extracted from the data memory 61 one sample at a time and processed. With an audio sampling rate of Fs (e.g., 48 kHz), the corresponding position of the i'th sample audio on the virtual memory is iV/Fs, and determination is made regarding whether or not this overlaps the output image 301. In the event of overlapping the output image 301, an appropriate coefficient α is multiplied with the amplitude data Ai to calculate the amplitude on the image, and the audio waveform is rendered by a line. The color of the line at this time is set with the method described above. Finally, the generated audio waveform image is output to the image compositing unit 270.

Figure 39:
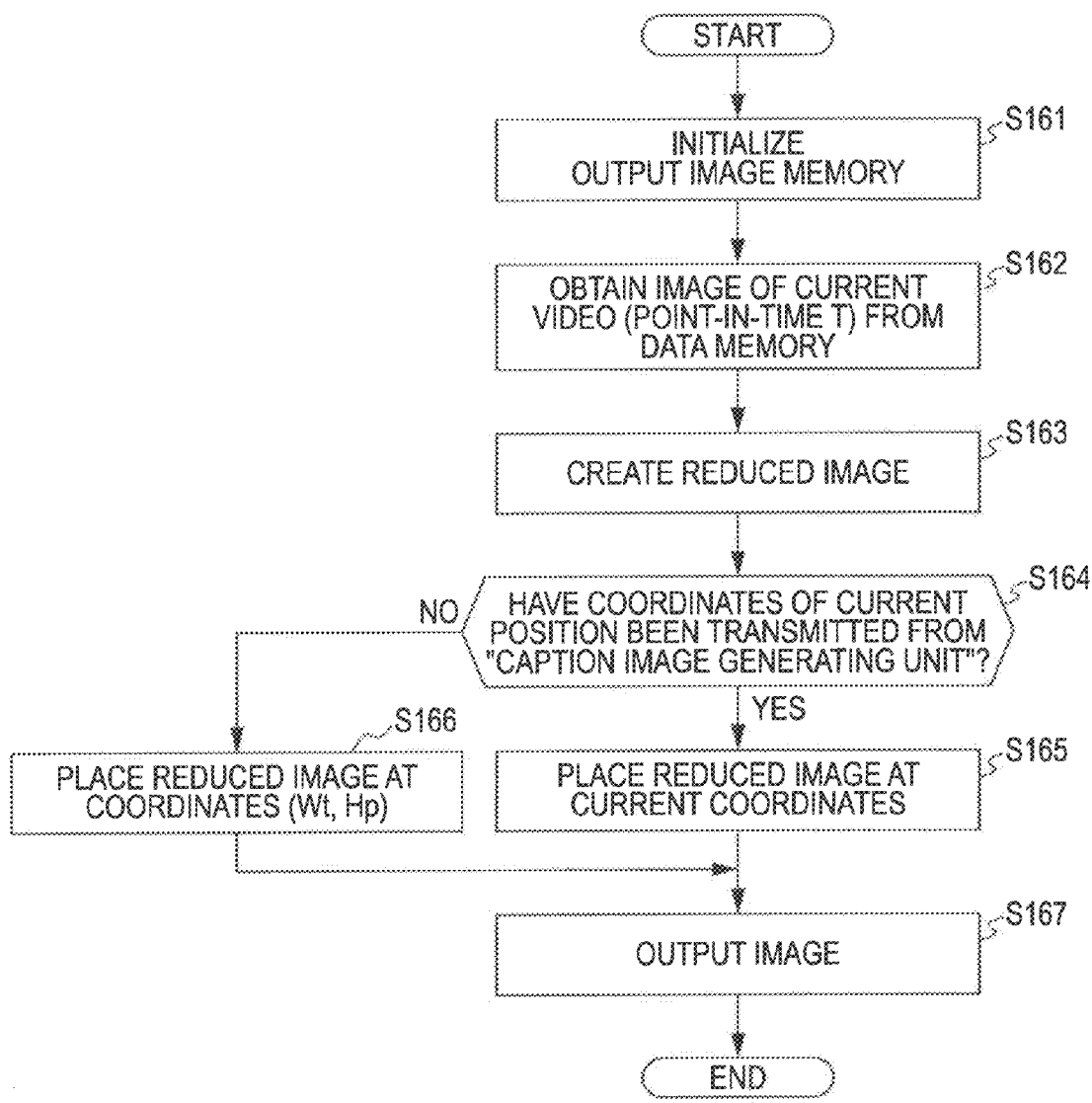
FIG. 39 is a flowchart illustrating an example of the processing of a current image generating unit according to the second embodiment.

Next, the current image generating unit 260 will be described in detail with reference to the flowchart shown in FIG. 39.

In step S161, the current image generating unit 260 first initializes the output image memory 260a applying a transparent color. After this processing ends, the flow proceeds to the processing in step S162.

In step S162, the current image generating unit 260 first obtains an image at the current point-in-time T from the image data stored in the data memory 61. After this processing ends, the flow proceeds to the processing in step S163.

In step S163, the current image generating unit 260 reduces the obtained current image to a predetermined size, and waves in the output image memory 260a. After this processing ends, the flow proceeds to the processing in step S164.

In step S164, the current image generating unit 260 determines whether or not the coordinates of the current position of the caption have been transmitted from the caption image generating unit 63A. In the event that the coordinates of the current position have been transmitted, the flow proceeds to the processing in step S165. On the other hand, in the event that the coordinates of the current position have not been transmitted, the flow proceeds to the processing in step S166.

In step S165, the current image generating unit 260 places the reduced image at the current coordinates received by transmission. After this processing ends, the flow proceeds to the processing in step S167.

In step S166, the current image generating unit 260 places the reduced image at the position of the coordinates (Wt, Hp). Due to this operation, the reduced image of the current image can be presented at a position of the captions where the viewer is visually tracking. After this processing ends, the flow proceeds to the processing in step S167.

Finally, in step S167, the current image generating unit 260 outputs the reduced image placed at the predetermined coordinates of the output image, to the image compositing unit 270. After this processing ends, the current image generating processing ends.

Figure 40:
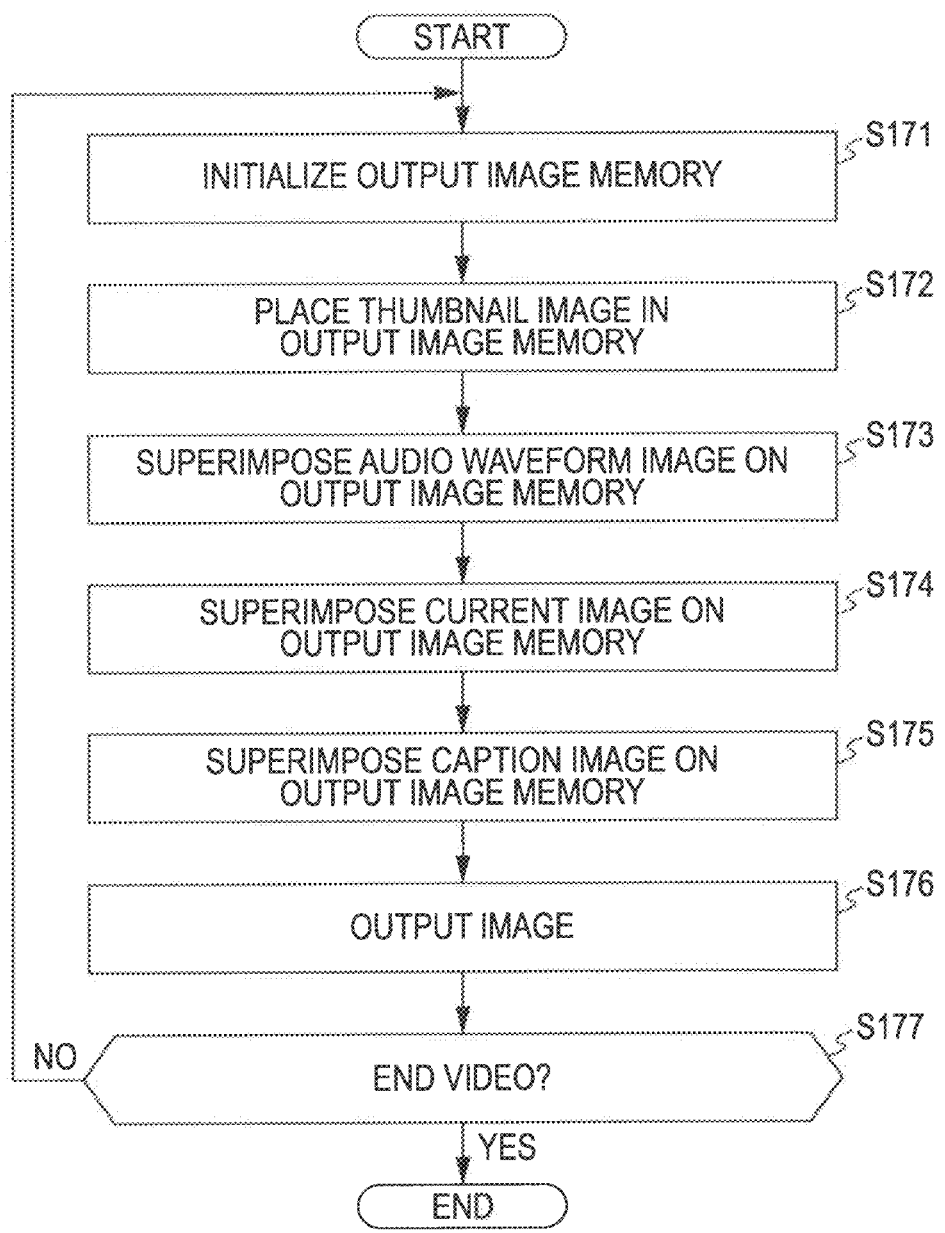
FIG. 40 is a flowchart illustrating an example of the processing of a image compositing unit according to the second embodiment.

Next, the image compositing unit 270 will be described in detail with reference to the flowchart in FIG. 40.

In step S171, the image compositing unit 270 initializes output image memory 270a. After this processing ends, the flow proceeds to the processing in step S172.

In step S172, the image compositing unit 270 places the thumbnail image received from the thumbnail generating unit 62A at the predetermined position of the output image memory 270a. After this processing ends, the flow proceeds to the processing in step S173.

In step S173, the image compositing unit 270 places the audio waveform image received from the audio waveform image generating unit 250 at the output image memory 270a. After this processing ends, the flow proceeds to the processing in step S174.

In step S174, the image compositing unit 270 places the reduced image received from the current image generating unit 260 at the output image memory 270a as the current image. After this processing ends, the flow proceeds to the processing in step S175.

In step S175, the image compositing unit 270 places the caption image received from the caption image generating unit 63A at the output image memory 270a. After this processing ends, the flow proceeds to the processing in step S176.

At step S176, the image compositing unit 270 outputs a composited image, where the thumbnail image, audio waveform image, current image, and caption image, placed at the output image memory 270a, have been composited, to the display device.

In the following step S177, the image compositing unit 270 determines whether or not presenting of video is to end. That is to say, determination is made regarding whether or not input of the images to be displayed has ended, or there has been an instruction from the control unit 80 to end video presenting. In the event of ending video presenting, the image compositing processing ends. In the event of continuing video presenting, the flow returns to step S171 and processing further continues.

As described above, the image compositing unit 270 sequentially superimposes the received thumbnail image, audio waveform image, current image, and caption image. The background portion of each of the images has been set to transparent, so each image can be superimposed without overwriting the image under. Finally, the image composited at the output image memory 270a is output to the display device. The above operations are repeated until the video ends.

Figure 41:
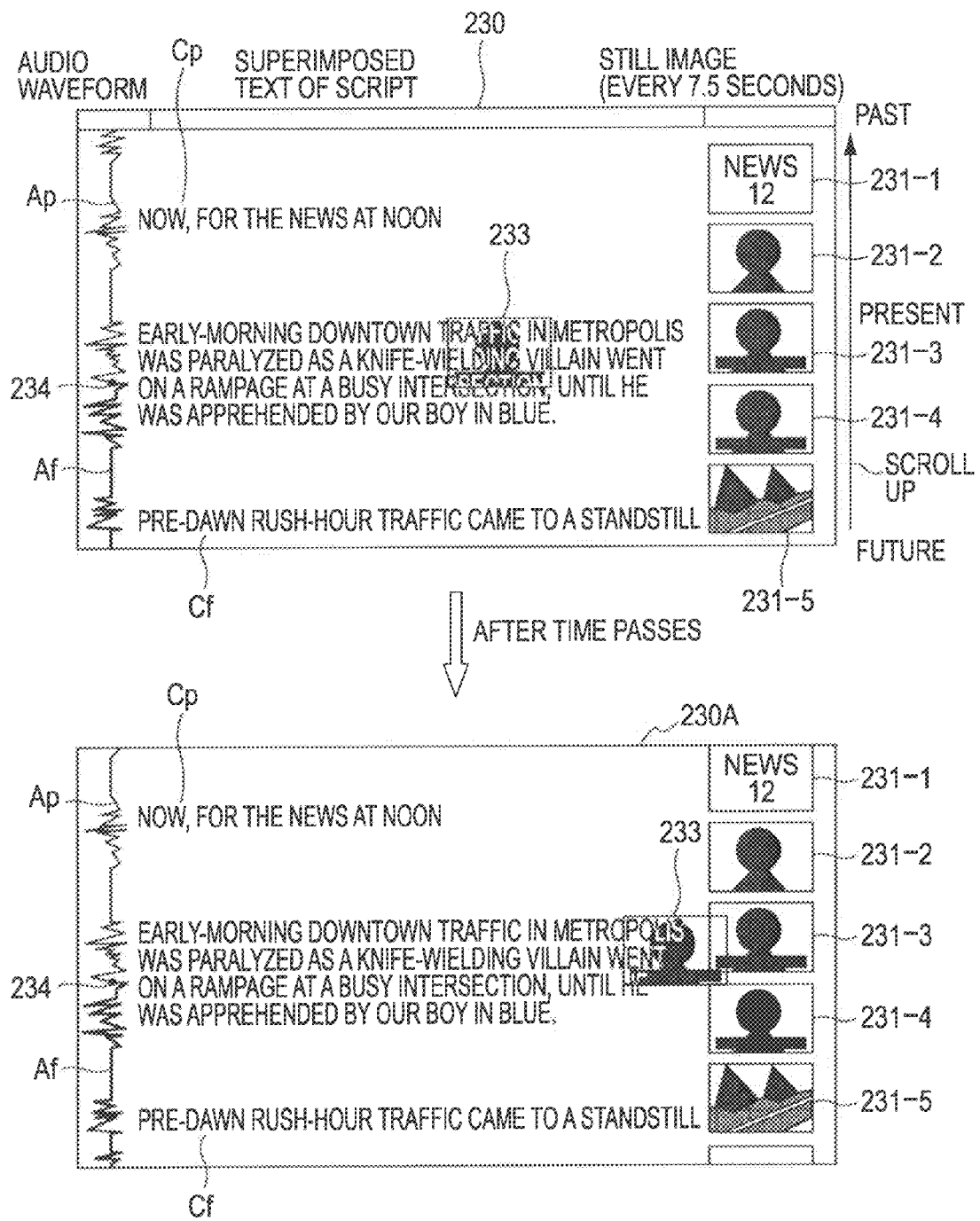
FIG. 41 is a diagram illustrating a display example of program video according to the second embodiment.

FIG. 41 is a diagram illustrating an example of a program video according to the above-described second embodiment. The display screen 230 shown to the upper side in FIG. 41 is the same as the display screen 230 shown in FIG. 28. The display screen 230A shown to the lower side in FIG. 41 is a display example after a slight amount of time has elapsed from the state of the display screen 230 to the upper side. In the display screen 230A, the way in which a current image 233, which is the function between the caption (past) Cp and the caption (future) Cf, moves, is illustrated. Note that with this example, the thumbnail images (still images) are recreated every 7.5 seconds as one example, and are scrolled from the bottom of the screen toward the top.

Modification of Second Embodiment

Next, a first modification of the second embodiment according to the present invention will be described with reference to FIG. 42. A case of viewing multiple programs on multiple display devices will be described with this second modification of the second embodiment.

Figure 42:
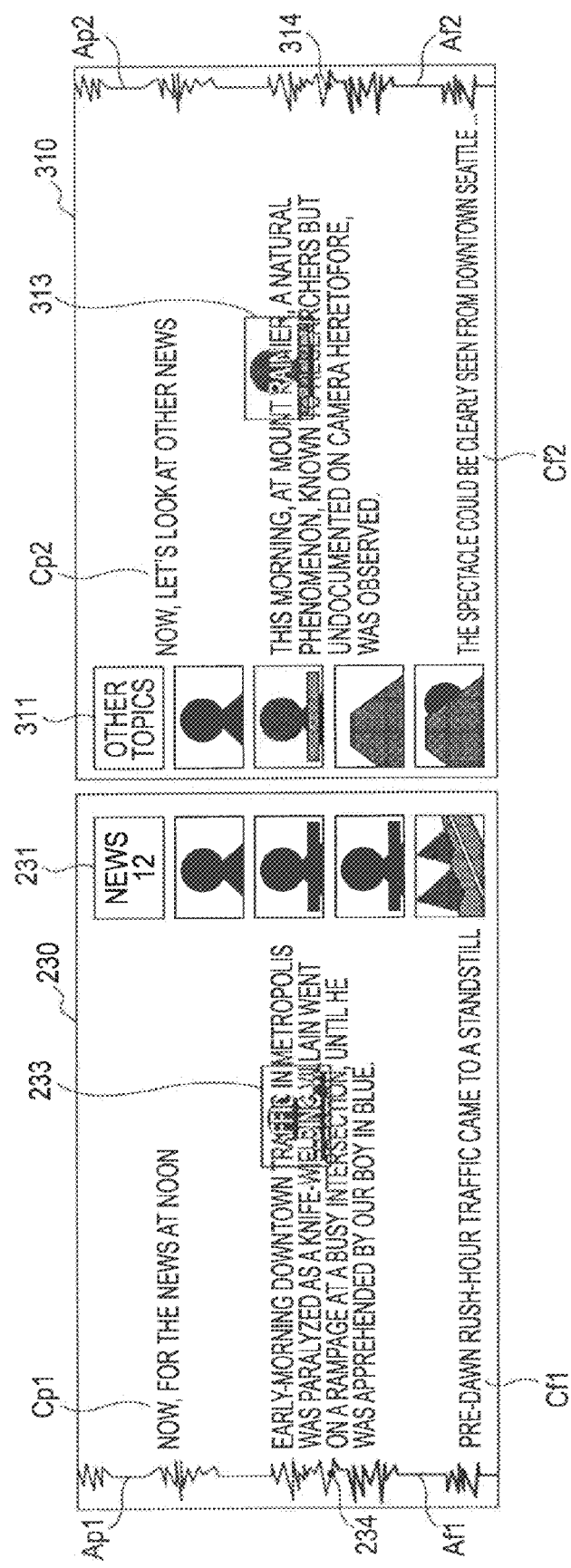
FIG. 42 is a diagram illustrating a two-screen display example with a first modification of the second embodiment.

FIG. 42 is a diagram illustrating a two-screen display example of the second modification of the second embodiment. Two display devices, placed to the left and right of each other, are presenting two programs at the same time. This is realized by different programs being input to each of the information processing units 240-1 and 240-2, and the images of each of the information processing units 240-1 and 240-2 being output to respective display devices 110-1 and 110-2.

The display screen 230 to the left has the same content of display as the display screen 230 shown in FIG. 23 (the content is the same even though some of the reference numerals have been changed). On the other hand, the display screen 310 to the right is displayed with the audio content of the program (content) being caption (past) Cp2 and caption (future) Cf2. Also, a thumbnail image group 311 of the video is presented to the left side of the screen, from the past to the future. Also, the display color of the captions is changed between the past caption and the future caption. Further, the audio signals are represented with waveforms, and the audio waveform is also presented in the form of audio waveform (past) Ap2, audio waveform (future) Af2, and current audio position 314, from past to the future. A current image 313 corresponding to the current playing point-in-time is displayed superimposed on the portion corresponding to the current audio position 314.

Note that with the case of two-screen display, the display screen 230 to the left side and the display screen 310 to the right side are preferably arrayed symmetrically, such that the thumbnail image groups 231 and 311 are toward the middle. Thus, the thumbnail image groups of both are display close to each other, and in a readily comparable manner, thereby improving the nature of the thumbnail image groups as lists.

Second Modification of Second Embodiment

Next, a second modification of the second embodiment according to the present invention will be described with reference to FIG. 43. This second modification of the second embodiment is an example of a case wherein multiple programs are simultaneously displayed with a greater number of display devices than the number of programs.

Figure 43:
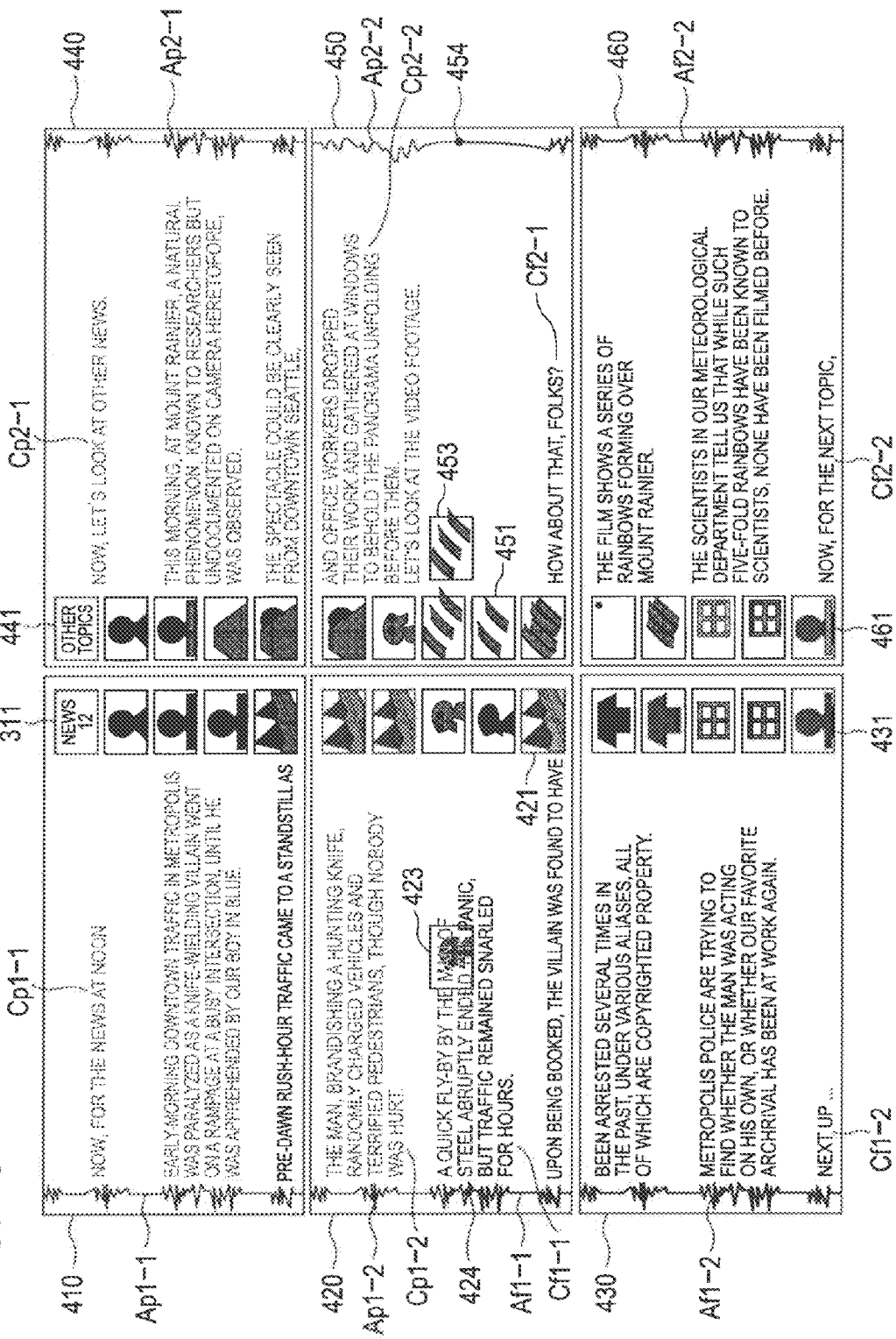
FIG. 43 is a diagram illustrating a six-screen display example with a second modification of the second embodiment.

FIG. 43 is a diagram illustrating a display example of six-screen display with the second modification of the second embodiment. Two programs are simultaneously presented using six display devices. The basic presentation is the same as that in FIG. 42, but display devices are also disposed above and below, thereby presenting more past and future information. With this example, the three display screens 410, 420, and 430, are disposed to the left side, and the three display screens 440, 450, and 460, are disposed to the right side, such that the past, present, and future information of each of the programs is represented using the entirety of display screens of three each.

With the three display screens 410, 420, and 430, which are disposed to the left side, there is a current position 424 and current image 423 at the middle display screen 420, and a thumbnail image group 421 close to the present and including the current image 423 is displayed on the display screen 420, a past thumbnail image group 411 is displayed on the display screen 410, and a future thumbnail image group 431 is displayed on the display screen 430. Further, captions (past) Cp1-1 through Cp1-2 are displayed straddling the display screens 410 and 420, and captions (future) Cf1-1 through Cf1-2 are displayed straddling the display screens 420 and 430. In the same way, audio waveforms (past) Ap1-1 through Ap1-2 are displayed straddling the display screens 410 and 420, and audio waveforms (future) Af1-1 through Af1-2 are displayed straddling the display screens 420 and 430.

This is true for the three display screens 440, 450, and 460, which are disposed to the right side, as well. That is to say, there is a current position 454 and current image 453 at the middle display screen 450, and a thumbnail image group 451 close to the present and including the current image 453 is displayed on the display screen 450, a past thumbnail image group 441 is displayed on the display screen 440, and a future thumbnail image group 461 is displayed on the display screen 460. Further, captions (past) Cp2-1 through Cp2-2 are displayed straddling the display screens 440 and 450, and captions (future) Cf2-1 through Cf2-2 are displayed straddling the display screens 450 and 460. In the same way, audio waveforms (past) Ap2-1 through Ap2-2 are displayed straddling the display screens 440 and 450, and audio waveforms (future) Af2-1 through Af2-2 are displayed straddling the display screens 450 and 460.

In this way, the placement of the parts (thumbnail images, caption images, audio waveform images, current images) are set as appropriate for the screen positions, and the viewer can obtain information more readily.

Primary advantages of using multiple display devices include free layout of screens and better resolution, but the multiple screens may be displayed on a single display device if these conditions are satisfied.

Third Modification of Second Embodiment

Next, a third modification of the second embodiment will be described with reference to FIG. 44. The third modification of the second embodiment is a display example of drama programs using two screens, with the captions being color-coded for each speaker, thereby improving the information obtaining efficiency.

Figure 44:
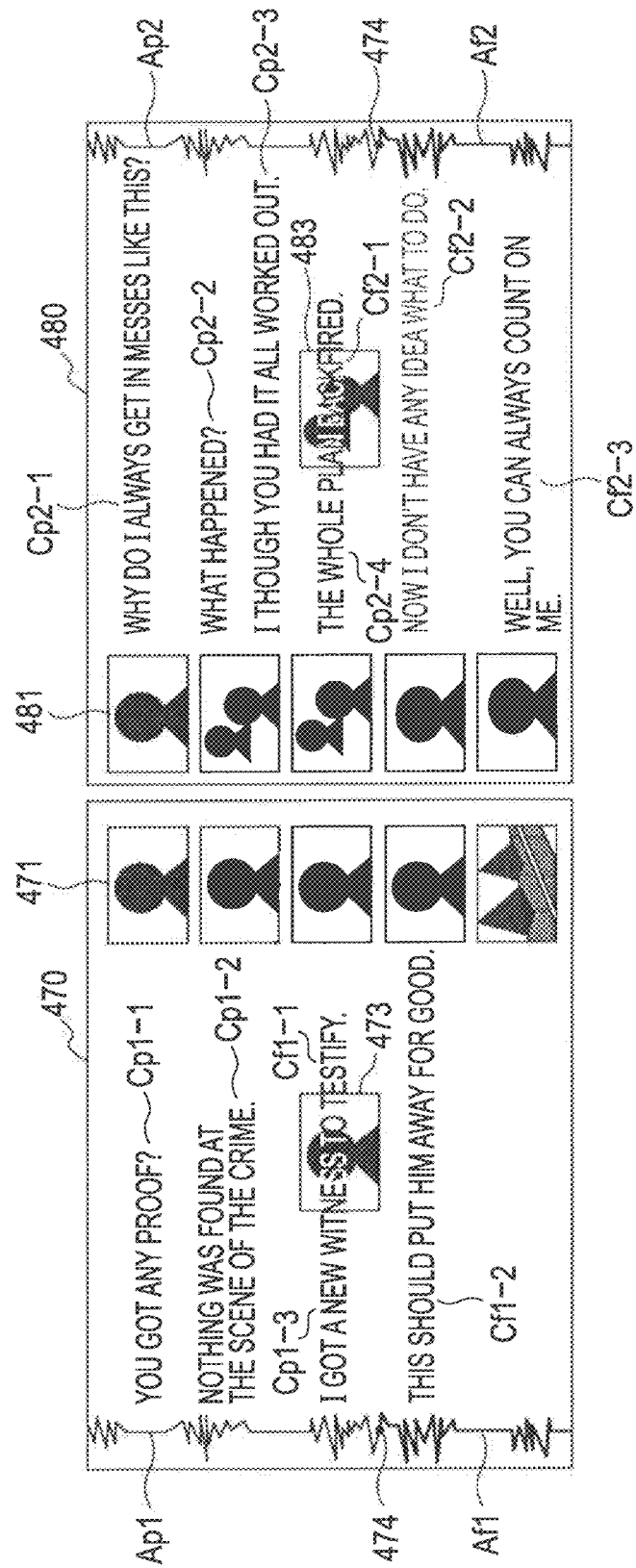
FIG. 44 is a block diagram illustrating a display example of drama programs using two screens, with the second modification of the second embodiment.

In FIG. 44, a thumbnail image group 471 is displayed to the right side of the display screen 470 at the left, and audio waveforms Ap1 and Af1 are displayed to the left side of the screen. Also, captions (past) Cp1-1 through Cp 1-3 are displayed above the current position 474, and captions (future) Cf1-1 and Cf1-2 below. A current image 473 is placed at the current position of the caption.

A different drama program is displayed to the display screen 480 to the right side, with a thumbnail image group 481 displayed to the left side of the display screen 480 at the right, and audio waveforms Ap2 and Af2 displayed to the right side of the screen. Also, captions (past) Cp2-1 through Cp2-4 are displayed above the current position 484, and captions (future) Cf2-1 and Cf2-3 below. A current image 483 is placed at the current position of the caption.

With the present embodiment, the display color of the caption is changed for each speaker, so the words of one speaker are not confused with those of another. Accordingly, the speakers in a drama can be readily organized, and efficient acquisition of information can be realized.

Fourth Modification of Second Embodiment

A fourth modification of the second embodiment will be described with reference to FIGS. 45 through 48. The fourth modification of the second embodiment is an arrangement wherein information relating to the captions is notified (display) as an aid, as a display form of information which can be used for prediction of how the program will proceed.

Figure 45:
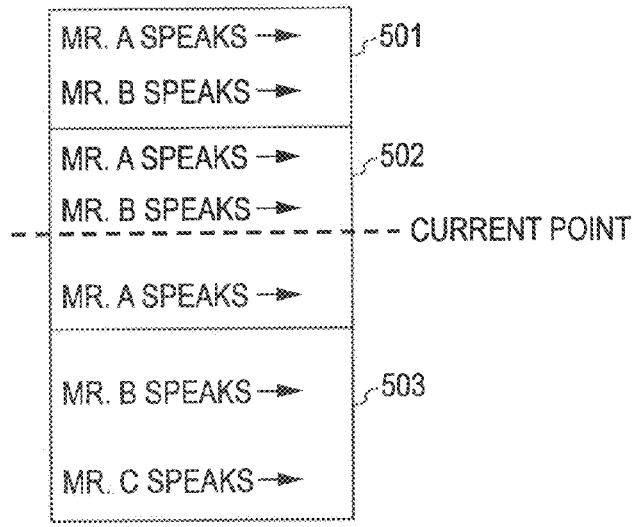
FIG. 45 is a diagram for describing speech timing notification according to a third modification of the second embodiment.

FIG. 45 is a diagram for describing notification of speech timing. Information is displayed whereby the speaker of the captions can be identified, for each of the output images 501 through 503. This notification of speech timing is realized by displaying a speech start mark at a portion of the caption generated at the caption image generating unit 63A. Also, in the event that a speaker ID is included in the caption information, information can be obtained more efficiently by displaying who is speaking.

Figure 46:
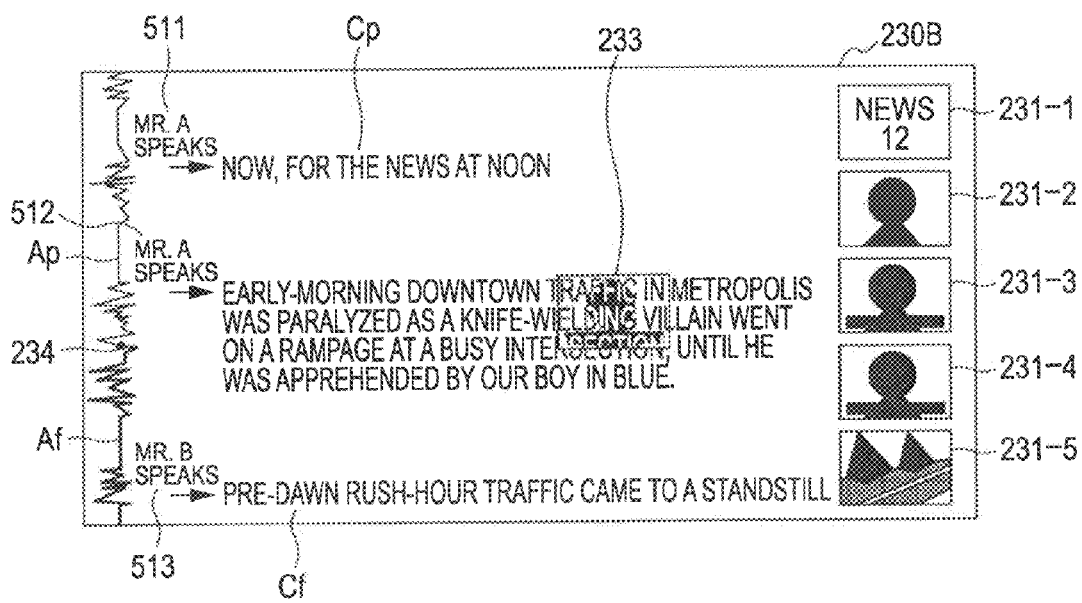
FIG. 46 is a diagram illustrating a display example of speech timing notification according to the third modification of the second embodiment.

FIG. 46 is a diagram illustrating a display example of notification of speech timing. The display screen 230B shown in FIG. 46 is basically the same as the display screen 230 shown in FIG. 28, except that with this example, speech timing is notified. In this example, a speech timing notification 511 is displayed to the effect that Mr. A has spoken the upper caption "NOW, FOR THE NEWS AT NOON", a speech timing notification 512 is displayed to the effect that Mr. A has also spoken the middle caption "EARLY-MORNING DOWNTOWN TRAFFIC IN METROPOLIS . . . ", and a speech timing notification 513 is displayed to the effect that Mr. B has spoken the lower caption "PRE-DAWN RUSH-HOUR TRAFFIC CAME TO A STANDSTILL . . . ".

Figure 47:
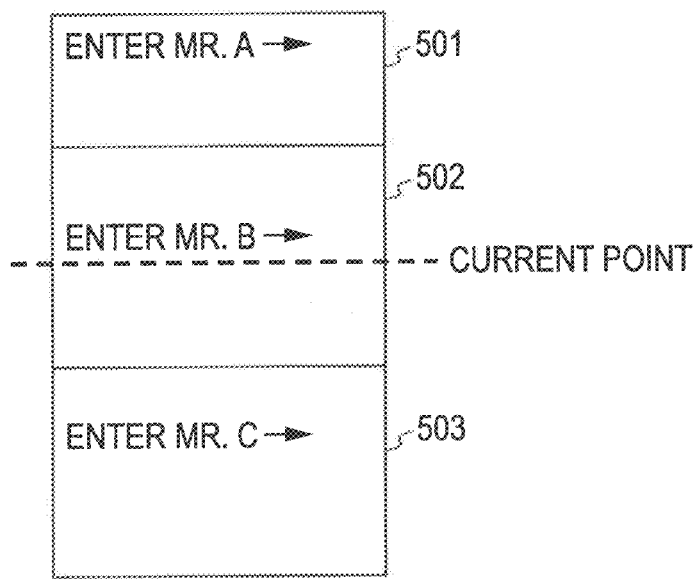
FIG. 47 is a diagram for describing person-entering notification according to the third modification of the second embodiment.

FIG. 47 is a diagram for describing notification of people entering. Marks are displayed in each of the output images 501 through 503, showing portions in the captions where new people make an entrance. This is realized by displaying an enter-person start mark at a portion of the captions generated at the caption image generating unit 63A. Information regarding whether or not a new person has entered is obtained as metadata from the broadcast. In the event of including a module capable of person recognition in the information presenting device 100A, the results of person recognition are reflected in the display.

Figure 48:
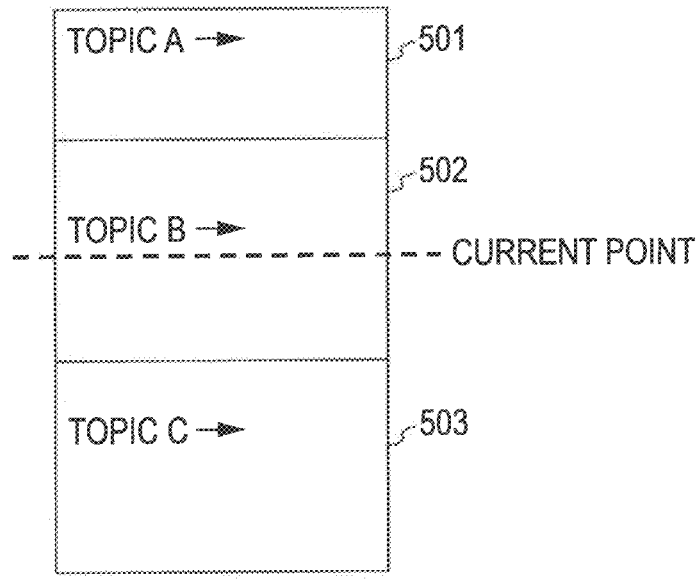
FIG. 48 is a diagram for describing topic notification according to the third modification of the second embodiment.

FIG. 48 is a diagram for describing notification of the content of topics. In news programs or the like, a mark of a start position of a new topic is displayed for each of the output images 501 through 503. Alternatively, meaningful sections, such as changing of programs, are displayed. This is realized by displaying a topic start position mark at a portion of the caption generated at the caption image generating unit 63A. Information regarding starting a new topic is obtained as metadata from the broadcast. Alternatively, in the event that starting of a program can be recognized using an EPG (Electronic Program Guide) or the like, that information may be used.

With the present embodiment as described above, in addition to current information to be played (thumbnail images, caption images, audio waveform images), past information and future information can be presented beforehand on the screen. Accordingly, even if the viewer is tracking the captions, the overall video naturally is viewed, and both the text information and video information can be comprehended at the same time.

Also, past and future information are displayed in abundance, so the viewer can view multiple programs (contents) in a relaxed manner. That is to say, the viewer can predict how the program will proceed since the future information can be confirmed. Also, how the program has proceeded can be followed, since the past information can be confirmed as well. Accordingly, how the program proceeds can be viewed in a relaxed manner since the future development of the program can be predicted and the past development can be confirmed.

Presentation of Audio

A method for presenting audio accompanying the program video (content) will be described. The following can be conceived for audio presenting methods.

Presenting all Audio

In the event of simultaneously presenting the audio corresponding to thumbnail images and audio corresponding to captions (words) for example, the audio of the captions will be hard to hear. However, the presentation of captions and the audio are synchronized, so the viewer would be able to hear the quality of sound, rhythm, and so forth, by concentrating. Also, sound effects, background music, and so forth, can be listened to with little mingling of sounds, so the user would be able to hear the atmosphere of the program.

Presenting One Audio

In the event that multiple program videos are being presented, audio of a program which the view has selected is presented. Alternatively, the eye direction of the viewer may be detected using an eye-direction detection sensor according to the related art, so as to present the audio of a program to which the eyes of the viewer are directed. In this case, the audio of a side in which the viewer is interested can be heard, so a presentation form with high satisfaction of the viewer can be provided.

Silent

In order to understand the content of multiple programs, the viewer has to maintain concentration. There may be cases wherein no audio is presented and just video is presented, since the audio might disturb the concentration of the viewer.

Other

An arrangement may be made wherein multiple audio presenting forms are presented, and the control unit 80 determines the audio presenting method by detecting viewer instructions, or detecting the viewing environment. Also, with the example of the above-described embodiment, the audio signals are supplied to speakers installed in the display devices, but an arrangement may be made wherein the audio is supplied to earphones connected to an unshown audio output terminal.

Thus, with the first embodiment described above, in addition to current information and information of interest to be played, future information can be presented on the screen beforehand. With the second embodiment described above, in addition to current information and information of interest to be played, past information and future information can be presented on the screen. Further, an arrangement may be made wherein, in addition to current information and information of interest to be played, only past information is presented on the screen.

Now, the series of processing performed at the information processing device described above may be carried out by hardware, or by software. Alternatively, the functions for carrying out this series of processing may be carried out by a combination of hardware and software, as a matter of course. In the event of executing the series of processing with software, a program making up the software is installed from a program recording medium to a computer in which dedicated hardware is installed, or to a general-purpose computer capable of executing various types of functions by installing various types of programs, for example.

Figure 49:
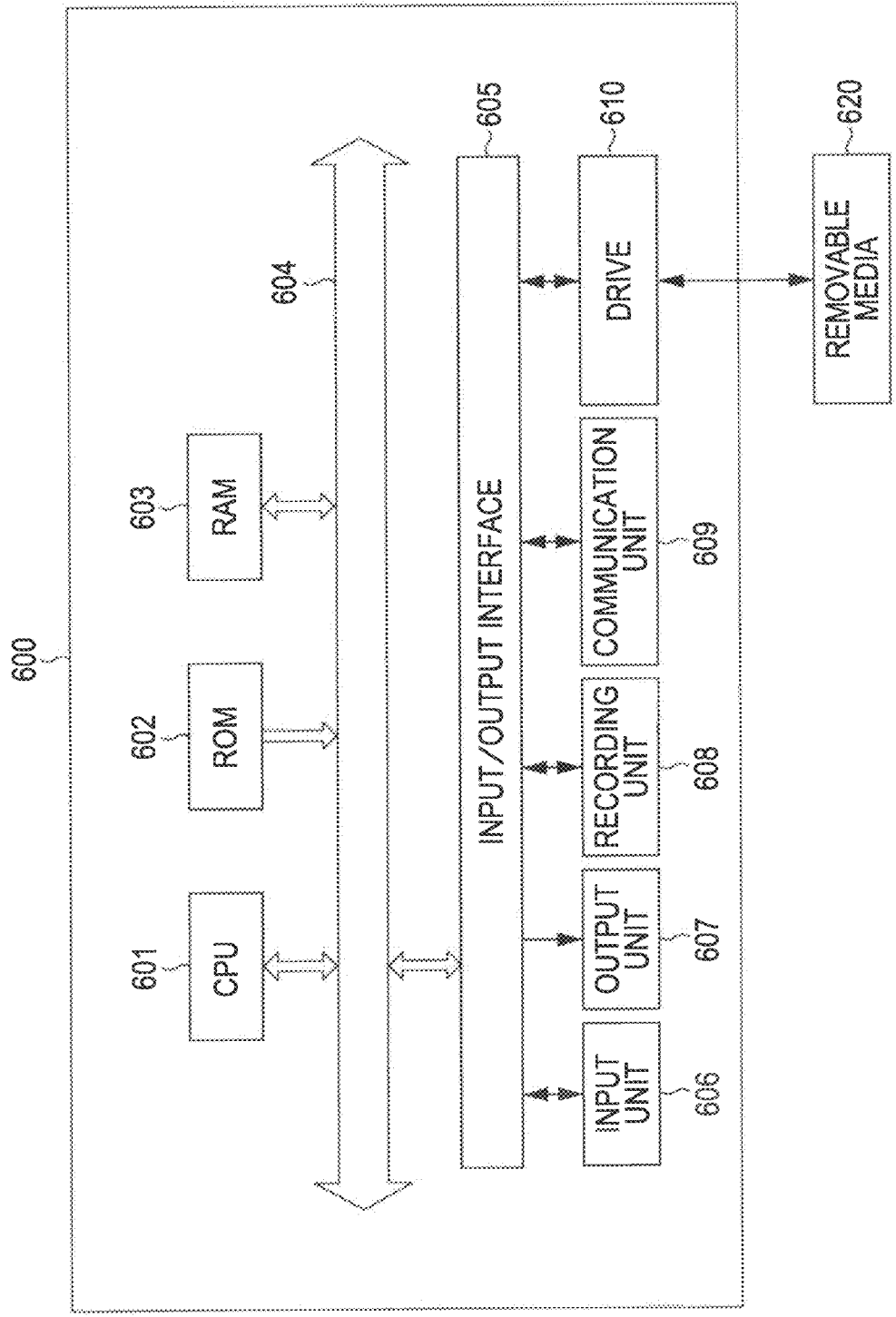
FIG. 49 is a block diagram illustrating an internal configuration example of a general-purpose computer.

FIG. 49 is a block diagram illustrating a configuration example of a computer 600 which executes the above-described series of processing with a program. This computer 600 may be a high-performance dedicated computer for executing he series of processing for example, or may be a personal computer having a certain level of capabilities.

A CPU (Central Processing Unit) 601 of the computer 600 executes various types of processing including that of the above-described series of processing following the program stored in ROM (Read Only Memory) 602 or recorded in a recording unit 608. RAM (Random Access Memory) 603 stores programs to be executed by the CPU 601, data, and so forth, as appropriate. The CPU 601, ROM 602, and RAM 603, are mutually connected by a bus 604.

An input/output interface 605 is also connected to the CPU 601 via the bus 604. Connected to the input/output interface 605 are an input unit 606 made up of a keyboard, mouse, microphone, etc., and an output unit 607 made up of a display, speaker, etc. The CPU 601 executes various types of processing in accordance with instructions input from the input unit 606. The CPU 601 outputs the results of processing to the output unit 607.

A recording unit 608 connected to the input/output interface 605 is made up of a hard disk for example, and records programs which the CPU 601 executes, and various types of data.

A communication unit 609 communicates with external devices via a network, such as the Internet or a local area network. Programs may be obtained via the communication unit 609 and recorded in the recording unit 608.

A drive 610 connected to the input/output interface 605 drives removable media 620 such as a magnetic disk, optical disc, magneto-optical disc, semiconductor memory, or the like, mounted thereto, so as to obtain programs, data, and so forth, recorded therein. The programs and data obtained thus are transferred to and recorded in the recording unit 608 as appropriate.

A program recording medium storing a program which is installed in a computer so as to be executable by the computer may be provided as packaged media by way of the removable media 620, as can be seen in FIG. 49. Examples of the removable media 620 include magnetic disks (including flexible disks), optical discs (including CD-ROM (Compact Disc-Read Only Memory) and DVD (Digital Versatile Disc), magneto-optical disks, semiconductor memory, or the like. Alternatively, the program recording media may be configured of ROM 602 or a hard disk making up the recording unit 608, in which the program is temporarily or permanently stored (recorded).

Storing of the program to the program recording medium is performed using cable or wireless communication media such as a local area network (LAN), the Internet, digital satellite broadcasting, and so forth, via the communication unit 609 which is an interface such as a router, modem, etc., as appropriate.

It should be noted that with the present Specification, the processing steps described in the program stored in the program storing medium may be executed in time-series following the described order of course, but are not restricted to being executed in the described order, and may be executed in parallel or individually, including parallel processing or object-oriented processing.

Also, the program may be processed by a single computer, or among multiple computers. Further, the program may be transferred to and executed at a remote computer.

Embodiments of the present invention are not restricted to those described above, and various modifications may be made without departing from the spirit and scope of the present invention.

The present application contains subject matter related to that disclosed in Japanese Priority Patent Applications JP 2008-150962 and JP2009-132489 filed in the Japan Patent Office on Jun. 9, 2008 and Jun. 1, 2009, respectively, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information presenting device comprising:
a first image generating unit configured to extract, from video data input by way of an input unit, a portion of said video data, and generate a plurality of main images;
a second image generating unit configured to generate multiple sub-images from information correlated to said video data; and
an image output unit configured to generate a display image, wherein said plurality of main images are placed in time sequence, and each of said plurality of sub-images are displayed in time sequence corresponding to said main images; and
a current image generating unit configured to generate a small image of a display size smaller than the display size of one of said plurality of main images, which is at a current position, generated by said first image generating unit, the display size of the small image being proportionately smaller with respect to an increasing distance from the one of said plurality of main images at said current position, the display size of the small image increasing proportionately, with respect to a decreasing distance, as the small image moves toward said current position, wherein
the image output unit comprises: a virtual space generating unit configured to generate a main image object wherein said plurality of main images are arrayed in time sequence, generate sub-image objects from each of the plurality of sub-images, and generate said virtual space by placing said plurality of sub-image objects in time sequence, above said main image object and in parallel with the placement direction of said main images; and a rendering unit configured to set a viewpoint between said main image object and said plurality of sub-image objects, so as to generate said display image from said virtual space, such that said viewpoint moves from the present toward the future in a manner parallel to the array direction of said main images as time progress.

2. The information presenting device according to claim 1, wherein said image output unit
generates a first virtual object in accordance with a metaphor in which said plurality of main images are represented as a road viewed through a car windshield,
generates a second virtual object in accordance with a metaphor in which said plurality of sub-images are represented as road signs viewed through a car windshield, and generates said display image from a virtual space including said first and second virtual objects.

3. The information presenting device according to claim 1, said second image generating unit further comprising:
a caption image generating unit configured to generate caption images as said sub-images, based on caption information included in the video data input to said input unit.

4. The information presenting device according to claim 1, said second image generating unit further comprising:
a superimposed text image detecting unit configured to detect superimposed text images as said sub-images, from the video data input to said input unit.

5. The information presenting device according to claim 1, said second image generating unit further comprising:
a face image detecting unit configured to detect face images as said sub-images, from the video data input to said input unit.

6. The information presenting device according to claim 1, said second image generating unit further comprising:
an inset screen detecting unit configured to detect an image displayed in an insert screen region which has been composited in a superimposed manner on the image of said video data, as a sub-image, from the video data input to said input unit.

7. The information presenting device according to claim 1, in which a plurality of said rendering unit is provided, said information presenting device further comprising:
an image compositing configured to composite a plurality of images including said main image object and said plurality of sub-image objects supplied from each of the rendering units, so as to generate a single display image.

8. The information presenting device according to claim 1, said second image generating unit further comprising:
a caption image generating unit configured to
generate a caption image as a first sub-image, based on caption information included in the video data input to said input unit
calculate a position in said caption image which corresponds to a content of speech in said main image at said current position, and
output said caption image in a different form with said current position as a base point; and
an audio waveform image generating unit configured to
generate an audio waveform image of the audio data, input to said input unit along with said video data, as a second sub-image,
calculate a position in said audio waveform image corresponding to the content of speech in said main image at said current position, and
output said audio waveform image in a different form with said current position as a base point;
wherein said image output unit generates said display image by compositing each of said plurality of main images, said caption image, and said audio waveform image, so as to be placed in time sequence of past, present, and future, with said current position as a base point.

9. The information presenting device according to claim 8, wherein said caption image generating unit changes the display color of captions corresponding to the past and captions corresponding to the future, with said current position as a base point;
and wherein said audio waveform image generating unit changes the display color of audio waveforms corresponding to the past and audio waveforms corresponding to the future, with said current position as a base point;

10. The information presenting device according to claim 9, said second image generating unit including the current image generating unit,
    wherein said image output unit places the small image generated at said current image generating unit, at said current position within said caption image output form said caption image generating unit.

11. The information presenting device according to claim 1, wherein said image output unit generates a display image in which, of said plurality of main images, a main image of interest and an image further ahead in the temporal direction are arrayed.

12. The information presenting device according to claim 11, wherein said image output unit generates a display image in which, of said plurality of main images, a main image of interest and an image already behind in the temporal direction are arrayed.

13. The information presenting device according to claim 1, wherein said image output unit generates a display image in which, of said plurality of main images, a main image of interest and an image already behind in the temporal direction are arrayed.

14. The information presenting device according to claim 1, wherein the video data corresponds to a television broadcast of a news program.

15. The information presenting device according to claim 1, wherein the one of said plurality of main images corresponds to a cropped face image of a news anchor.

16. The information presenting device according to claim 1, wherein one of said plurality of sub-images corresponds to a caption for a television broadcast.

17. The information presenting device according to claim 16, wherein the caption, when positioned at a foreground position, corresponds to words spoken by a person on the television broadcast and when positioned at one or more background positions, corresponds to words that will be spoken by the person at one or more future points in time.

18. An information presenting method comprising the steps of:
    extracting, from video data, a portion of said video data, and generating multiple main images;
    generating multiple sub-images from information correlated to said video data;
    generating a display image, wherein said plurality of main images are placed in time sequence, and each of said plurality of sub-images are displayed in time sequence corresponding to said main images;
    generating a small image of a display size smaller than the display size of one of said plurality of main images, which is at a current position, the display size of the small image being proportionately smaller with respect to an increasing distance from the one of said plurality of main images at said current position, the display size of the small image increasing proportionately, with respect to a decreasing distance, as the small image moves toward said current position;
    generating a main image object wherein said plurality of main images are arrayed in time sequence;
    generate sub-image objects from each of the plurality of sub-images;
    generating said virtual space by placing said plurality of sub-image objects in time sequence, above said main image object and in parallel with the placement direction of said main images; and
    setting a viewpoint between said main image object and said plurality of sub-image objects, so as to generate said display image from said virtual space, such that said viewpoint moves from the present toward the future in a manner parallel to the array direction of said main images as time progress.

* * * * *